United States Patent
Tatsuno et al.

(10) Patent No.: US 12,307,640 B2
(45) Date of Patent: May 20, 2025

(54) INFORMATION PROCESSING APPARATUS, INFORMATION PROCESSING SYSTEM, APPARATUS, AND METHOD GENERATES SURFACE AND CROSS-SECTION IMAGES INDICATING PARTICULAR POSITIONS, AND NON-TRANSITORY COMPUTER-EXECUTABLE STORAGE MEDIUM

(71) Applicants: Hibiki Tatsuno, Tokyo (JP); Mitsue Fukushima, Sanda (JP); Yuki Suzumoto, Tokyo (JP)

(72) Inventors: Hibiki Tatsuno, Kanagawa (JP); Masanobu Fukushima, Sanda (JP); Yuki Suzumoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 268 days.

(21) Appl. No.: 17/954,399

(22) Filed: Sep. 28, 2022

(65) Prior Publication Data
US 2023/0099282 A1  Mar. 30, 2023

(30) Foreign Application Priority Data

Sep. 29, 2021 (JP) .................. 2021-158613

(51) Int. Cl.
*G06T 7/00* (2017.01)
*G06T 15/08* (2011.01)
(Continued)

(52) U.S. Cl.
CPC ............ *G06T 7/0002* (2013.01); *G06T 15/08* (2013.01); *G06V 10/25* (2022.01); *G06V 10/761* (2022.01); *G06T 7/55* (2017.01); *G06V 2201/07* (2022.01)

(58) Field of Classification Search
USPC .................................................. 382/103, 154
See application file for complete search history.

(56) References Cited

U.S. PATENT DOCUMENTS

| | | | |
|---|---|---|---|
| 12,106,501 B2 * | 10/2024 | Nims ...................... | G06T 7/521 |
| 2006/0099558 A1 * | 5/2006 | Ema ........................ | G06T 3/067 |
| | | | 434/262 |

(Continued)

FOREIGN PATENT DOCUMENTS

| | | |
|---|---|---|
| JP | H06-78976 B2 | 10/1994 |
| JP | 2004-347585 | 12/2004 |

(Continued)

OTHER PUBLICATIONS

Office Action issued Dec. 27, 2022 in Japanese Patent Application No. 2022-192532, 18 pages. (with Partial English Translation).

(Continued)

*Primary Examiner* — Haris Sabah
(74) *Attorney, Agent, or Firm* — XSENSUS LLP

(57) ABSTRACT

An information processing apparatus includes circuitry. The circuitry creates a surface image of the object and a cross-section image of the object. The circuitry receives a creation instruction that instructs to create an image indicating a particular position in an object. The circuitry creates a surface position image indicating the particular position in the surface image and a cross-section position image indicating the particular position in the cross-section image according to the received creation instruction.

20 Claims, 56 Drawing Sheets

(51) Int. Cl.
  *G06V 10/25*  (2022.01)
  *G06V 10/74*  (2022.01)
  *G06T 7/55*  (2017.01)

(56) References Cited

U.S. PATENT DOCUMENTS

| | | |
|---|---|---|
| 2011/0052044 A1* | 3/2011 | Takahashi .......... G01N 23/2255 |
| | | 382/154 |
| 2013/0147800 A1* | 6/2013 | Ogata .................... G06T 17/00 |
| | | 345/420 |
| 2017/0287211 A1* | 10/2017 | Seo .......................... G06T 19/00 |
| 2019/0155302 A1* | 5/2019 | Lukierski ............. G05D 1/0251 |

FOREIGN PATENT DOCUMENTS

| | | |
|---|---|---|
| JP | 2006-234383 | 9/2006 |
| JP | 2015-161552 A | 9/2015 |
| JP | 2019-211257 | 12/2019 |
| JP | 2021-148806 | 9/2021 |

OTHER PUBLICATIONS

Takashi Hayase, et al., Terrain Deformation Monitoring System for River Embankment, Mitsubishi Denki Giho, vol. 93, No. 7, Jul. 20, 2019, 9 pages. (with Partial English Translation).

* cited by examiner

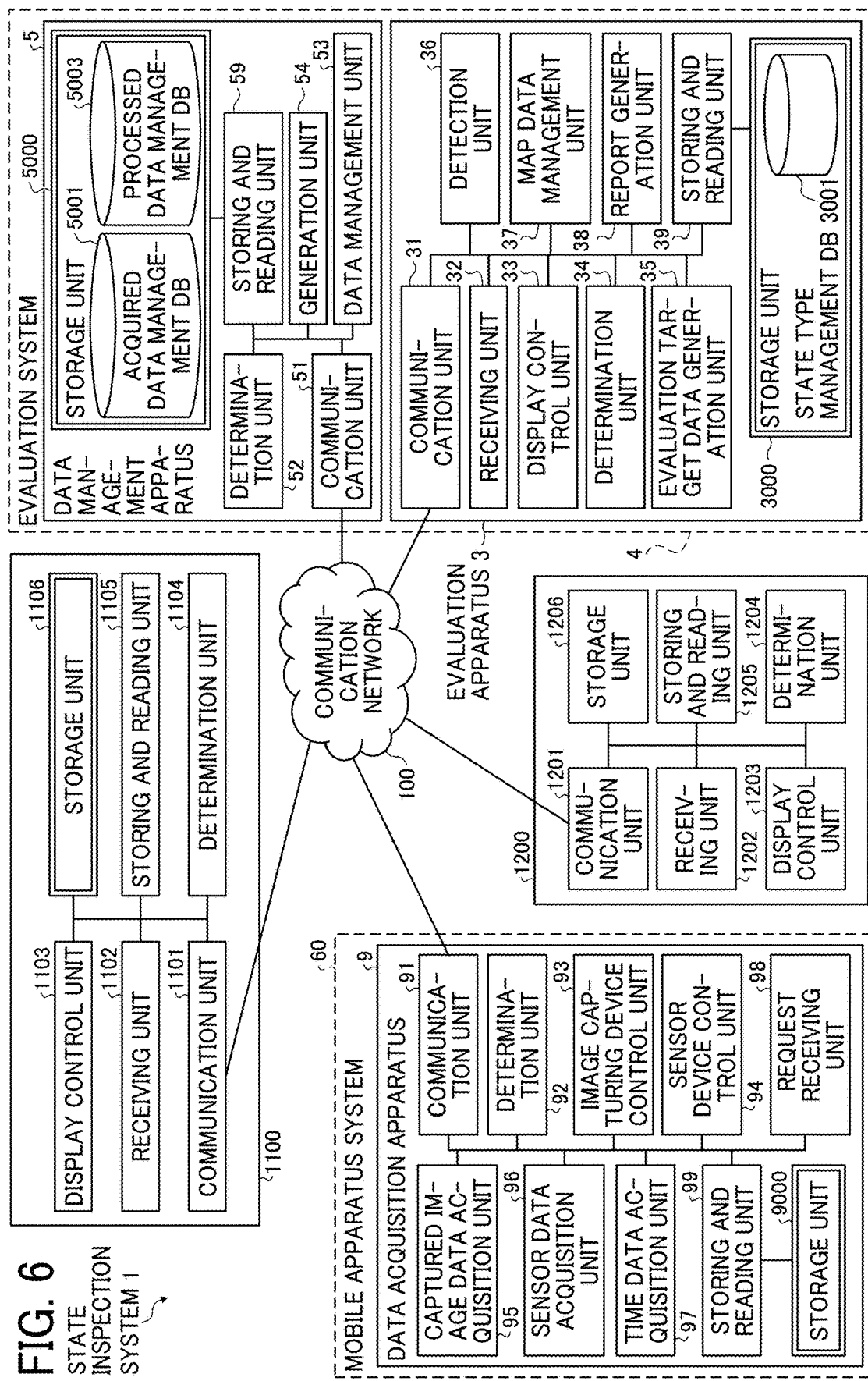

FIG. 7

| TYPE NO. | TYPE NAME | TRAINING IMAGE | REMARKS |
|---|---|---|---|
| 1 | RETAINING WALL |  | — |
| 2 | SLOPE RETAINING FRAME | 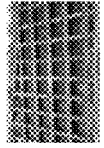 | THE PRESENCE OR ABSENCE OF ANCHORS IS NOT DISTINGUISHED |
| 3 | SPRAY MORTAR |  | — |
| 4 | WIRE MESH, FENCE (RETAINING WALL) |  | ASSIGN TO STRUCTURE INCLUDING RETAINING WALL AND WIRE MESH OR FENCE |
| 5 | WIRE MESH, FENCE (SLOPE RETAINING FRAME) | — | ASSIGN TO STRUCTURE INCLUDING SLOPE RETAINING FRAME AND WIRE MESH OR FENCE |
| 6 | WIRE MESH, FENCE (SPRAY MORTAR) | — | ASSIGN TO STRUCTURE INCLUDING SPRAY MORTAR AND WIRE MESH OR FENCE |
| 7 | WIRE MESH, FENCE (OTHERS) | — | ASSIGN TO ONLY WIRE MESH OR FENCE OR OBJECT WHOSE STATE TYPE BEHIND WIRE MESH OR FENCE IS UNKNOWN |
| 8 | BLOCK, JOINT | 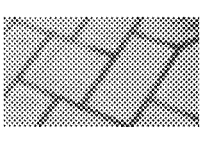 | — |

FIG. 8

| TYPE NO. | TYPE NAME | TRAINING IMAGE | REMARKS |
|---|---|---|---|
| 9 | DRAINAGE HOLE, PIPE |  | CLOGGING CAUSES INFLOW WATER |
| 10 | DRAINAGE CHANNEL_OF SMALL STEP |  | CLOGGING CAUSES INFLOW WATER |
| 11 | INFLOW WATER |  | INDICATE POSSIBILITY THAT ACCUMULATED WATER ARE APPLYING PRESSURE FROM BACK SIDE OF SLOPE |
| 12 | MOSS, PLANTS |  | MAY BE CAUSED DUE TO INFLOW WATER |
| 13 | ROCKFALL |  | INDICATE POSSIBILITY THAT ABNORMALITY IS PRESENT ON BACK SIDE AND UPPER SIDE OF SLOPE |
| 14 | EARTH AND SAND |  | INDICATE POSSIBILITY THAT ABNORMALITY IS PRESENT ON BACK SIDE AND UPPER SIDE OF SLOPE |
| 15 | SUNSHINE |  | POSSIBILITY OF INFLOW WATER IS DETERMINED BASED ON SUNSHINE AND TYPE OF MOSS |
| ⋮ | | ⋮ | ⋮ |
| 97 | POLE, UTILITY POLE | 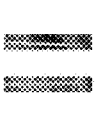 | ASSIGN TO OBJECT TO WHICH NO SIGN OR SIGNBOARD IS ATTACHED ASSIGN THIS TAG, IF SIGN OR SIGNBOARD IS REGARDED AS A SUBSTANTIALLY STRAIGHT LINE WHEN HORIZONTALLY ORIENTED |
| 98 | SIGN, SIGNBOARD | 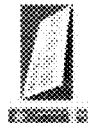 | ASSIGN TO OBJECT TO WHICH NO FRAME IS ASSIGNED INCLUDING SUPPORT OR FIXING JIG TO WHICH SIGN OR SIGNBOARD IS ATTACHED |

FIG. 9A

ACQUIRED DATA MANAGEMENT TABLE

FOLDER NAME; SY4950

| CAPTURED-IMAGE DATA | SENSOR DATA | ACQUISITION TIME |
|---|---|---|
| R0509tm | S9579kj | 2020/3/6 14:05:50.904863 |
| R0510tm | S9580kj | 2020/3/6 14:05:51.208568 |
| R0511tm | S9581kj | 2020/3/6 14:05:51.807980 |
| ... | ... | ... |

FIG. 9B

PROCESSED DATA MANAGEMENT TABLE

FOLDER NAME; TM0615

| EVALUATION TARGET DATA | EVALUATION DATA | POSITIONING DATA | COMMENT |
|---|---|---|---|
| C3467im | P1276th | NORTH LATITUDE XX, EAST LONGITUDE YY | ROUTE NAME; RIKOU LINE _ INBOUND _ ROUTE 1 |
| C3468im | P1277th | NORTH LATITUDE XZ, EAST LONGITUDE YZ | ... |
| C3469im | P1278th | NORTH LATITUDE XY, EAST LONGITUDE YX | ... |
| ... | ... | ... | ... |

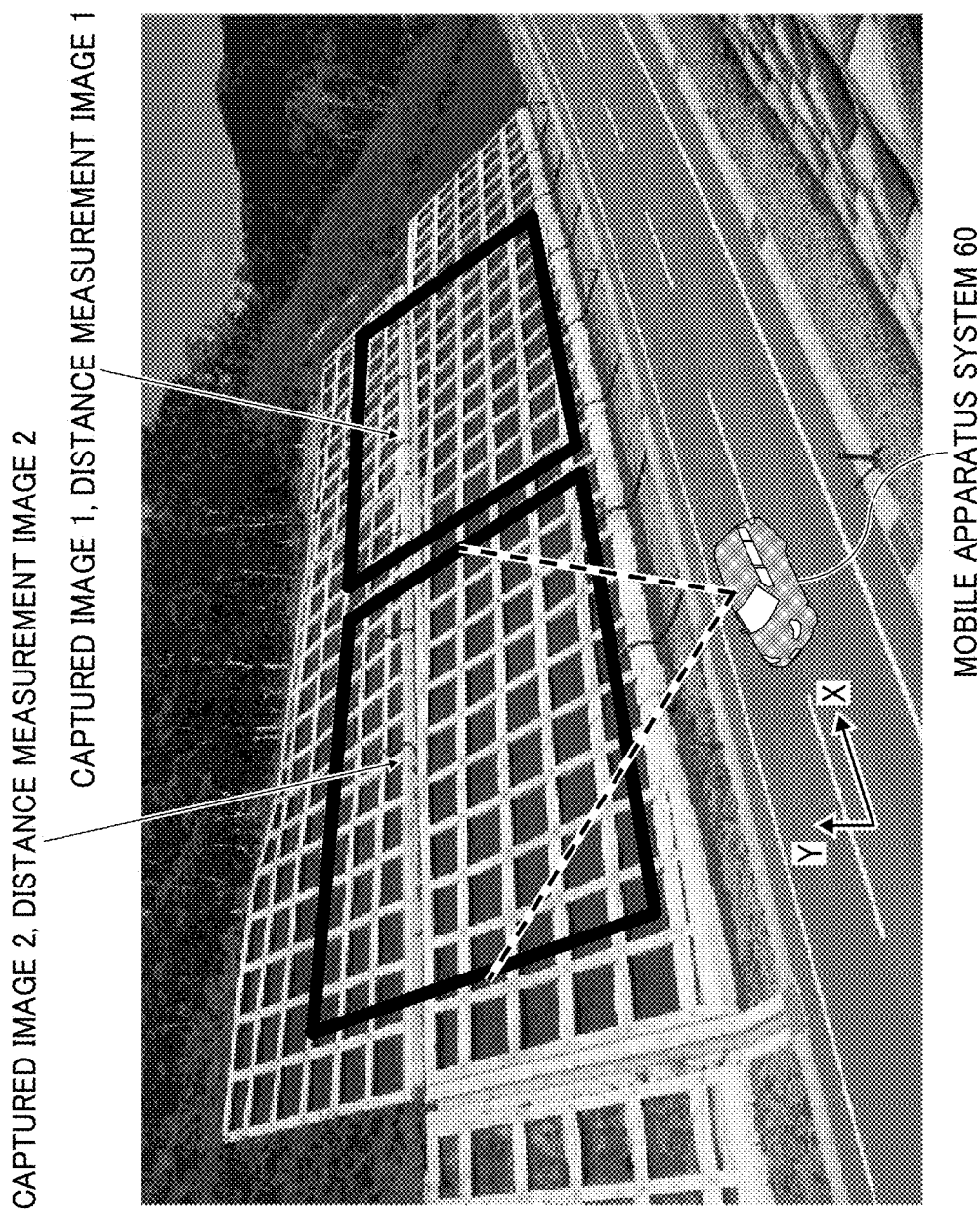

FIG. 22D
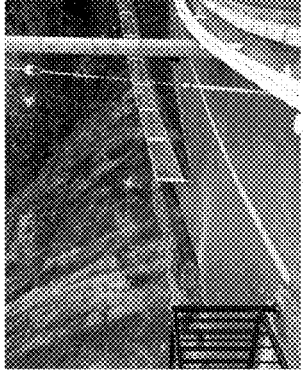
FIG. 22C
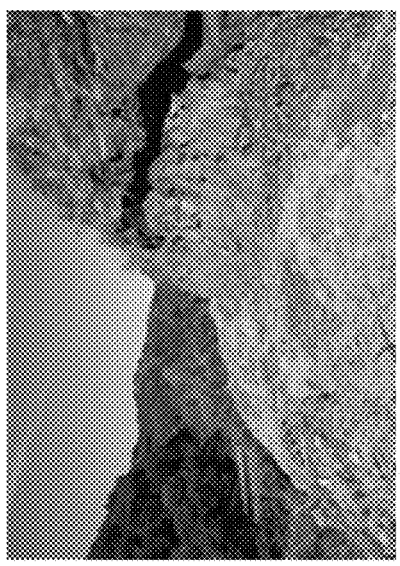
FIG. 22G
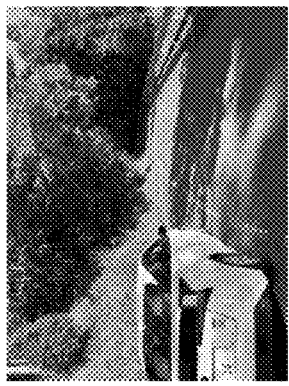
FIG. 22F
FIG. 22I
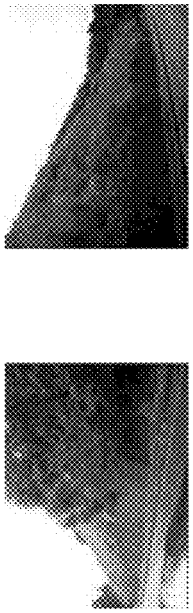
FIG. 22B
FIG. 22A
FIG. 22E
FIG. 22H

FIG. 23

Evaluation Report page1

| Route name | Current road/old road classification | Inbound/out-bound classi-fication | Reference Number | ... | Location | Longitude and latitude (world geodetic system) | | | |
|---|---|---|---|---|---|---|---|---|---|
| Rikou road_route 1 | Cur-rent road | Inbound | | | | | Start point | North latitude X° Z' Y" | East longitude A° Y' Z" |
| Facility extension | Date of completion | Inbound/out-bound classi-fication | Facility type | Latest repair history | Cut slope | | End point | North latitude X° Z' A" | East longitude A° Y' X" |
| 200m | | Unknown | | | Unknown | | | | |

[Position Map]

Survey position

[Evaluation Result]

Evaluation Date: XX/XX/XX
Findings; ......

FIG. 25
page3
Current status photograph
| Photo No. 1 | Cut slope |
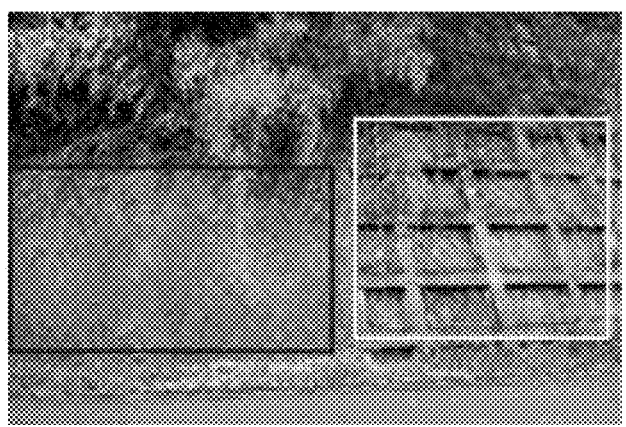
Comment
..........
| Photo No. 2 | P1; Crack 5mm |
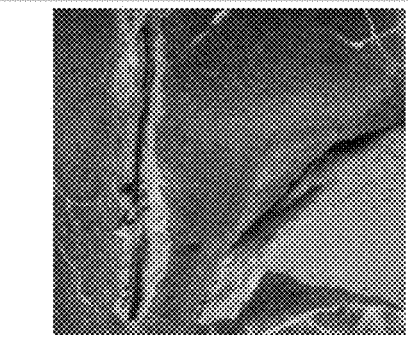
| Photo No. 3 | P2; Crack 2mm |
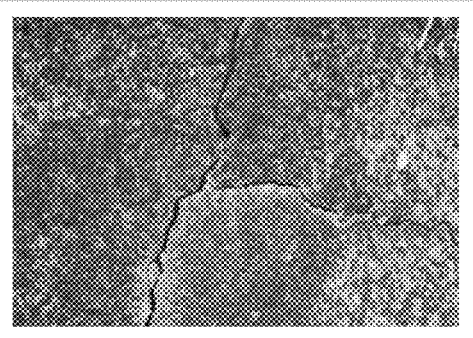
| Photo No. 4 | P3; Wire mesh exposure |
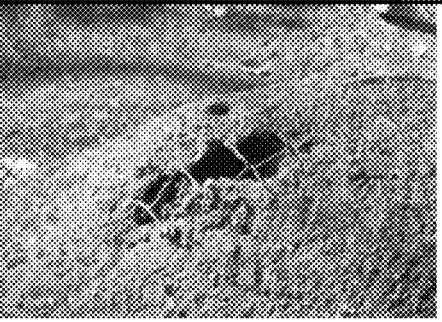
| Photo No. 5 | P4; Separation |

FIG. 29
page3
Current status photograph
| Photo No. 1 | Cut slope |
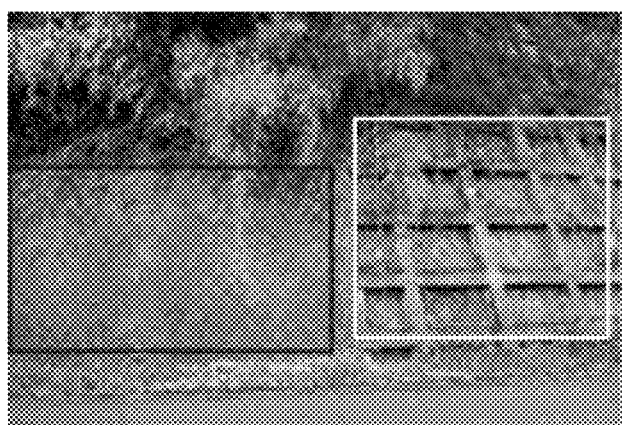
Comment
..........
| Photo No. 2 | P1; Inflow water | ~1401
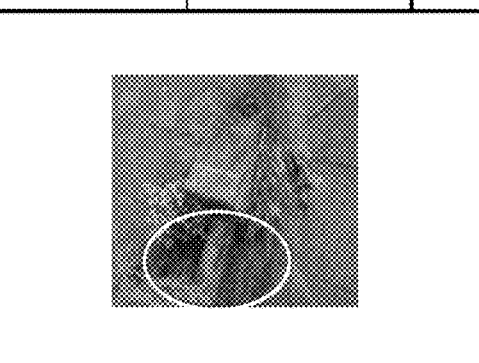
| Photo No. 3 | P2; moss | ~1402
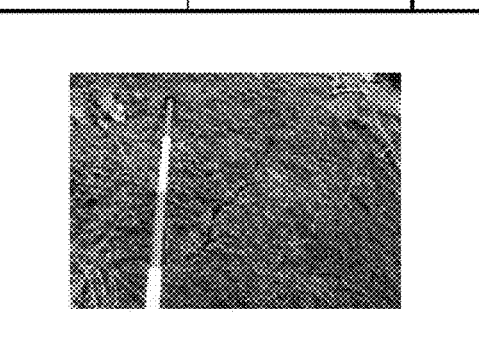
| Photo No. 4 | P3; Sunshine | ~1403
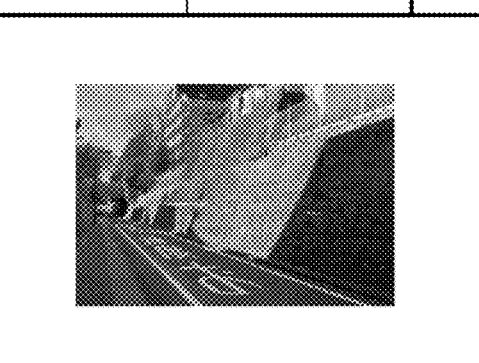
| Photo No. 5 | P4; Earth and sand | ~1404
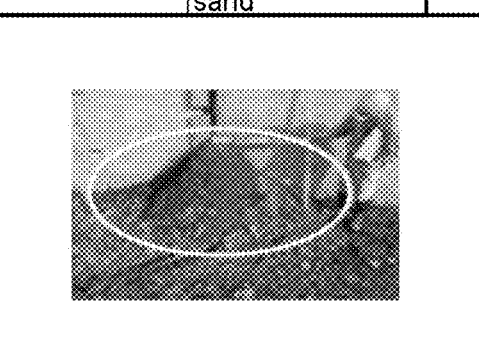

FIG. 30
page3
Current status photograph
| Photo No. 1 | Cut slope |
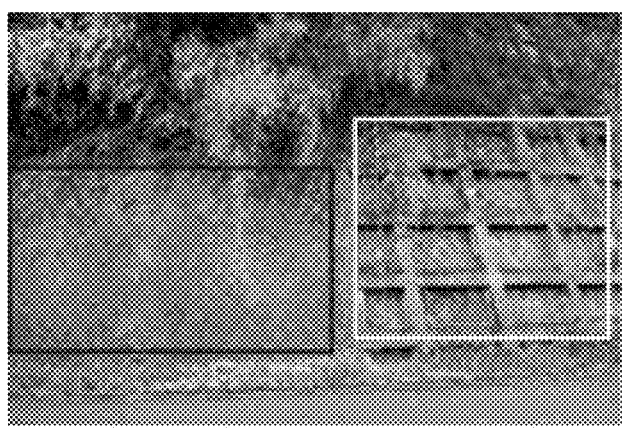
Comment
..........
| Photo No. 2 | P1; Joint displacement | ~1411
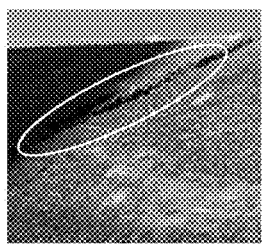
| Photo No. 3 | P2; Block displacement | ~1412
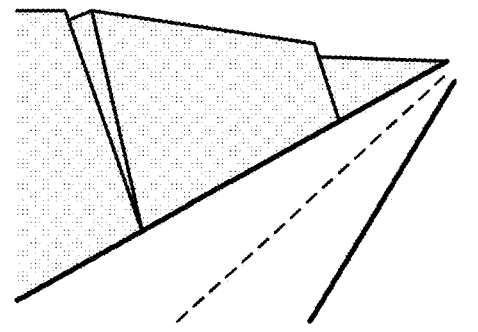
| Photo No. 4 | P3; Drainage hole clogging | ~1413
| Photo No. 5 | P4; Drainage channel clogging | ~1414
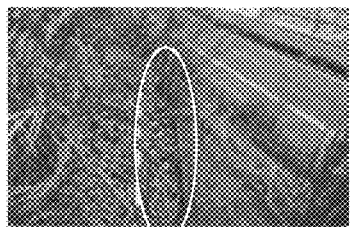

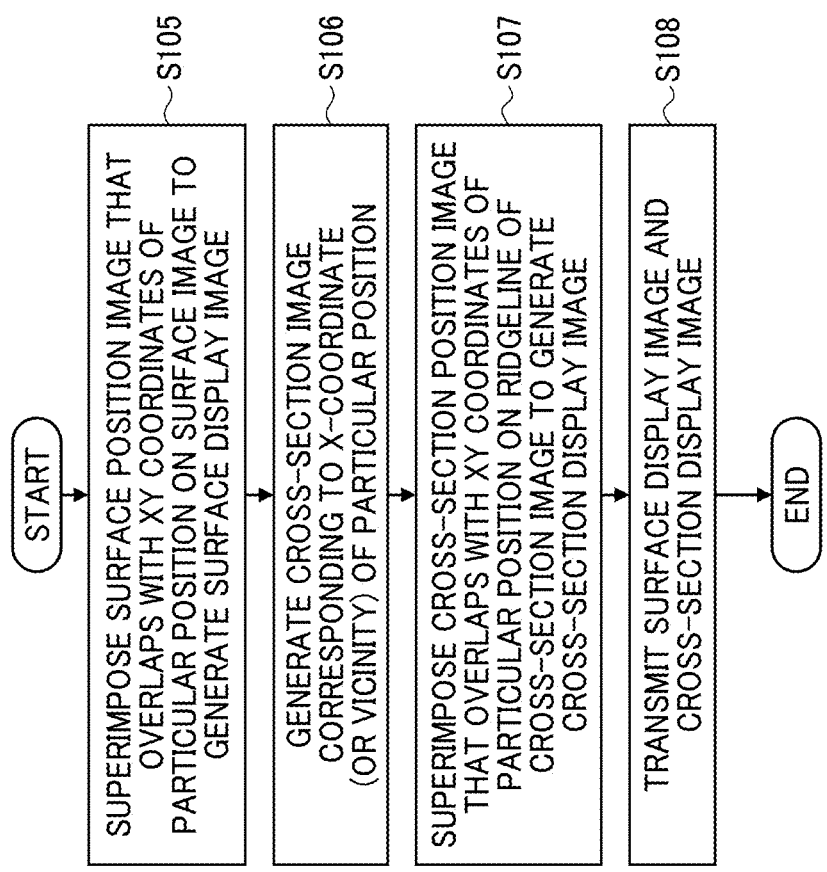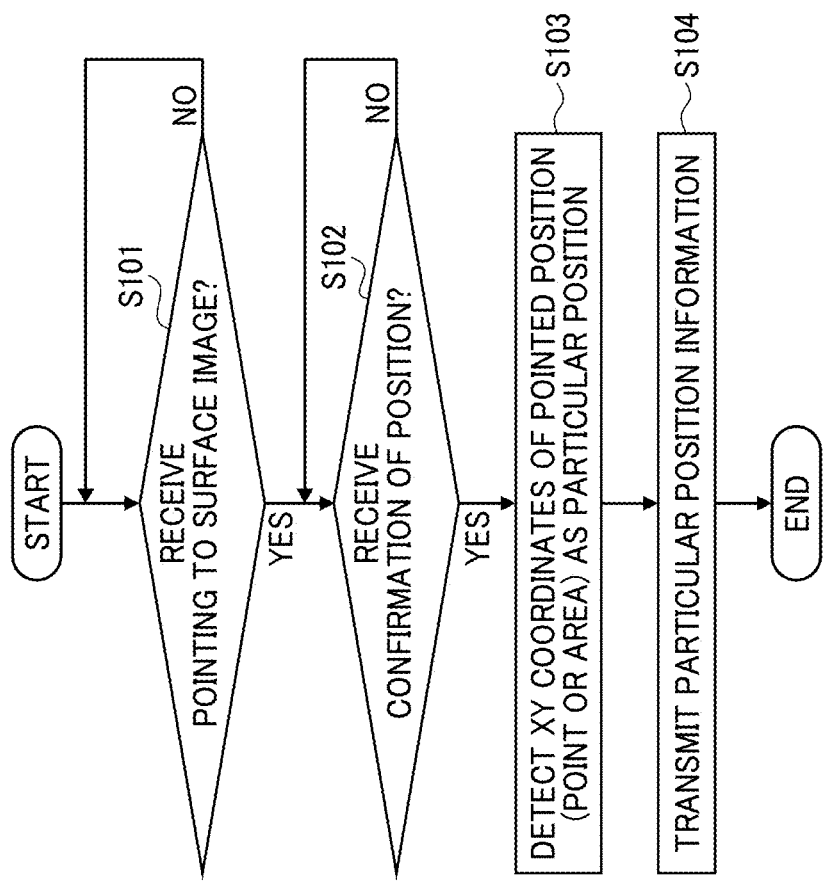

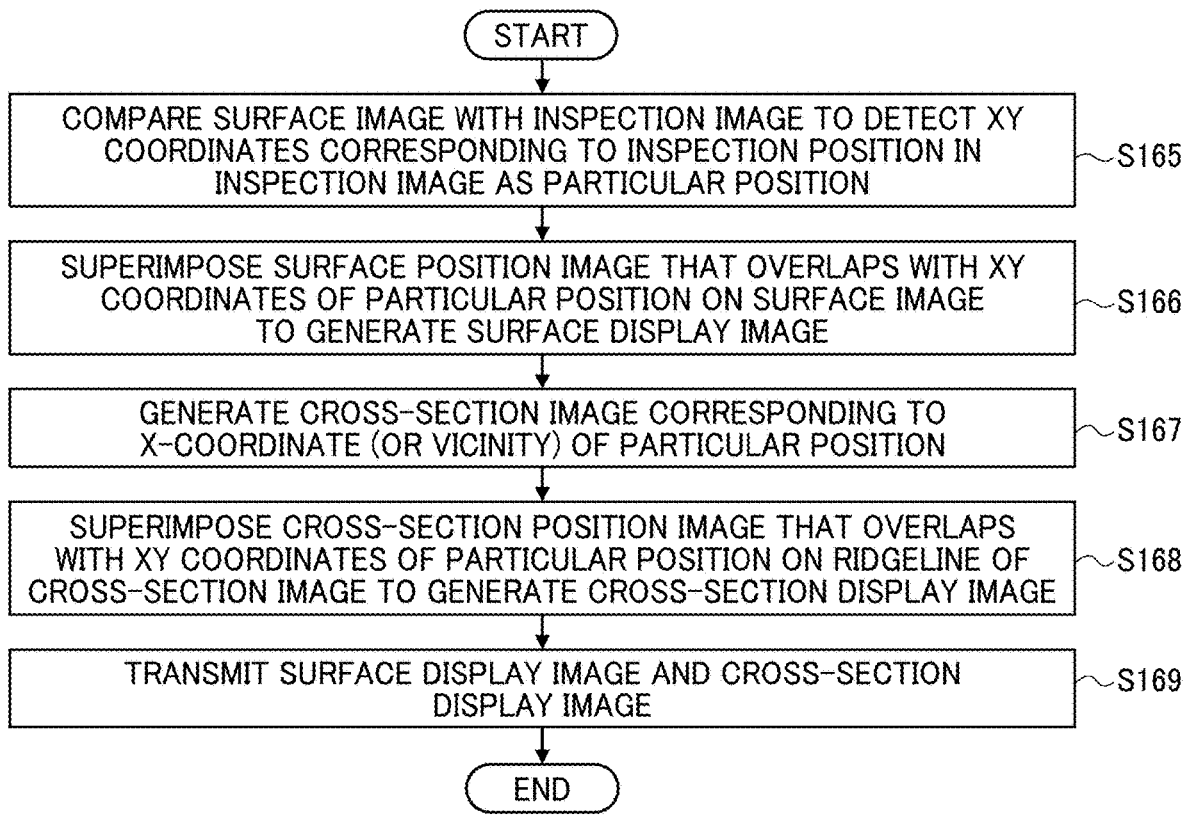

INFORMATION PROCESSING APPARATUS, INFORMATION PROCESSING SYSTEM, APPARATUS, AND METHOD GENERATES SURFACE AND CROSS-SECTION IMAGES INDICATING PARTICULAR POSITIONS, AND NON-TRANSITORY COMPUTER-EXECUTABLE STORAGE MEDIUM

CROSS-REFERENCE TO RELATED APPLICATION

This patent application is based on and claims priority pursuant to 35 U.S.C. § 119(a) to Japanese Patent Application No. 2021-158613, filed on Sep. 29, 2021, in the Japan Patent Office, the entire disclosure of which is hereby incorporated by reference herein.

BACKGROUND

Technical Field

The present disclosure relates to an information processing apparatus, an information processing system, an information processing method, and a non-transitory computer-executable medium.

Related Art

A technology is known that performs survey calculation and area calculation on a synthetic three-dimensional photograph image by design drawing creation means such as computer-aided design (CAD), to create a front view displaying only a deteriorated portion and a cross-sectional view.

SUMMARY

An embodiment of the present disclosure includes an information processing apparatus including circuitry. The circuitry creates a surface image of the object and a cross-section image of the object. The circuitry receives a creation instruction that instructs to create an image indicating a particular position in an object. The circuitry creates a surface position image indicating the particular position in the surface image and a cross-section position image indicating the particular position in the cross-section image according to the received creation instruction.

An embodiment of the present disclosure includes an information processing system. The information processing system includes an information processing apparatus including first circuitry and a communication terminal including second circuitry and being communicable with the information processing apparatus through a communication network. The first circuitry of the information processing apparatus creates a surface image of the object and a cross-section image of the object. The first circuitry transmits information relating to a generation instruction reception screen to be displayed at the communication terminal to the communication terminal through the communication network. The first circuitry receives a creation instruction that instructs to create an image indicating a particular position in an object. The second circuitry of the communication terminal displays the generation instruction reception screen on a display. The second circuitry receives the creation instruction that instructs to create the image indicating the particular position in the object. The second circuitry transmits the creation instruction to the information processing apparatus through the communication network. The first circuitry of the information processing apparatus creates a surface position image indicating the particular position in the surface image and a cross-section position image indicating the particular position in the cross-section image according to the creation instruction transmitted from the communication terminal.

An embodiment of the present disclosure includes an information processing method. The method includes receiving a creation instruction that instructs to create an image indicating a particular position in an object. The method includes creating a surface image indicating a surface of the object and a cross-section image indicating a cross-section of the object. The method includes creating includes creating a surface position image indicating the particular position in the surface image and a cross-section position image indicating the particular position in the cross-section image according to the received creation instruction.

An embodiment of the present disclosure includes a non-transitory computer-executable medium storing a program that causes a computer to perform the above-described information processing method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 6 is a block diagram illustrating an example of a functional configuration of the state inspection system, according to an embodiment of the present disclosure;

FIG. 7 is an illustration of an example of a state type management table, according to an embodiment of the present disclosure;

FIG. 8 is an illustration of an example of a state type management table, according to an embodiment of the present disclosure;

FIG. 9A is an illustration of an example of an acquired data management table, according to an embodiment of the present disclosure;

FIG. 9B is an illustration of an example of a processed data management table, according to an embodiment of the present disclosure;

FIG. 10 is an illustration for describing a captured image acquired by the mobile apparatus system, according to an embodiment of the present disclosure;

FIG. 22A to FIG. 22I are illustrations of examples of site information stored in association with map information, according to an embodiment of the present disclosure;

FIG. 23 is an illustration of an example of an evaluation report generated by the evaluation apparatus, according to an embodiment of the present disclosure;

FIG. 25 is an illustration of an example of an evaluation report generated by the evaluation apparatus, according to an embodiment of the present disclosure;

FIG. 29 is an illustration of an example of an evaluation report including a result of sign detection, according to an embodiment of the present disclosure;

FIG. 30 is an illustration of another example of an evaluation report including a result of sign detection, according to an embodiment of the present disclosure;

FIG. 36A and FIG. 36B are flowcharts of processes based on an operation described referring to FIG. 33, according to an embodiment of the present disclosure;

FIG. 49 is a flowchart of a modification of processes relating to surface image comparison, according to an embodiment of the present disclosure;

Figure 1:
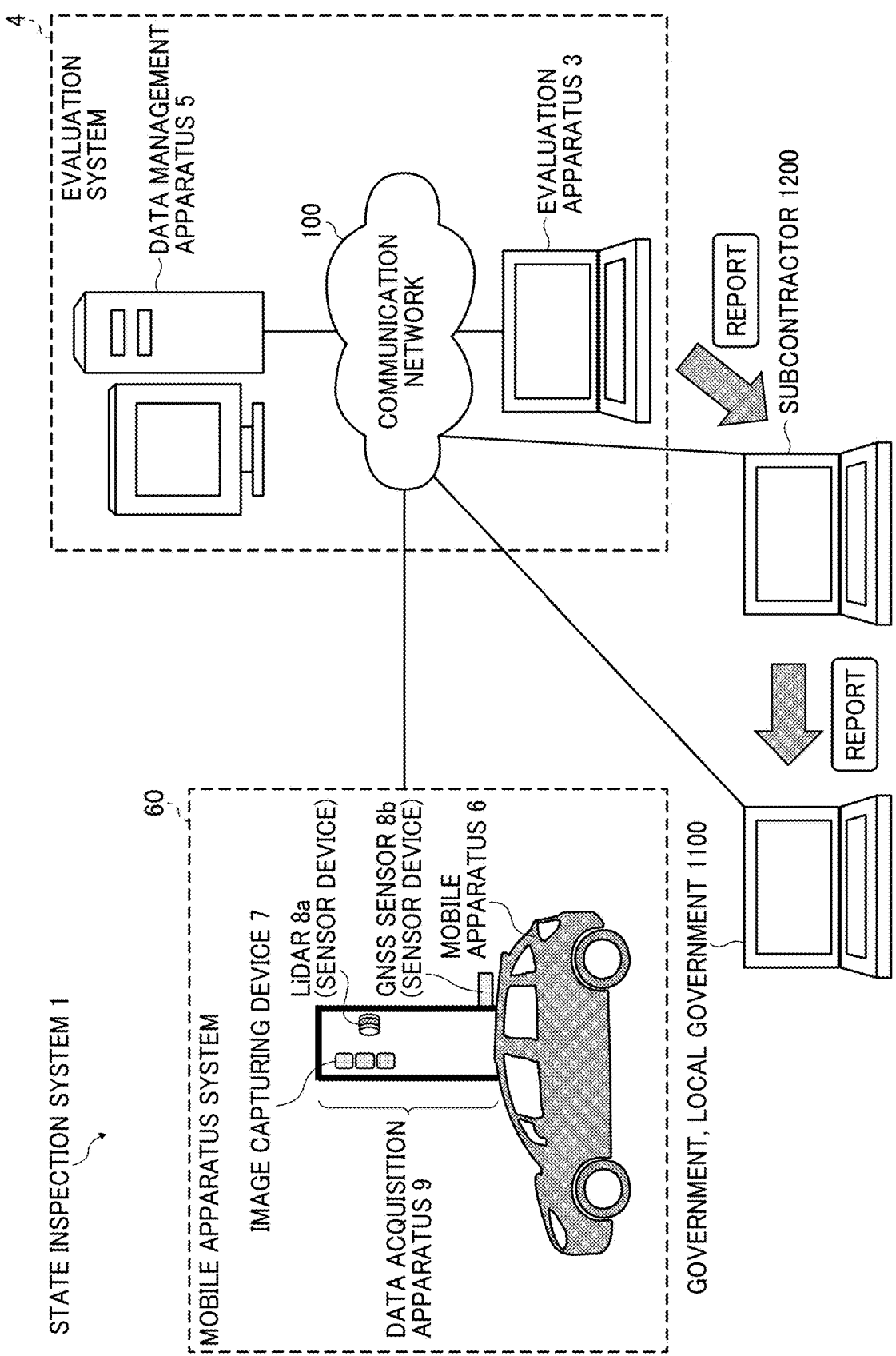
FIG. 1 is a schematic view of an overall configuration of a state inspection system, according to according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described with reference to the drawings. In the description of the drawings, the same elements are denoted by the same reference numerals, and redundant descriptions thereof are omitted.

First Embodiment

Figure 2:
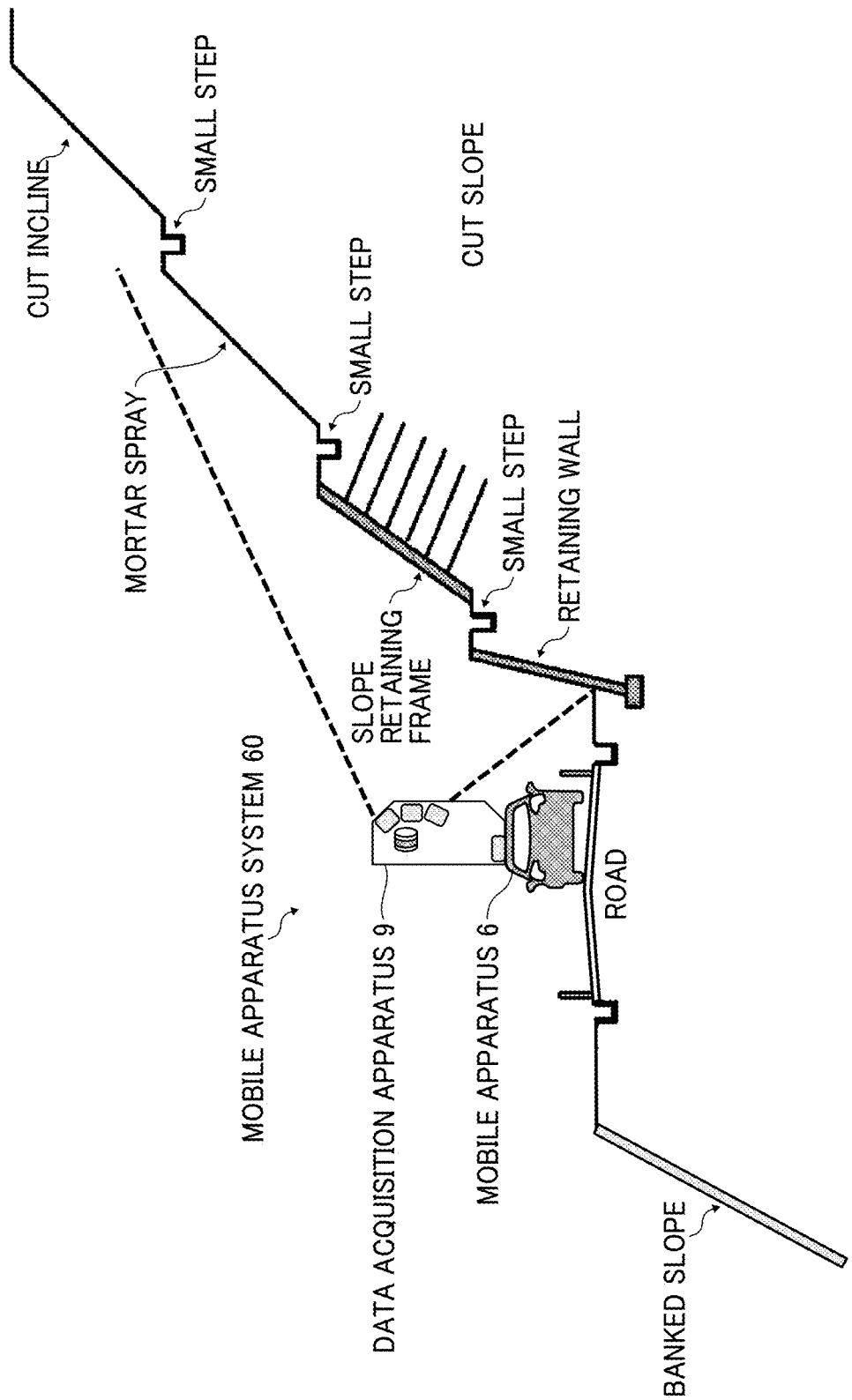
FIG. 2 is an illustration of an example of a situation in which a state of a slope is inspected using a mobile apparatus system, according to an embodiment of the present disclosure.

Overview of System:

Referring to FIG. 1 and FIG. 2, an overview of a state inspection system 1 is described according to an embodiment. FIG. 1 is a schematic view illustrating an overall configuration of the state inspection system 1 according to one of the embodiments. The state inspection system 1 illustrated in FIG. 1 is an example of an information processing system. The state inspection system 1 inspects a state of a road earthwork structure using various data acquired by a mobile apparatus system 60. The road earthwork structure is a term that collectively refers to structures made of ground materials as a main material such as earth and sand or rocks for constructing road, and structures associated with such the structures made of ground materials as a main material. For example, the road earthwork structure refers to facilities for stabilizing cut slopes and slopes, embarkments, culverts, and other similar items. In the following description, the road earthwork structure is referred to as a "slope".

The state inspection system 1 includes the mobile apparatus system 60, an evaluation system 4, a terminal apparatus 1100 of a national government or a local government, and a terminal apparatus 1200 of a subcontractor. The mobile apparatus system 60 includes a data acquisition apparatus 9 and a mobile apparatus 6 such as a vehicle. The data acquisition apparatus 9 is mounted on the mobile apparatus 6. The data acquisition apparatus 9 includes an image capturing device 7, a distance sensor 8a, and a global navigation satellite system (GNSS) sensor 8b. The image capturing device 7 is an example of a measuring device that measures a structure. GNSS is a term that collectively refers to satellite positioning systems such as a global positioning system (GPS) or quasi-zenith satellite (QZSS).

The image capturing device 7 is a line camera including a line sensor in which photoelectric conversion elements are arranged in one or more rows. The image capturing device 7 photographs a position along a predetermined photographing range on a photographing surface along a direction of travel of the mobile apparatus 6. The line camera is merely one example of the image capturing device. In another example, a camera including an area sensor in which photoelectric conversion elements are arranged in a plane may be used as the image capturing device 7. In another example, the image capturing device 7 may be implemented by multiple cameras.

The distance sensor 8a is a time-of-flight (ToF) sensor. The distance sensor 8a measures a distance from a subject photographed by the image capturing device 7. The GNSS sensor 8b is a position measuring device that measures a position on the earth by receiving signals transmitted from multiple GNSS satellites at multiple times and calculating distances to the satellites based on differences from the times at which the signals are received. The position measuring device may be a device dedicated to position measuring or an application dedicated to position measuring installed in, for example, a personal computer (PC) or a smartphone. The distance sensor 8a and the GNSS sensor 8b are examples of a sensor device. The distance sensor 8a is an example of a three-dimensional sensor.

The ToF sensor used as the distance sensor 8a emits laser light to an object from a light source and measures light scattered or reflected on the object, to measure a distance from the light source to the object.

In the present embodiment, the distance sensor 8a is a light detection and ranging (LiDAR) sensor. The LiDAR is a technology that measures a light flight time using pulses. Alternatively, as another method of the ToF sensor, the distance may be measured using a phase difference detection method. In the phase difference detection method, laser light on which amplitude-modulation at a fundamental frequency has been performed is emitted to an area to be measured and light reflected on the area to be measured is received. A phase difference between the emitted light and the reflected light is measured to obtain time. The time is multiplied by the speed of light, thereby a distance is obtained. Alternatively, the distance sensor 8a may be implemented by, for example, a stereo camera.

By using the three-dimensional sensor, the mobile apparatus system 60 can obtain three-dimensional information that is difficult to obtain from a two-dimensional image, such as a height of a slope, an inclination angle, or swelling.

An angle sensor 8c may be further mounted on the mobile apparatus system 60. The angle sensor 8c is, for example, a gyroscopic sensor for detecting an angle (posture) or angular velocity (or each acceleration) of the photographing direction of the image capturing device 7.

The evaluation system 4 includes an evaluation apparatus 3 and a data management apparatus 5. The evaluation apparatus 3 and the data management apparatus 5 of the evaluation system 4 are communicable with the mobile apparatus system 60, the terminal apparatus 1100, and the terminal apparatus 1200 through a communication network 100. The communication network 100 includes the Internet, a mobile communication network, and a local area network (LAN), for example. The communication network 100 includes a network by not only wired communications but also a network by wireless communications such as 3rd generation (3G), 4th generation (40), 5th generation (5G), Wireless Fidelity (Wi-Fi®), Worldwide Interoperability for Microwave Access (WiMAX), or Long Term Evolution (LTE).

Further, the evaluation apparatus 3 and the data management apparatus 5 may have communication capability using a short-range communication technology such as near field communication (NFC®).

The data management apparatus 5 is an example of an information processing apparatus. The data management apparatus 5 is a computer such as a PC that manages various data acquired by the data acquisition apparatus 9. The data management apparatus 5 receives various acquired data from the data acquisition apparatus 9 and transfers the received various acquired data to the evaluation apparatus 3 that performs data analysis. The transfer of the various acquired data from the data management apparatus 5 to the evaluation apparatus 3 may performed manually, for example, using a universal serial bus (USB) memory.

The evaluation apparatus 3 is a computer such as a PC that evaluates a state of a slope based on the various acquired data transferred from the data management apparatus 5. The evaluation apparatus is installed with a dedicated application program for evaluating a state of a slope is installed in the evaluation apparatus 3. The evaluation apparatus 3 detects a type or structure of the slope according to captured image data and sensor data to extract shape data, and performs detailed analysis such as detecting the presence or absence of a deformation and the degree of the deformation. Further, the evaluation apparatus 3 generates a report using the captured image data, the sensor data, data to be evaluated, and the detailed analysis result. The report is to be submitted to an entity in charge of roads such as a national government, a local government, or a subcontractor.

Data of the report generated by the evaluation apparatus 3 is submitted to the national government or the local governments via the subcontractor in the form of electronic data or printed documents. The report generated by the evaluation apparatus 3 is referred to as a "survey record sheet", a "check list", a "survey profile", or "records", for example. The PC is merely one example of the evaluation apparatus 3. Alternatively, a smartphone, a tablet terminal, or the like may be used for the evaluation apparatus 3. In another example, the evaluation apparatus 3 and the data management apparatus 5 of the evaluation system 4 are constructed as a single apparatus or terminal.

The terminal apparatus 1200 is provided in the subcontractor. The terminal apparatus 1100 is provided in the national government or the local government. The evaluation apparatus 3, the terminal apparatus 1100, and the terminal apparatus 1200 are examples of communication terminals communicable with the data management apparatus 5. Various data managed by the data management apparatus 5 can be viewed at the evaluation apparatus 3, the terminal apparatus 1100, and the terminal apparatus 1200.

FIG. 2 is an illustration of an example of a situation in which a state of a slope is inspected using the mobile apparatus system 60, according to the embodiment. As illustrated in FIG. 2, the mobile apparatus system 60 photographs a predetermined area of the slope with the image capturing device 7 as causing the mobile apparatus 6 equipped with the data acquisition apparatus 9 to travel on a road.

As illustrated in FIG. 2, in the slope, a slope constructed by cutting a natural slope is referred to as a "cut slope", and a slope filled with soil is referred to as a "banked slope". A slope on the side of a road running along the side of a mountain is referred to as a "natural slope". Cut slopes and banked slopes can be made more durable by planting plants on the surface of the slopes, and can be left unchanged for several decades. However, in other cases, as deterioration of cut slopes, banked slopes, and natural slopes progresses due to wind and rain, a surface layer collapse occurs in which rocks and soil on the surface fall or a collapse occurs in which mountains collapse to cause road blockage. In order to avoid such a situation, a method is adopted in which mortar is sprayed on the surface of the slope (mortar spraying), or a concrete structure is installed and hardened to slow down the speed at which slopes deteriorates due to wind and rain. A structure constructed by the above method is called an earthwork structure. The earthwork structure includes, for example, a retaining wall installed between a natural slope and a road, a rockfall protection fence for preventing falling rocks from falling onto a road. Such the earthwork structure is for preventing prevent road blockade or human damage caused by the outflow of earth and sand, or fallen rocks to a road.

In recent years, the deterioration of earthwork structures constructed several decades ago is remarkable, and the maintenance of social infrastructure is a major issue. For this reason, deterioration of earthwork structures has to be detected at an early stage, inspection and aging maintenance have to be performed to extend the life of earthwork structures. As known in the related art, an inspection of natural slopes and earthwork structures includes investigating fallen rocks, collapses, landslides or debris flow on slopes to prepare a repair plan. In the related art, the inspection is performed by visual inspections by experts.

However, visual inspections by experts have drawbacks in terms of efficiency, such as the inability to inspect many earthwork structures in the country in a certain period of time, and the impossibility of inspecting embankments at high places or along rivers. Further, by visual inspection, the degree of progress of deformation such as cracks or separations that occur on surface layers of earthwork structures cannot be quantitatively recognized.

To address an issue as described above, the state inspection system 1 according to an embodiment acquires captured image data of an earthwork structure slope using the image capturing device 7, and acquires sensor data including three-dimensional information by a three-dimensional sensor such as the distance sensor 8a. The evaluation system 4 evaluates the state of the slope by combining the acquired captured image data and sensor data, to detect shape data indicating a three-dimensional shape of the slope and detect deformations such as cracks or separations. With this configuration, the state inspection system 1 can efficiently perform an evaluation that is difficult by human visual inspection.

Figure 3B:
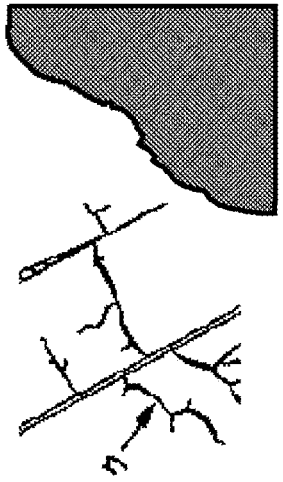
FIG. 3A to FIG. 3F are illustrations for describing issues to be addressed, according to an embodiment of the present disclosure.
Figure 3D:
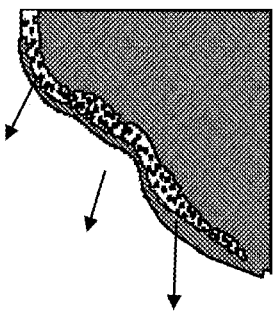
Figure 3F:
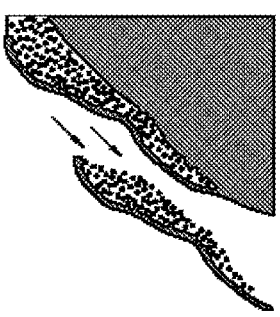
Figure 3A:

FIG. 3A to FIG. 3F are illustrations for describing issues to be addressed, according to an embodiment. FIG. 3A is an image of a surface of a slope that is captured five years before the collapse of the slope. FIG. 3B is an explanatory view of the image of FIG. 3A. A state indicated by FIG. 3A and FIG. 3B is a stage in which cracks on the surface layer of the slope are conspicuous. For this state, image analysis indicated in, for example, a developed view is effective for detecting deformation or signs of deformation of the surface layer such as cracks, separations, or inflow water.

Figure 3C:
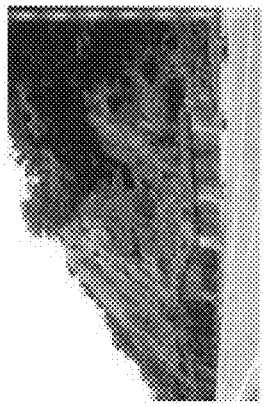

FIG. 3C is an image of a surface of the slope captured two years before the collapse thereof. FIG. 3D is an explanatory view of the image of FIG. 3C. A state indicated by FIG. 3C and FIG. 3D is a stage in which the inside of the slope changes to earth and sand, the earth and sand pushes the surface layer of the slope, and thereby the slope swells. For this state, a three-dimensional analysis using a combination of an image such as a development view and a cross-sectional view is effective for detecting three-dimensional deformation such as bumps with cracks and swellings.

Figure 3E:

FIG. 3E is an image of a collapsed slope. FIG. 3F is an explanatory view of the image of FIG. 3E. As indicted by FIG. 3E and FIG. 3F, the surface layer of the slope collapses as the surface layer is too weakened to contain earth and sand.

With regard to the above-described issue, according to the related art, a position of a deteriorated part and a state of an inside of the deteriorated part can be checked using a front view and a cross-sectional view. However, when the front view and the cross-sectional view are compared with each other, there is room for improvement from the viewpoint of, for example, visually checking where a part having a hollow in the cross-sectional view is in the front view.

In view of such an issue, according to one or more embodiments of the present disclosure, the data management apparatus 5, the state inspection system 1, an information processing method performed by the data management apparatus 5 or the evaluation apparatus 3, and a program are provided that implements an appropriate check of a state of a particular position of a slope by comparing an image of a surface of the slope, which is an example of an object, with an image of a cross section of the slope.

Figure 4:
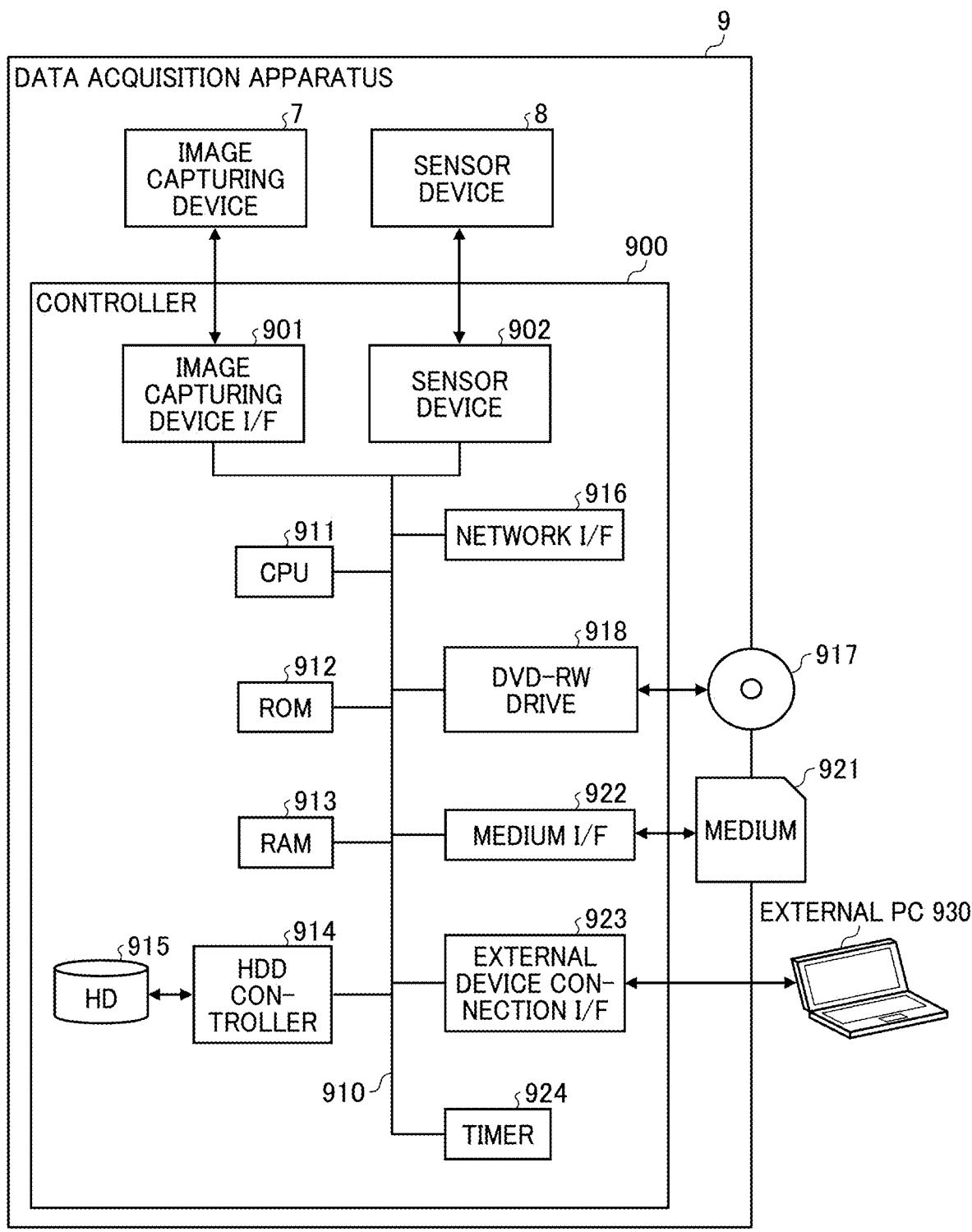
FIG. 4 is a block diagram illustrating an example of a hardware configuration of a data acquisition apparatus, according to an embodiment of the present disclosure.
Figure 5:
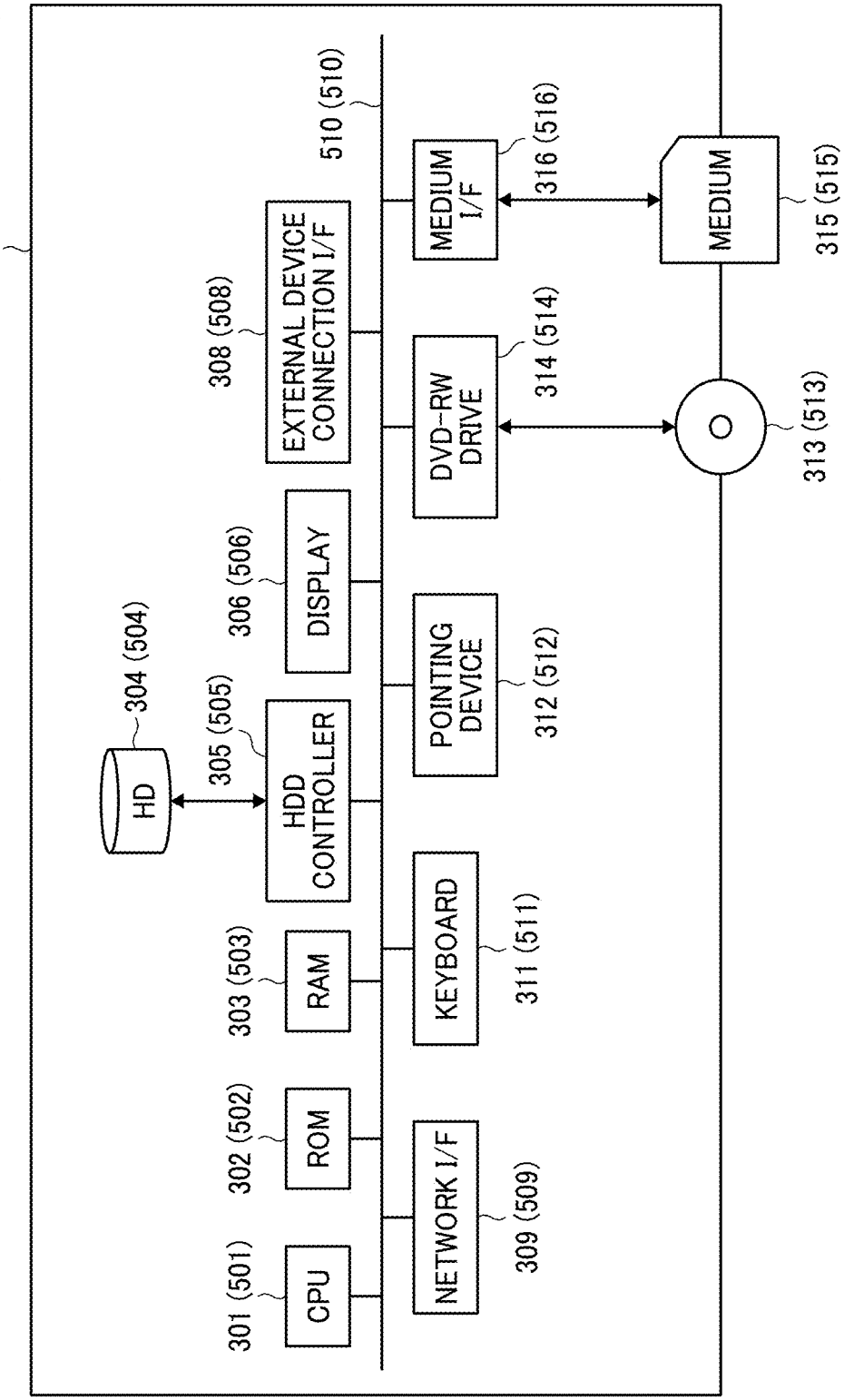
FIG. 5 is a block diagram illustrating an example of a hardware configuration of each of an evaluation apparatus and a data management apparatus, according to an embodiment of the present disclosure.

Hardware Configuration:

Referring to FIG. 4 and FIG. 5, a hardware configuration of each of the apparatuses of the state inspection system 1 is described. In the hardware configurations illustrated in FIG. 4 and FIG. 5, components or elements may be added or deleted as needed.

Hardware Configuration of Data Acquisition Apparatus:

FIG. 4 is a block diagram illustrating an example of a hardware configuration of the data acquisition apparatus 9. The data acquisition apparatus 9 includes the image capturing device 7 and the sensor device 8 as illustrated in FIG. 1, and a controller 900 that controls processing or operation of the data acquisition apparatus 9.

The controller 900 includes an image capturing device interface (I/F) 901, a sensor device I/F 902, a bus line 910, a central processing unit (CPU) 911, a read only memory (ROM) 912, a random access memory (RAM) 913, a hard disk (HD) 914, a hard disk drive (HDD) controller 915, a network I/F 916, a digital versatile disk rewritable (DVD-RW) drive 918, a medium I/F 922, an external device connection I/F 923, and a timer 924.

The image capturing device I/F 901 is an interface through which the controller 900 transmits and receives various data or information to and from the image capturing device 7. The sensor device I/F 902 is an interface through which the controller 900 transmits and receives various data or information to and from the sensor device 8. Examples of the bus line 910 include, but are not limited to, an address bus and a data bus that electrically connects the components illustrated in FIG. 4 such as the CPU 911.

The CPU 911 controls overall operation of the data acquisition apparatus 9. The ROM 912 stores a program such as an initial program loader (IPL) to boot the CPU 911. The RAM 913 is used as a work area for the CPU 911. The HD 914 stores various data such as programs. The HDD controller 915 controls reading or writing of various data to or from the HD 914 under control of the CPU 911. The network I/F 916 is an interface that controls communication of data with an external device through the communication network 100.

The DVD-RW drive 918 controls reading or writing of various data to or from a DVD-RW 917, which is an example of a removable storage medium. In another example, the removable storage medium includes at least one of digital versatile disk-recordable (DVD-R) or a Blu-ray® disc, in addition to or in alternative to the DVD-RW. The medium I/F 922 controls reading or writing (storing) of data from or to a storage medium 921 such as a flash memory. The external device connection I/F 923 is an interface that connects the data acquisition apparatus 9 to an external PC 930 including a display, an operation receiving device, and a display controller. The timer 924 is a measurement device that has a time measurement function.

The timer 924 may be a computer-based software timer.

Hardware Configuration of Evaluation Apparatus:

FIG. 5 is a block diagram illustrating an example of a hardware configuration of the evaluation apparatus 3. Each hardware component of the evaluation apparatus 3 is denoted by a reference numeral in 300 series. As illustrated in FIG. 5, the evaluation apparatus 3 is implemented by a computer. Specifically, the evaluation apparatus includes a CPU 301, a ROM 302, a RAM 303, an HD 304, an HDD controller 305, a display 306, an external device connection I/F 308, a network I/F 309, a bus line 310, a keyboard 311, a pointing device 312, a DVD-RW drive 314, and a medium I/F 316.

The CPU 301 controls overall operation of the evaluation apparatus 3. The ROM 302 stores a program such as an IPL to boot the CPU 301. The RAM 303 is used as a work area for the CPU 301. The HD 304 stores various data such as programs. The HDD controller 305 controls reading or writing of various data to or from the HD 304 under control of the CPU 301. The display 306 displays various information such as a cursor, a menu, a window, characters, or an image. The display 306 is an example of a display (display device). The external device connection I/F 308 is an interface that connects the evaluation apparatus 3 to various external devices. Examples of the external devices include, but are not limited to, a USB memory and a printer. The network I/F 309 is an interface that controls communication of data through the communication network 100. The bus line 310 is an address bus or a data bus, which electrically connects the components illustrated in FIG. 5 such as the CPU 301.

The keyboard 311 is an example of an input device including a plurality of keys for inputting characters, numerical values, various instructions, and the like. The pointing device 312 is an example of an input device that allows a user to select or execute a specific instruction, select a target for processing, or move a cursor being displayed. The DVD-RW drive 314 controls reading or writing of various data to or from a DVD-RW 313, which is an example of a removable storage medium. In another example, the removable storage medium includes at least one of digital versatile disk-recordable (DVD-R) or a Blu-ray® disc, in addition to or in alternative to the DVD-RW. The medium I/F 316 controls reading or writing (storing) of data from or to a storage medium 315 such as a flash memory.

Hardware Configuration of Data Management Apparatus:

FIG. 5 is a block diagram illustrating an example of a hardware configuration of the data management apparatus 5. Each hardware component of the data management apparatus 5 is denoted by a reference numeral in 500 series. As illustrated in FIG. 5, the data management apparatus is implemented by a computer. As illustrated in FIG. 5, since the data management apparatus 5 has the same configuration as the evaluation apparatus 3, the description of hardware configuration thereof is omitted below. Further, since each of the terminal apparatus 1100 and the terminal apparatus 1200 is also implemented by a computer and has the same or substantially the same configuration as that of the evaluation apparatus 3, the description of the hardware configuration thereof is omitted below.

For example, any one of the above-described programs is recorded in a file in a format installable or executable on a computer-readable storage medium for distribution. Examples of the storage medium include a compact disc recordable (CD-R), a DVD, a Blu-ray® disc, an SD card, and a USB memory. In addition, such storage medium may be provided in the domestic markets of foreign markets as program products. For example, the evaluation system 4 executes the program to implement an evaluation method according to the present disclosure.

Functional Configuration:

Next, referring to FIG. 6, a functional configuration of the state inspection system 1 according to an embodiment is described.

FIG. 6 is a block diagram illustrating an example of a functional configuration of the state inspection system 1, according to the first embodiment. FIG. 6 illustrates a part of the devices or apparatuses of FIG. 1, which are related to processes or operations described below.

Functional Configuration of Data Acquisition Apparatus:

Referring to FIG. 6, a functional configuration of the data acquisition apparatus 9 is described. The data acquisition apparatus 9 includes a communication unit 91, a determination unit 92, an image capturing device control unit 93, a sensor device control unit 94, a captured image data acquisition unit 95, a sensor data acquisition unit 96, a time data acquisition unit 97, a request receiving unit 98, and a storing and reading unit 99. These units are functions or means implemented by or caused to function by operating one or more hardware components illustrated in FIG. 4 in cooperation with instructions of the CPU 911 according to the program for the data acquisition apparatus loaded from the HD 914 to the RAM 913. The data acquisition apparatus 9 further includes a storage unit 9000 implemented by the ROM 912 and the HD 914 illustrated in FIG. 4. The external PC 930 illustrated in FIG. 4 connected to the data acquisition apparatus 9 illustrated includes a receiving unit and a display control unit.

The communication unit 91 is mainly implemented by the network I/F 916 that operates according to instructions of the CPU 911. The communication unit 91 communicates various data or information with other apparatuses or terminals through the communication network 100. For example, the communication unit 91 transmits acquired data acquired by the captured image data acquisition unit 95 and the sensor data acquisition unit 96 to the data management apparatus 5. The determination unit 92, which is implemented by instructions of the CPU 911, performs various determinations.

The image capturing device control unit 93 is mainly implemented by the image capturing device I/F 901 that operates according to instructions of the CPU 911. The image capturing device control unit 93 control photographing processing by the image capturing device 7. The sensor device control unit 94 is mainly implemented by the sensor device I/F 902 that operates according to instructions of the CPU 911. The sensor device control unit 94 controls data acquisition processing for the sensor device 8.

The captured image data acquisition unit 95 is mainly implemented by the image capturing device I/F 901 that operates according to instructions of the CPU 911. The captured image data acquisition unit 95 acquires captured image data corresponding to a captured image captured by the image capturing device 7. The sensor data acquisition unit 96 is mainly implemented by the sensor device I/F 902 that operates according to instructions of the CPU 911. The sensor data acquisition unit 96 acquires sensor data, which is a result of detection by the sensor device 8. The time data acquisition unit 97 is mainly implemented by the timer 924 that operates according to instructions of the CPU 911. The time data acquisition unit 97 acquires time data that indicates a time at which the captured image data acquisition unit 95 or the sensor data acquisition unit 96 acquires data.

The request receiving unit 98 is mainly implemented by the external device connection I/F 923 that operates according to instructions of the CPU 911. The request receiving unit 98 receives a request from, for example, the external PC 930.

The storing and reading unit 99, which is implemented mainly by instructions of the CPU 911, stores various data (or information) in the storage unit 9000 or reads various types of data (or information) from the storage unit 9000.

Functional Configuration of Evaluation Apparatus:

Referring to FIG. 6, a functional configuration of the evaluation apparatus 3 is described. The evaluation apparatus 3 includes a communication unit 31, a receiving unit 32, a display control unit 33, a determination unit 34, an evaluation target data generation unit 35, a detection unit 36, a map data management unit 37, a report generation unit 38, and a storing and reading unit 39. These units are functions or means implemented by or caused to function by operating one or more hardware components illustrated in FIG. 5 in cooperation with instructions of the CPU 301 according to the program for the evaluation apparatus loaded from the HD 304 to the RAM 303. The evaluation apparatus 3 further includes a storage unit 3000 implemented by the ROM 302 and the HD 304 illustrated in FIG. 5.

The communication unit 31 is mainly implemented by the network I/F 309 that operates according to instructions of the CPU 301. The communication unit 31 communicates various data or information with other apparatuses or terminals through the communication network 100. For example, the communication unit 31 transmits and receives various data relating to an evaluation of a slope state to and from the data management apparatus 5.

The receiving unit 32 is mainly implemented by the keyboard 311 or the pointing device 312 that operates according to instructions of the CPU 301. The receiving unit 32 receives various selections or inputs from the user.

The receiving unit 32 receives various selections or inputs on an evaluation screen 400 described below. The display control unit 33, which is mainly implemented by the instructions of the CPU 301, controls the display 306 to display various images. The display control unit 33 controls the display 306 to display the evaluation screen 400 described below. The determination unit 34, which is implemented by instructions of the CPU 301, performs various determinations. The receiving unit 32 is an example of an operation receiving unit.

The evaluation target data generation unit 35, which is implemented by instructions of the CPU 301, generates data to be evaluated. In the following description, the data to be evaluated may be referred to "evaluation target data". The detection unit 36, which is mainly implemented by instructions of the CPU 301, performs processing of detecting a state of the slope using the evaluation target data generated by the evaluation target data generation unit 35. The map data management unit 37, which is mainly implemented by instructions of the CPU 301, manages map information acquired from, for example, an external server. The map information includes location information at a certain position on a map.

The report generation unit 38, which is mainly implemented by instructions of the CPU 301, generates an evaluation report to be submitted to the entity in charge of roads based on the evaluation result.

The storing and reading unit 39, which is implemented mainly by instructions of the CPU 301, stores various data (or information) in the storage unit 3000 or reads various types of data (or information) from the storage unit 3000.

Functional Configuration of Data Management Apparatus:

Referring to FIG. 6, a functional configuration of the data management apparatus 5 is described. The data management apparatus 5 includes a communication unit 51, a determination unit 52, a data management unit 53, a generation unit 54, and a storing and reading unit 59. These units are functions or means implemented by or caused to function by operating one or more hardware components illustrated in FIG. 5 in cooperation with instructions of the CPU 501 according to the program for the data management apparatus loaded from the HD 504 to the RAM 503. The data management apparatus 5 further includes a storage unit 5000 implemented by the ROM 502 and the HD 504 illustrated in FIG. 5.

The communication unit 51 is mainly implemented by the network I/F 509 that operates according to instructions of the CPU 501. The communication unit 51 communicates various data or information with other apparatuses or terminals through the communication network 100. For example, the communication unit 51 receives captured image data and sensor data transmitted from the data acquisition apparatus 9. Further, the communication unit 51 transmits and receives various data relating to, for example, the evaluation of the slope state to and from the evaluation apparatus 3. The communication unit 51 is an example of an instruction receiving unit. The determination unit 52, which is implemented by instructions of the CPU 501, performs various determinations. The determination unit 52 is an example of is a position generation unit.

The data management unit 53, which is mainly implemented by instructions of the CPU 501, manages various data relating to the evaluation of a slope state. For example, the data management unit 53 registers the captured image data and the sensor data transmitted from the data acquisition apparatus 9 in acquired data management database (DB) 5001.

Further, the data management unit 53 registers, for example, data processed or generated by the evaluation apparatus 3 in a processed data management DB 5003. The generation unit 54, which is mainly implemented by instructions of the CPU 501, generates image data relating to a slope.

The storing and reading unit 59, which is implemented mainly by instructions of the CPU 501, stores various data (or information) in the storage unit 5000 or reads various types of data (or information) from the storage unit 5000.

Functional Configuration of Terminal Apparatus:

Referring to FIG. 6, a functional configuration of the terminal apparatus 1100 is described. The terminal apparatus 1100 includes a communication unit 1101, a receiving unit 1102, a display control unit 1103, a determination unit 1104, and a storing and reading unit 1105. These units are functions or means implemented by or caused to function by operating one or more hardware components illustrated in FIG. 5 in cooperation with instructions of the CPU according to the program for the terminal apparatus loaded from the HD to the RAM. The terminal apparatus 1100 further includes a storage unit 1106 implemented by the ROM and the HD illustrated in FIG. 5.

The communication unit 1101 is mainly implemented by the network I/F that operates according to instructions of the CPU. The communication unit 1101 communicates various data or information with other apparatuses or terminals through the communication network 100.

The receiving unit 102 is mainly implemented by the keyboard or the pointing device that operates according to instructions of the CPU. The receiving unit 1102 receives various selections or inputs from the user. The display control unit 1103, which is mainly implemented by the instructions of the CPU, controls the display of the terminal apparatus 1100 to display various images. The determination unit 1104, which is implemented by instructions of the CPU, performs various determinations. The receiving unit 1102 is an example of an operation receiving unit.

The storing and reading unit 1105, which is implemented mainly by instructions of the CPU, stores various data (or information) in the storage unit 1106 or reads various types of data (or information) from the storage unit 1106.

Referring to FIG. 6, a functional configuration of the terminal apparatus 1200 is described. The terminal apparatus 1200 includes a communication unit 1201, a receiving unit 1202, a display control unit 1203, a determination unit 1204, and a storing and reading unit 1205. These units are functions or means implemented by or caused to function by operating one or more hardware components illustrated in FIG. 5 in cooperation with instructions of the CPU according to the program for the terminal apparatus loaded from the HD to the RAM. The terminal apparatus 1200 further includes a storage unit 1206 implemented by the ROM and the HD illustrated in FIG. 5.

The communication unit 1201 is mainly implemented by the network I/F that operates according to instructions of the CPU. The communication unit 1201 communicates various data or information with other apparatuses or terminals through the communication network 100.

The receiving unit 1202 is mainly implemented by the keyboard or the pointing device that operates according to instructions of the CPU. The receiving unit 1202 receives various selections or inputs from the user. The display control unit 1203, which is mainly implemented by the instructions of the CPU, controls the display of the terminal apparatus 1200 to display various images. The determination unit 1204, which is implemented by instructions of the CPU, performs various determinations.

The storing and reading unit 1205, which is implemented mainly by instructions of the CPU, stores various data (or information) in the storage unit 1206 or reads various types of data (or information) from the storage unit 1206.

State Type Management Table:

FIG. 7 and FIG. 8 are illustrations of an example of a state type management table. The state type management table is a table for managing training data for detecting a state type of a slope. In the storage unit 3000, a state type management DB 3001 is stored, for example, in the form of the state type management table as illustrated in FIG. 7 and FIG. 8. The state type management table stores, for each of type numbers, a type name indicating a state type, a training image, and remarks in association with one another.

The type name is a name indicating a state type that identifies the state of a slope, a physical quantity around the slope, and site information. In the embodiment, the state type includes a type of the slope itself including a structure such as a retaining wall, a slope retaining frame, spray mortar, a wire mesh, a fence, a drainage hole, a pipe, and a drainage channel of a small step. The state type further includes a type indicating a physical quantity around the slope such as inflow water, moss, plants, rockfall, earth and sand, and sunshine. The state type further includes, as the site information that supports data acquisition by the mobile apparatus system 60, a type such as a pole, a utility pole, a sign, and a signboard. The state type may further include, as supplementary information on the structure, landmark information such as a mark made with chalk indicating the presence of deformation, an artificial object such as a measurement device or a trace of countermeasure, which was provided at a past inspection or construction. The training image is an example of the training data. The training image is used for machine learning for determining the state type of the slope, the physical quantity around the slope, and the site information based on captured image data. In the embodiment, the training data is not limited to a luminance image or an RGB image, which is generally referred to as an image. The training data may be depth information, text, or voice, provided that it contains information based on which the state type is identified. In the remarks, information as a detection criterion for detecting the state type is described.

Acquired Data Management Table:

FIG. 9A is an illustration of an example of an acquired data management table. The acquired data management table is a table for managing various acquired data acquired by the data acquisition apparatus 9. In the storage unit 5000, the acquired data management DB 5001 is stored, for example, in the form of the acquired data management table as illustrated in FIG. 9A. The acquired data management table stores, for each of folders, captured image data, sensor data, and acquisition time in association with one another.

The captured image data and the sensor data are data files of the acquired data transmitted from the data acquisition apparatus 9. The acquisition time indicates a time at which the captured image data and the sensor data are acquired by the data acquisition apparatus 9. Data acquired in one inspection process is stored in the same folder. The captured image data and the three-dimensional sensor data included in the sensor data are stored in association with coordinates, as described below. The captured image data and the three-dimensional sensor data included in the sensor data is stored in association with positioning data included in the sensor data. With this configuration, in response to selection of a desired position in the map information managed by the map data management unit 37 of the evaluation apparatus 3, the captured image data and the three-dimensional sensor data at the selected position is read from the acquired data management DB 5001.

Processed Data Management Table:

FIG. 9B is an illustration of an example of a processed data management table. The processed data management table is a table for managing various processed data processed by the evaluation apparatus 3. In the storage unit 5000, the processed data management DB 5003 is stored, for example, in the form of the processed data management table as illustrated in FIG. 9B. The processed data management table stores, for each of folders, the evaluation target data, evaluation data, positioning data, and comment in association with one another.

The evaluation target data is a data file used for detection and evaluation of a slope state by the evaluation apparatus 3. The evaluation data is a data file indicating an evaluation result obtained by the evaluation apparatus 3. The positioning data is data indicating location information measured by the GNSS sensor 8b. The comment is reference information input by an evaluator for the evaluation target data or the evaluation data. With this configuration, in response to selection of a desired position in the map information managed by the map data management unit 37 of the evaluation apparatus 3, the evaluation data at the selected position is read from the processed data management DB 5003.

FIG. 10 is an illustration for describing a captured image acquired by the mobile apparatus system 60.

The mobile apparatus system 60 photographs a slope on a road using the image capturing device 7 of the data acquisition apparatus 9 while the mobile apparatus 6 travels. An X-axis direction illustrated in FIG. 10 indicates a moving direction of the mobile apparatus 6, and a Y-axis direction indicates a vertical direction. A depth direction toward the slope from the mobile apparatus 6 is a Z-axis direction, the Z-axis direction being orthogonal to the X-axis direction and the Y-axis direction.

As illustrated in FIG. 10, the data acquisition apparatus 9 acquires a captured image 1, a distance measurement image 1, a captured image 2, and a distance measurement image 2 in a chronological order as the mobile apparatus 6 travels. The distance measurement image 1 and the distance measurement image 2 are images acquired by the distance sensor 8a. As time synchronization is performed on the image capturing device 7 and the sensor device 8, the captured image 1 and the distance measurement image 1 are images for the same area of the slope, and the captured image 2 and the distance measurement image 2 are images of another same area of the slope. Further, tilt correction (image correction) is performed on the captured image based on the posture of the vehicle at the time when the captured image is photographed, and the image data and the positioning data (north latitude and east longitude) are associated with each other based on the time when the captured image is photographed.

Thus, the mobile apparatus system 60 acquires the captured image data obtained by photographing the slope and the sensor data acquired in accordance with photographing by the image capturing device 7 while the vehicle as the mobile apparatus 6 travels. The mobile apparatus system 60 uploads the acquired captured image data and sensor data to the data management apparatus 5.

Figure 11A:
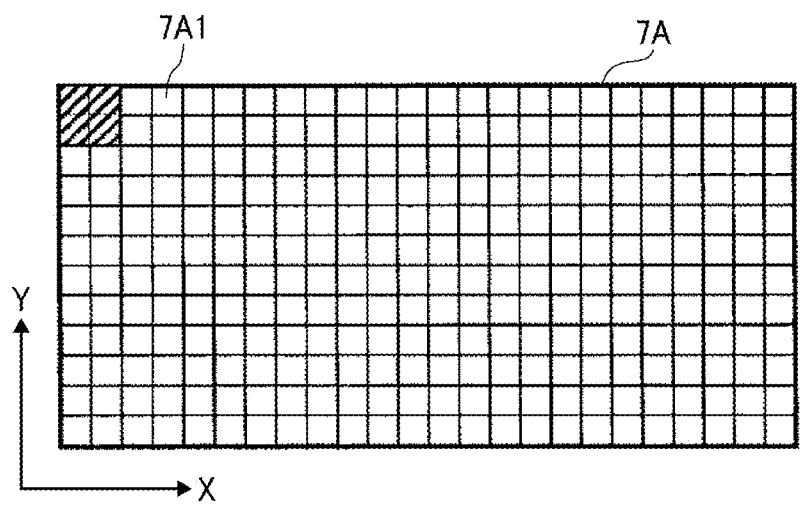
FIG. 11A and FIG. 11B are illustrations for describing a captured image and a distance measurement image, according to an embodiment of the present disclosure.
Figure 11B:
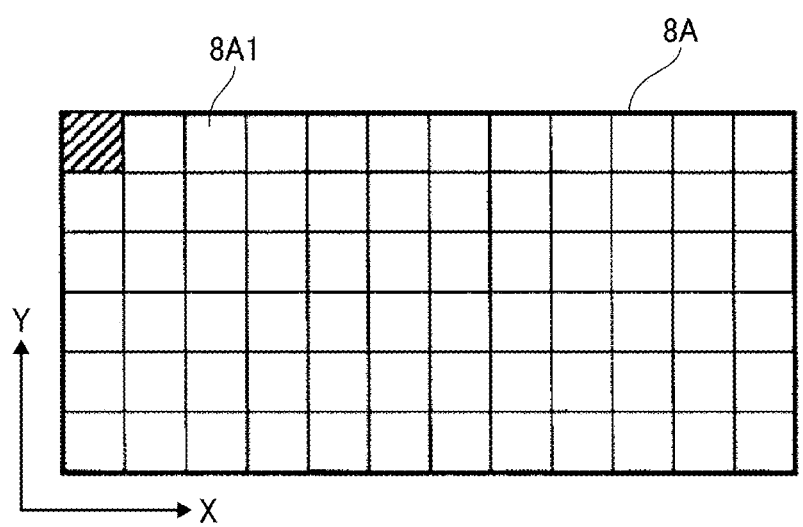

FIG. 11A and FIG. 11B are illustrations for describing the captured image and the distance measurement image.

FIG. 11A illustrates captured image data 7A of the captured image 1 or the captured image 2 illustrated in FIG. 10. Pixels 7A1s of the captured image data 7A acquired by the image capturing device 7 are arranged at coordinates corresponding to the X-axis direction and the Y-axis direction illustrated in FIG. 10. Each pixel 7A1 has luminance information corresponding to an amount of stored electricity.

The luminance information of pixels 7A1s of the captured image data 7A is stored in the storage unit 5000 as the captured image data illustrated in FIG. 9A and FIG. 9B in association with coordinates corresponding to the X-axis direction and the Y-axis direction illustrated in FIG. 10.

FIG. 11B illustrates distance measurement image data 8A of the distance measurement image 1 or the distance measurement image 2 illustrated in FIG. 10. Pixels 8A1s of the distance measurement image data 8A acquired by the distance sensor 8a are arranged at coordinates corresponding to the X-axis direction and the Y-axis direction illustrated in FIG. 10. Each pixel 8A1 has distance information in the Z-axis direction illustrated in FIG. 10 corresponding to an amount of stored electricity. The distance measurement image data 8A is three-dimensional point cloud data. The three-dimensional point cloud data is referred to as the "distance measurement image data", since in typical cases, the three-dimensional point cloud data is displayed in a visually recognizable manner by adding the luminance information so that the three-dimensional point cloud data is visually perceptible to a user. The captured image data 7A and the distance measurement image data 8A are collectively referred to as "image data".

Distance information of each pixel 8A1 of the distance measurement image data 8A is stored in the storage unit 5000 as three-dimensional information included in the sensor data illustrated in FIG. 9 in association with coordinates corresponding to the X-axis direction and the Y-axis direction illustrated in FIG. 10.

Since the captured image data 7A illustrated in FIG. 11A and the distance measurement image data 8A illustrated in FIG. 11B are images of the same area of the slope, the luminance information and the distance information are stored in the storage unit 5000 in association with the coordinates corresponding to the X-axis direction and the Y-axis direction illustrated in FIG. 10.

Processes or Operation of Embodiment:
Operation of Acquiring Data:

Referring to FIG. 12 to FIG. 27, processes and operations performed by the state inspection system 1 is described, according to an embodiment. First, referring to FIG. 12 and FIG. 10, an operation of acquiring data using the mobile apparatus system 60 is described. An inspection technician of a slope state photographs slopes on a road as he/she rides on the mobile apparatus 6, and uploads acquired data to the data management apparatus 5.

The details are described below.

Figure 12:
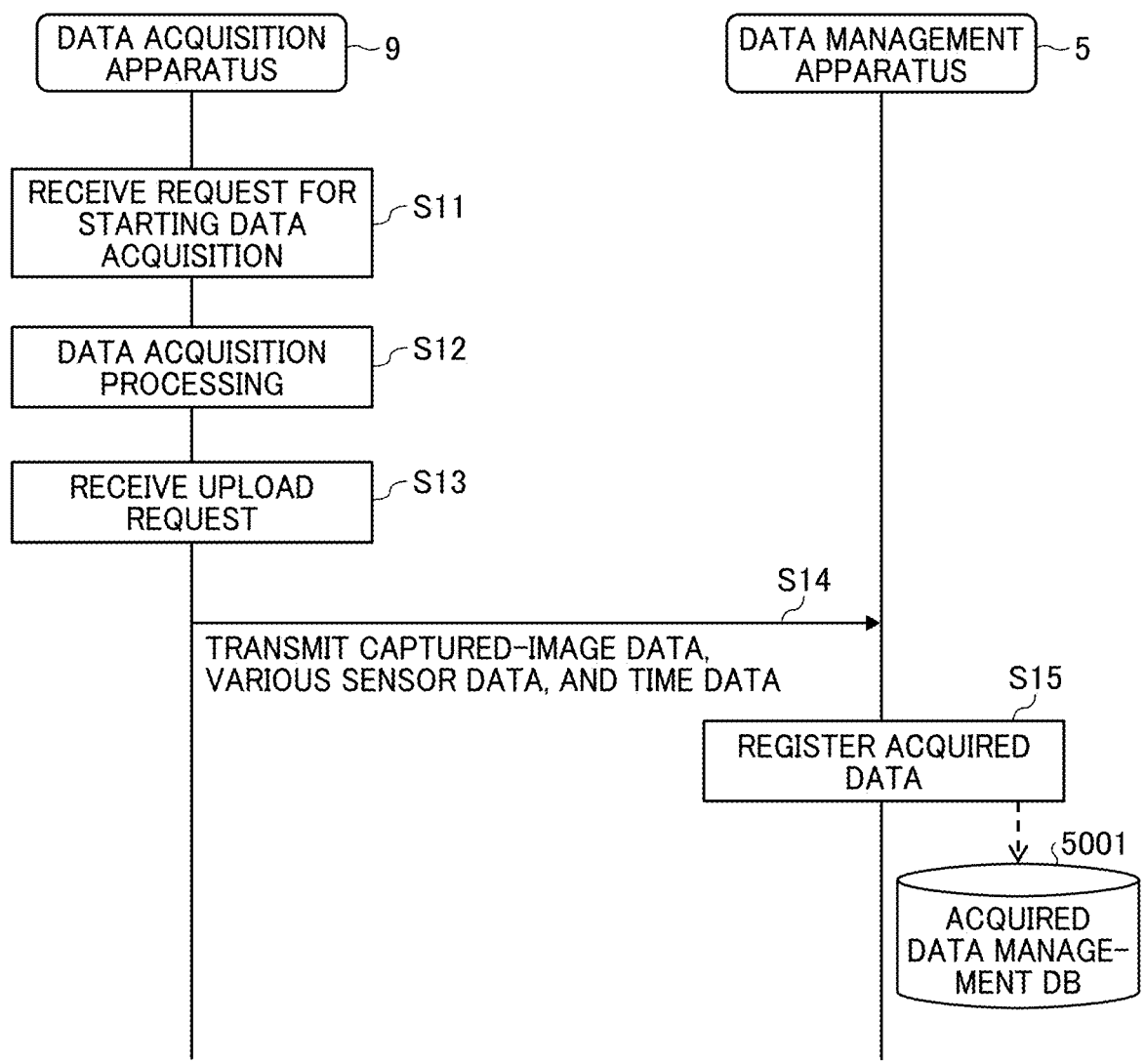
FIG. 12 is a sequence diagram illustrating an example of an operation of acquiring data using the mobile apparatus system, according to an embodiment of the present disclosure.

FIG. 12 is a sequence diagram illustrating an example of an operation of acquiring data using the mobile apparatus system 60.

First, in response to a predetermined input operation by an inspection technician to the external PC 330, the request receiving unit 98 of the data acquisition apparatus 9 receives a data acquisition start request (step S11). The data acquisition apparatus 9 performs data acquisition processing using the image capturing device 7 and the sensor device 8 (step S12). Specifically, the image capturing device control unit 93 sends a photographing request to the image capturing device 7, to start photographing processing for a particular area. Further, the sensor device control unit 94 starts detection processing by the distance sensor 8a and the GNSS sensor 8b in synchronization with the photographing processing by the image capturing device 7. The captured image data acquisition unit 95 acquires captured image data obtained by the image capturing device 7, and the sensor data acquisition unit 96 acquires sensor data obtained by the distance sensor 8a and the GNSS sensor 8b. The time data acquisition unit 97 acquires time data indicating times at which various data including the captured image data and the sensor data are acquired by the captured image data acquisition unit 95 and the sensor data acquisition unit 96.

Next, in response to a predetermined input operation by the inspection technician to the external PC 330, the request receiving unit 98 receives an upload request that request an upload of the acquired various data (step S13). The communication unit 91 uploads (transmits) the captured image data, the sensor data, and the time data, which are acquired data acquired in step S12, to the data management apparatus 5 (step S14). Thus, the communication unit 51 of the data management apparatus 5 receives the acquired data transmitted from the data acquisition apparatus 9. The data management unit 53 of the data management apparatus 5 registers the acquired data received in step S14 in the acquired data management DB 5001 (see FIG. 9A) (step S15). The data management unit 53 stores the captured image data and the sensor data in one folder in association with the time data indicating the acquisition time of each data included in the acquired data.

Figure 13:
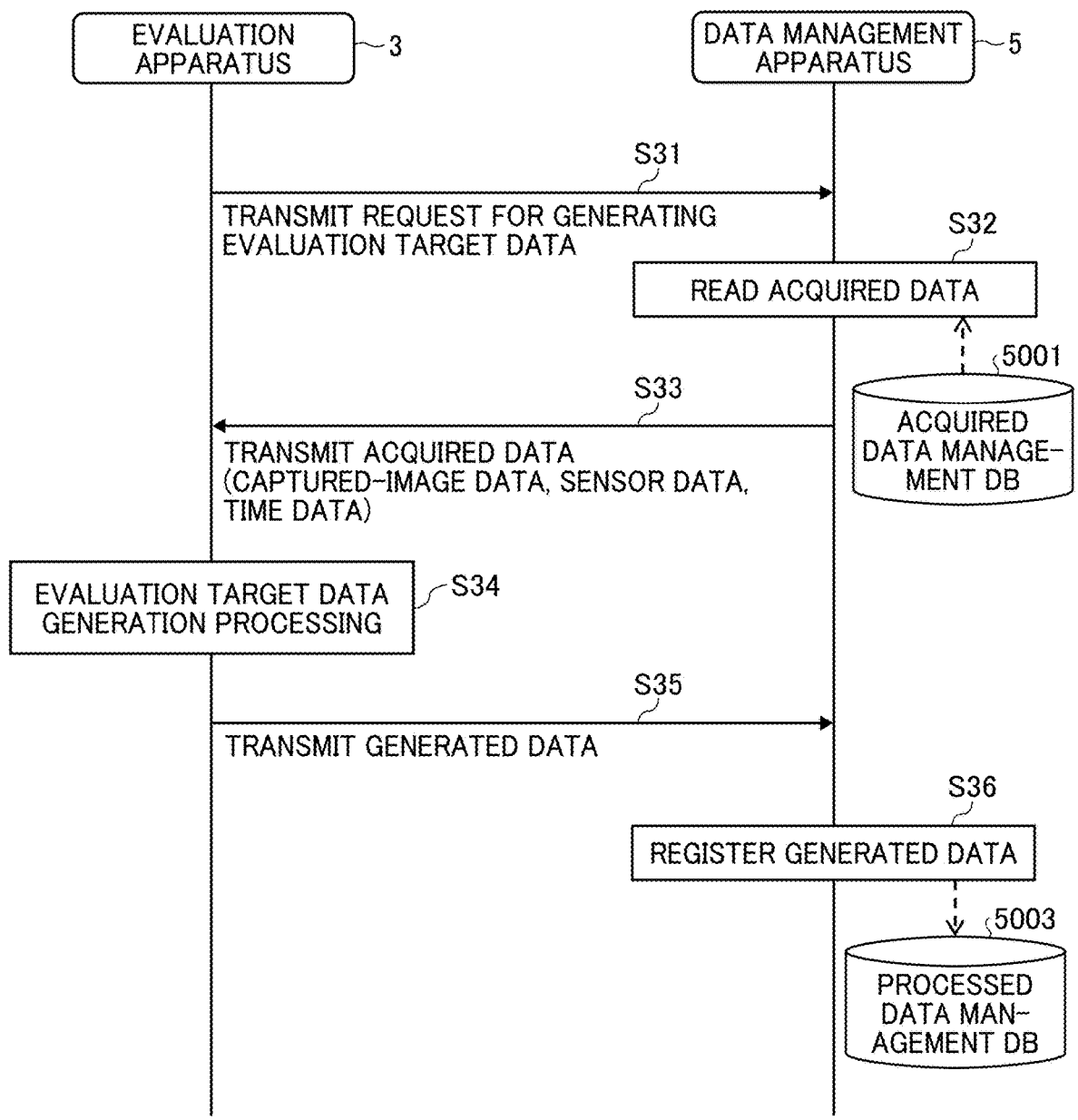
FIG. 13 is a sequence diagram illustrating an example of an operation of generating evaluation target data, according to an embodiment of the present disclosure.
Figure 27:
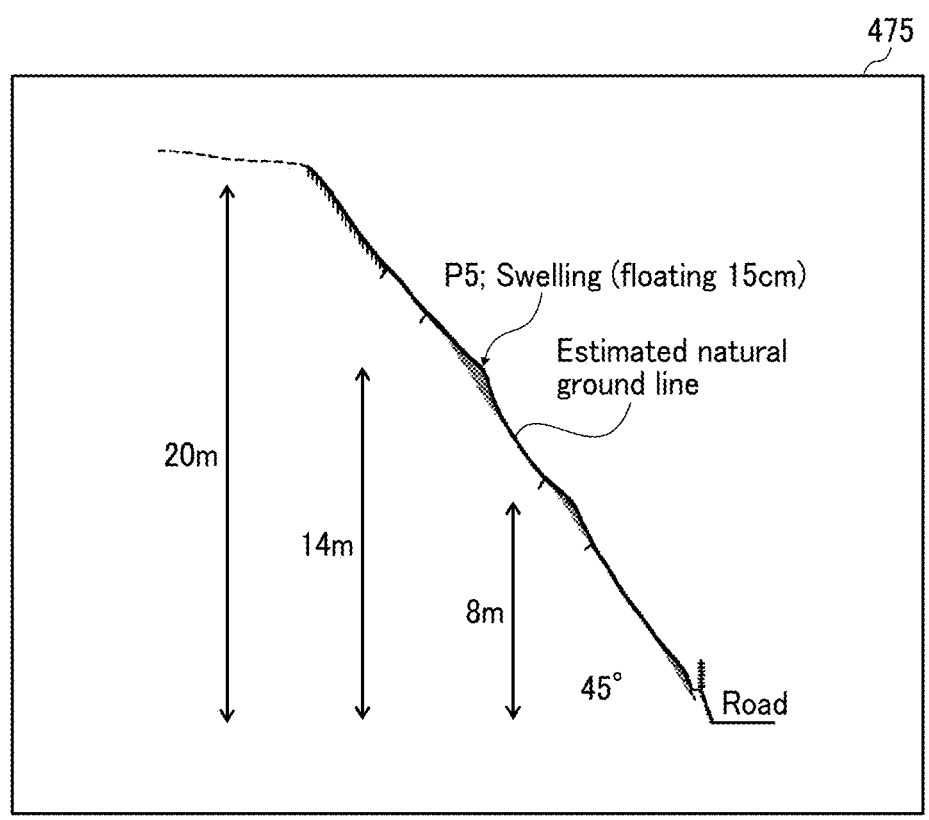
FIG. 27 is an illustration of another example of a cross-section image of a detected shape of a slope, according to an embodiment of the present disclosure.

Operation of Evaluating Slope State:
Generation of Evaluation Target Data:

Referring to FIG. 13 and FIG. 27, an operation of evaluating a slope state by the evaluation system 4 using the acquired data stored in the data management apparatus 5 is described. First, referring to FIG. 13, an operation of generating evaluation target data to be used in the operation of evaluating the slope state is described. FIG. 13 is a sequence diagram illustrating an example of an operation of generating the evaluation target data.

First, the communication unit 31 of the evaluation apparatus 3 transmits a generation request that requests generation of evaluation target data to the data management apparatus 5 (step S31). The generation request includes a name of a folder in which data as a generation target is stored. Thus, the communication unit 51 of the data management apparatus 5 receives the generation request transmitted from the evaluation apparatus 3.

Next, the data storing and reading unit 59 of the data management apparatus 5 searches the acquired data management DB 5001 using the folder name included in the generation request received in step S31 as a search key, to read acquired data associated with the folder name included in the generation request (step S32). Next, the communication unit 51 transmits the acquired data read in step S32 to the evaluation apparatus 3 (step S33). This acquired data includes captured image data, sensor data, and time data. Thus, the communication unit 31 of the evaluation apparatus 3 receives the acquired data transmitted from the data management apparatus 5.

Next, the evaluation target data generation unit 35 of the evaluation apparatus 3 generates evaluation target data using the acquired data received in step S33 (step S34). Specifically, the evaluation target data generation unit 35 corrects a tilt of the captured image according to the posture of the image capturing device 7 or the mobile apparatus 6 at the time when the captured image is photographed based on the received sensor data obtained by the distance sensor 8a. Further, the evaluation target data generation unit 35 associates positioning data, which is the received sensor data obtained by the GNSS sensor 8b with the captured image data, based on the received time information. Furthermore, the evaluation target data generation unit 35 performs processing synthesizing a plurality of pieces of captured image data into one piece of image data.

As described, the evaluation target data generation unit 35 has a tilt correction function for image data, an associating function for associating image data with location information, and a synthesis function for image data. The evaluation target data generation unit 35 performs image correction on the received captured image data by using the acquired data received from the data management apparatus 5, to facilitate processing by the detection unit 36 and the report generation unit 38 described below.

Next, the communication unit 31 of the evaluation apparatus 3 transmits the generated data generated in step S34 to the data management apparatus 5 (step S35). The generated data includes the evaluation target data generated by the evaluation target data generation unit 35, the positioning data, and the comment. Thus, the communication unit 51 of the data management apparatus 5 receives the generated data transmitted from the evaluation apparatus 3. Next, the data management unit 53 of the data management apparatus 5 stores the generated data received in step S35 in the processed data management DB 5003 (see FIG. 98) (step S36). Specifically, the data management unit 53 stores the evaluation target data, the positioning data, and the comment included in the generated data in one folder in association with each other.

Thus, the evaluation system 4 performs image processing based on the various data including the captured image data, the sensor data, and the time data acquired from the data acquisition apparatus 9 to generate evaluation target data to be used for evaluation of a slope state.

Generation of Evaluation Report

Figure 14:
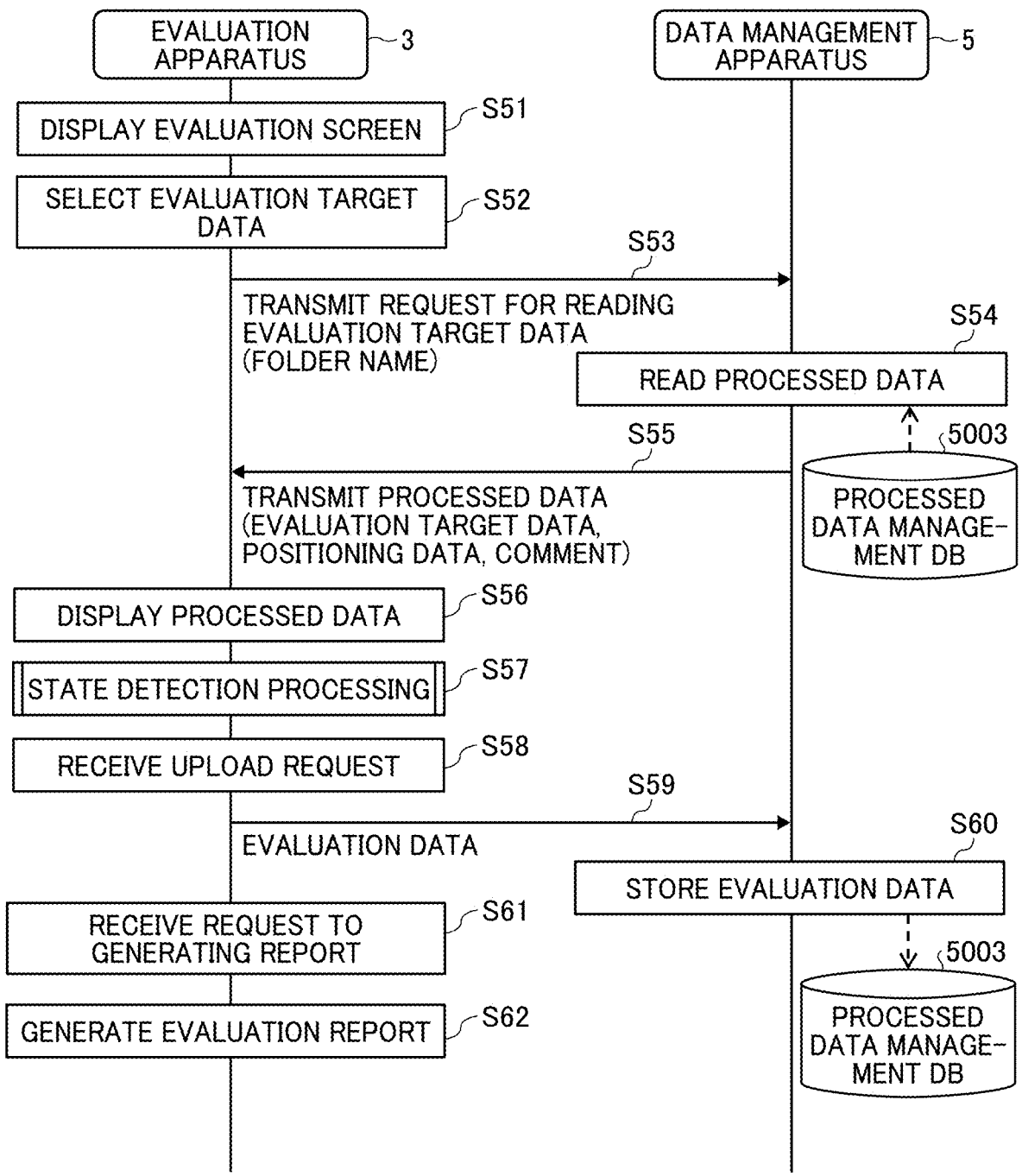
FIG. 14 is a sequence diagram illustrating an example of an operation of generating a report, which is an evaluation result of a slope state, according to an embodiment of the present disclosure.

Referring to FIG. 14 and FIG. 25, an operation of generating an evaluation report to be submitted to the entity in charge of roads by the evaluation system 4 is described. The evaluator evaluates a state of a slope using the captured image data, the sensor data, etc., acquired by the data acquisition apparatus 9, and generates an evaluation report indicating an evaluation result. The details are described below.

Figure 15:
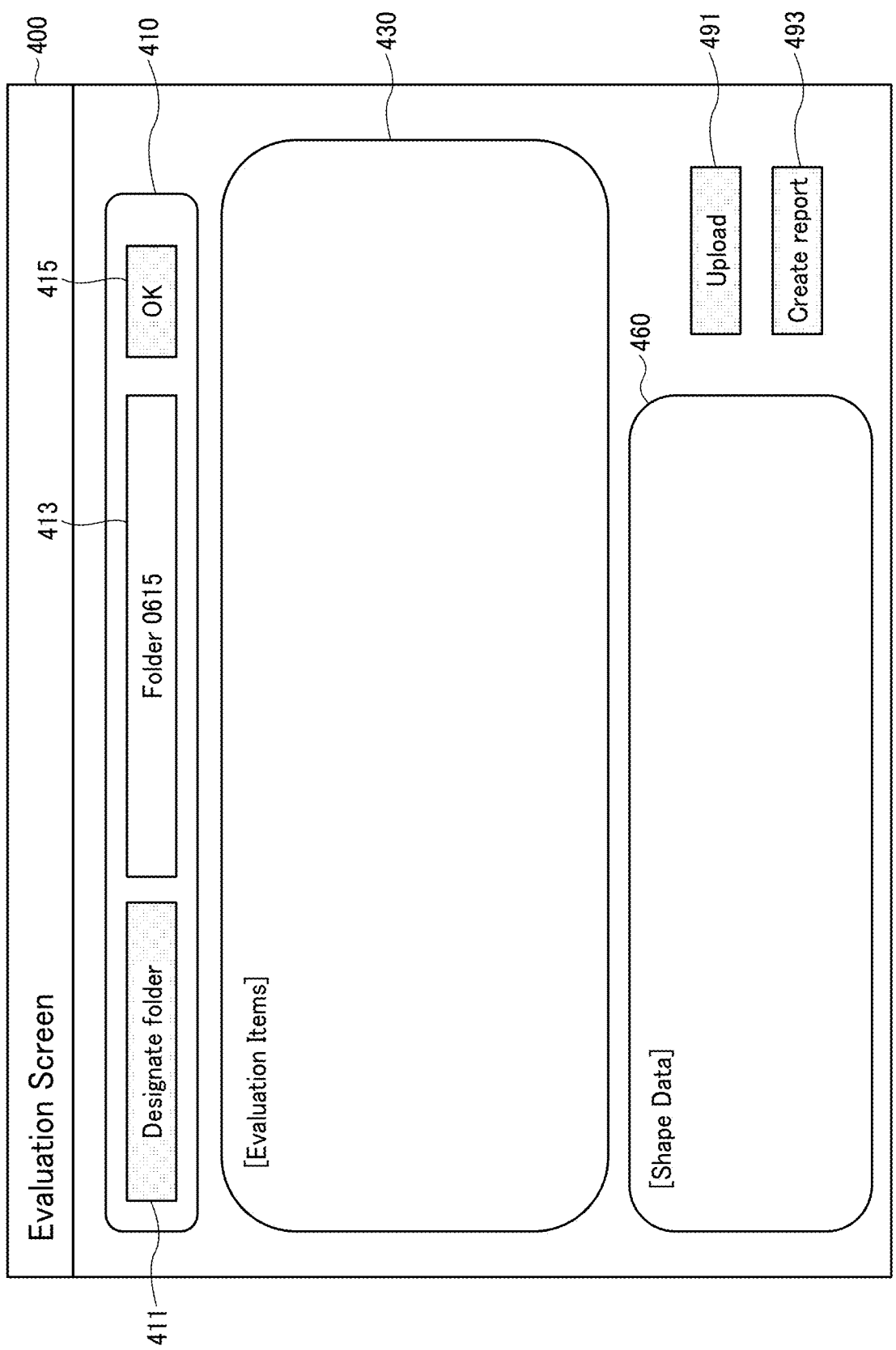
FIG. 15 is a diagram illustrating an example of an evaluation screen displayed on the evaluation apparatus, according to an embodiment of the present disclosure.

FIG. 14 is a sequence diagram illustrating an example of an operation of generating a report, which is an evaluation result of a slope state. First, the display control unit 33 of the evaluation apparatus 3 controls the display 306 to display the evaluation screen 400 for performing evaluation processing of the slope state (step S51). FIG. 15 is a diagram illustrating an example of the evaluation screen 400 displayed on the evaluation apparatus 3. The evaluation screen 400 illustrated in FIG. 15 includes a selection area 410 for evaluation target data, an evaluation item selection area 430, a shape data display area 460, an "Upload" button 491, and a "create report" button 493. The evaluation item selection area 430 is an area for selecting an evaluation item for detecting the slope state. The shape data display area 460 is an area for displaying shape data. The "Upload" button 491 is a button to be pressed when uploading an evaluation result to the data management apparatus 5. The "create report" button 493 is a button to be pressed when generating the evaluation report.

The selection area 410 includes a "designate folder" button 411, a display area 413, and an "OK" button 415. The "designate folder" button 411 is a button for designating a folder in which the evaluation target data is stored. In the display area 413, a name of the designated folder is displayed. The "OK" button 415 is a button to be pressed when requesting download of the evaluation target data stored in the designated folder.

Next, in response to designation of a desired folder by the evaluator using the "designate folder" button 411, the receiving unit 32 of the evaluation apparatus 3 receives selection of evaluation target data (step S52). For example, in the example of FIG. 15, the receiving unit 32 receives selection of evaluation target data stored in a "folder 0615".

Next, the communication unit 31 transmits a read request that request reading of the evaluation target data selected in step S52 to the data management apparatus 5 (step S53). This read request includes the folder name selected in step S52. Thus, the communication unit 51 of the data management apparatus 5 receives the read request transmitted from the evaluation apparatus 3.

Next, the data storing and reading unit 59 of the data management apparatus 5 searches the processed data management DB 5003 (see FIG. 9B) using the folder name included in the read request received in step S53 as a search key, to read processed data associated with the folder name included in the read request (step S54). Next, the communication unit 51 transmits the processed data read in step S54 to the evaluation apparatus 3 (step S55). The processed data includes the evaluation target data, the positioning data, and the comment. Thus, the communication unit 31 of the evaluation apparatus 3 receives the processed data transmitted from the data management apparatus 5.

Figure 16:
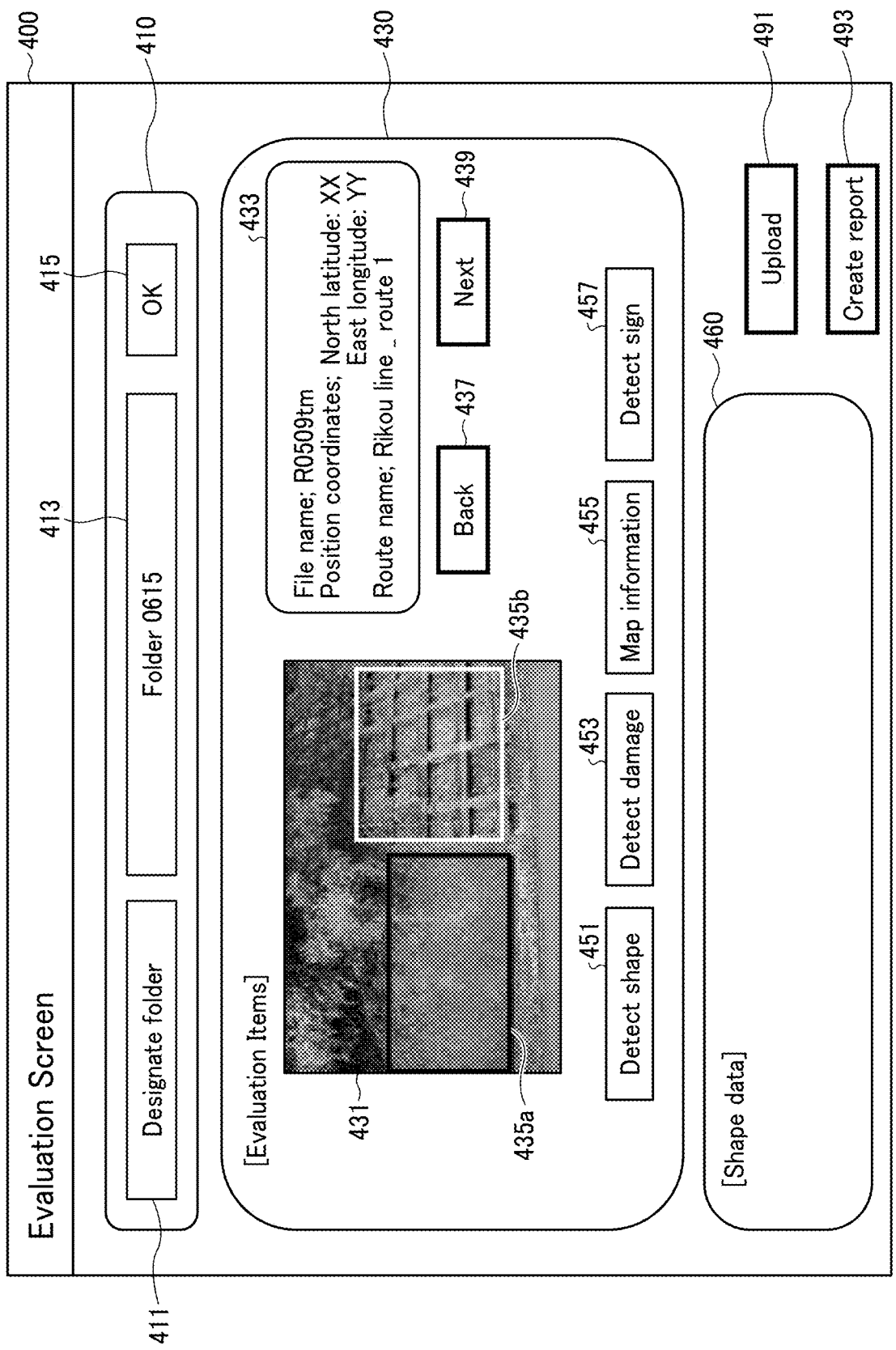
FIG. 16 is a diagram illustrating an example of an evaluation screen on which processed data is displayed, according to an embodiment of the present disclosure.

Next, the display control unit 33 of the evaluation apparatus 3 controls the display 306 to display the processed data received in step S54 in the evaluation item selection area 430 on the evaluation screen 400 (step S56). FIG. 16 is a diagram illustrating an example of the evaluation screen 400 on which the processed data is displayed. The evaluation item selection area 430 illustrated in FIG. 16 includes an image display area 431, a reference information display area 433, a "Back" button 437, and a "Next" button 439. In the image display area 431, an image of the evaluation target data, which is the processed data transmitted from the data management apparatus 5, is displayed. In the reference information display area 433, reference information of the evaluation target data is displayed. The "Back" button 437 and the "Next" button 439 are buttons are pressed when switching the image displayed in the image display area 431. The evaluation item selection area 430 further includes a "detect shape" button 451, a "detect damage" button 453, a "map information" button 455, and a "detect sign" button 457 to be pressed. The "detect shape" button 451 is a button to be pressed for performing detection of a shape of a slope. The "detect damage" button 453 is a button to be pressed for detecting a damage state of the slope. The "map information" button 455 is a button to be pressed for generating map information. The "detect sign" button 457 is a button to be pressed for detecting a sign state of damage of the slope.

Further, in the image display area 431, an evaluation area 435a and an evaluation area 435b are displayed as being superimposed on the image of the evaluation target data. The evaluation area 435a and the evaluation area 435b indicate evaluation areas in detection processing of a slope state described below. The evaluator moves the evaluation area 435a and the evaluation area 435b and enlarges or reduces the evaluation area 435a and the evaluation area 435b by performing input operations such as tapping, dragging, swiping, pinching in and pinching out on the evaluation area 435a and the evaluation area 435b. Although the embodiment is of an example in which the number of evaluation areas is two, i.e., the evaluation area 435a and the evaluation area 435b, in another example, the number of the evaluation areas may be one or three or more. In another example, an entire area of the image display area 431 may be set as the evaluation area instead of displaying the evaluation area 435a and the evaluation area 435b in the image display area 431.

Figure 17:
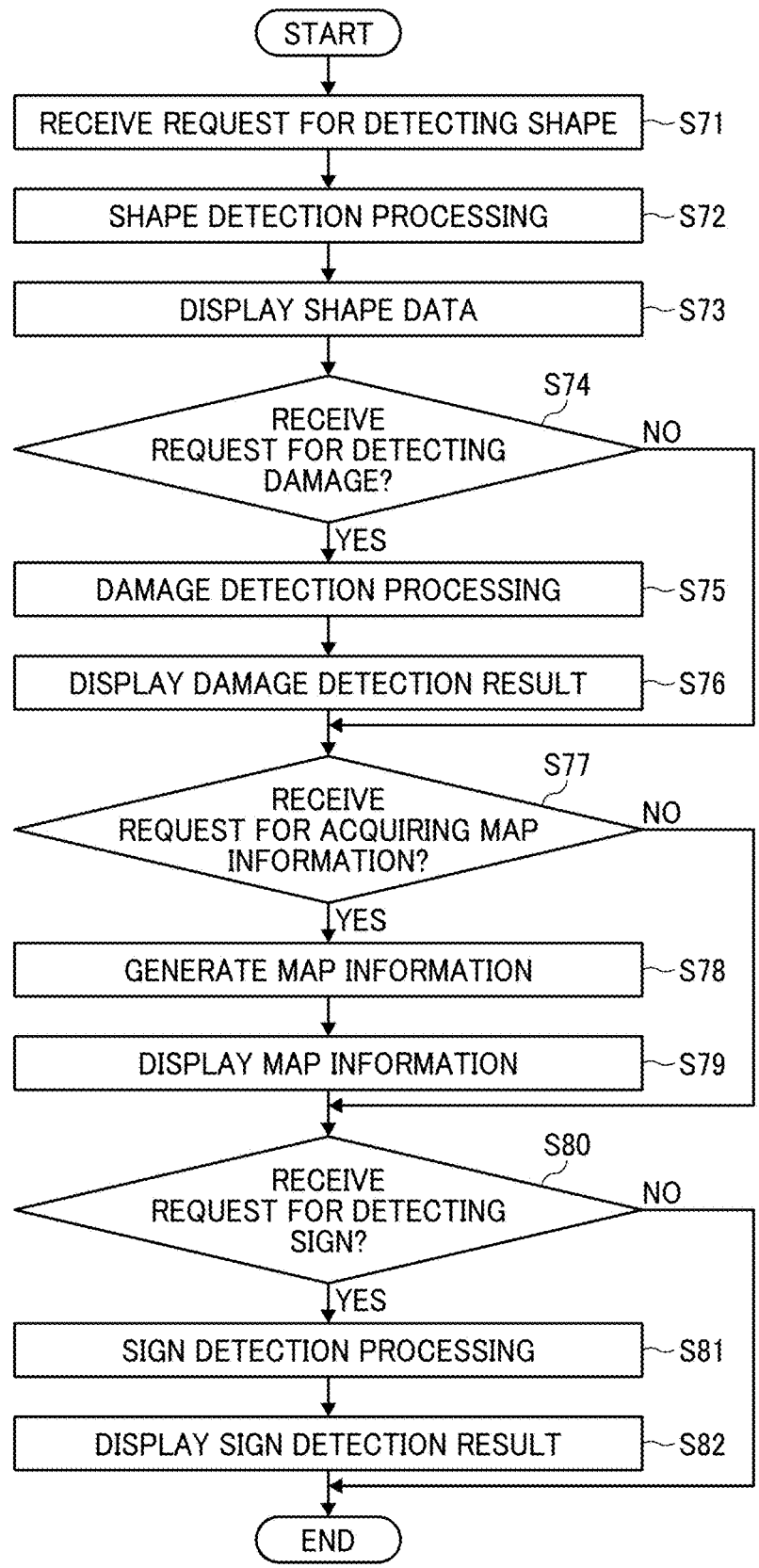
FIG. 17 is a flowchart of an example of detection processing of a slope state, according to an embodiment of the present disclosure.

Next, the evaluation apparatus 3 performs detection processing of a slope state using the evaluation target data (step S57). Referring to FIG. 17, details of the detection processing of the slope state are described. FIG. 17 is a flowchart of an example of the detection processing of the slope state.

First, in response to pressing of the "detect shape" button 451 in the evaluation item selection area 430 by the evaluator, the receiving unit 32 receives a shape detection request (step S71). Next, the detection unit 36 performs shape detection processing using the evaluation target data (step S72). In the embodiment, shape data indicating a shape of the slope is represented by, for example, three-dimensional information such as an extension, a height, and an inclination angle of the slope, and location information. The extension of the slope is a length of the slope in a plan view, in other words, a length in a depth direction of a cross section based on which the inclination of the slope is recognizable. The shape data further includes information indicating the type of slope, i.e., whether the slope is a natural slope or an earthwork structure. When the slope is an earthwork structure, the shape data includes information on the type of the earthwork structure. Examples of the type of an earthwork structure include, but are not limited to, a retaining wall, a slope retaining frame, mortar spraying, a presence or absence of an anchor, and an embarkment.

Specifically, the detection unit 36 detects the extension, the height, and the inclination angle of the slope based on the image data and the three-dimensional data included in the evaluation target data. Further, the detection unit 36 detects the type of the slope in an image, which is the evaluation target data, using the state type management DB 3001 (see FIG. 7). In this case, the detection unit 36 detects the type of the slope by image matching processing using the training images indicated in the state type management table.

Figure 18:
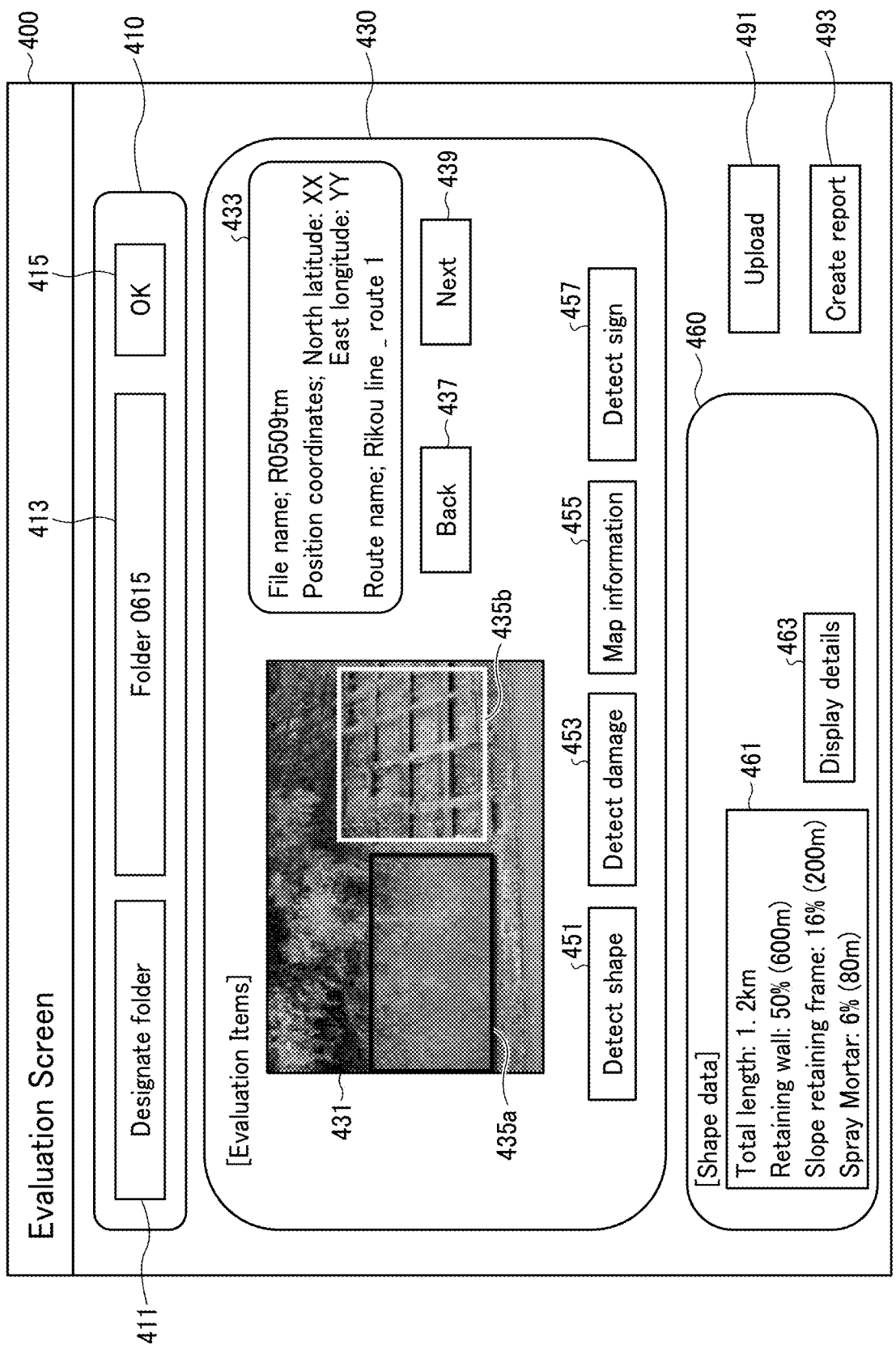
FIG. 18 is an illustration of an example of an evaluation screen on which a detection result of shape data is displayed, according to an embodiment of the present disclosure.

Next, the display control unit 33 controls the display 306 to display the shape information, which is the detection result in step S72, in the shape data display area 460 of the evaluation screen 400 (step S73). FIG. 18 is an illustration of example of the evaluation screen 400 on which the detection result of the shape data is displayed. The shape data display area 460 illustrated in FIG. 18 includes a display area 461 and a "display details" button 463. In the display area 461, reference items of the shape data indicating the shape detection result by the detection unit 36 are displayed. The "display details" button 463 is a button to be pressed for displaying detailed data of the shape detection result. In the display area 461, for example, the total length of the slope and the ratio of the detected types in the entire slope are displayed.

In steps S71 to S73 described above, "structure information detection" processing may be performed instead of the "shape detection" processing.

In this case, in response to pressing of a "detect structure information" button instead of the "detect shape" button 451 in the evaluation item selection area 430 by the evaluator, the receiving unit 32 receives a structure information detection request (step S71). Next, the detection unit 36 performs structure information detection processing using the evaluation target data (step S72). Then, the display control unit 33 controls the display 306 to display structure information detection information, which is the detection result in step S72, in a structure information display area instead of in the shape data display area 460 of the evaluation screen 400 (step S73).

In the embodiment, the structure information includes supplementary information of a structure in addition to the shape data described above. Specifically, the detection unit 36 detects the type of the slope in an image, which is the evaluation target data, and the type of the supplementary information of the slope, using the state type management DB 3001 (see FIG. 7 and FIG. 8), based on the image data and the three-dimensional data included in the evaluation target data. In this case, the detection unit 36 detects the type of the slope and the supplementary information of the slope by image matching processing using the training images indicated in the state type management table.

Next, in response to pressing or the "detect damage" button 453 in the evaluation item selection area 430 by the evaluator, the receiving unit 32 receives a damage detection request that requests detection of a damage of the slope state (YES in step S74), and the operation proceeds to step S75. By contrast, when the receiving unit 32 receives no damage detection request is received (NO in step S74), the operation proceeds to step S77. The detection unit 36 performs damage detection processing of a slope state on the evaluation target data (step S75).

In the embodiment, in the damage detection processing of the state of the slope, a presence or absence of deformation in the slope or a degree of the deformation is detected as damage data indicating a degree of damage of the slope. The degree of the deformation indicates a degree of deterioration of the deformation, such as a width of a crack, a size of a separation, or a size of a floating. The detection unit 36 detects the presence or absence of deformation in the slope or the degree of the deformation based on the image data and the sensor data included in the evaluation target data. Further, the detection unit 36 detects whether the degree of deformation exceeds a predetermined value using, for example, a detection equation that is set in advance for obtaining a degree of deterioration of deformation. In this case, the detection unit 36 determines, for example, whether the width of the crack is equal to or greater than a certain value, whether the size of the separation is equal to or greater than a certain value, or whether the floating is large.

Then, in step S36 of FIG. 13, the data management unit 53 of the data management apparatus 5 stores, in the processed data management DB 5003, coordinates of the damage position and the type of the damage in association with coordinates corresponding to the X-axis direction and the Y-axis direction in the captured image data 7A illustrated in FIG. 11A.

Figure 19:
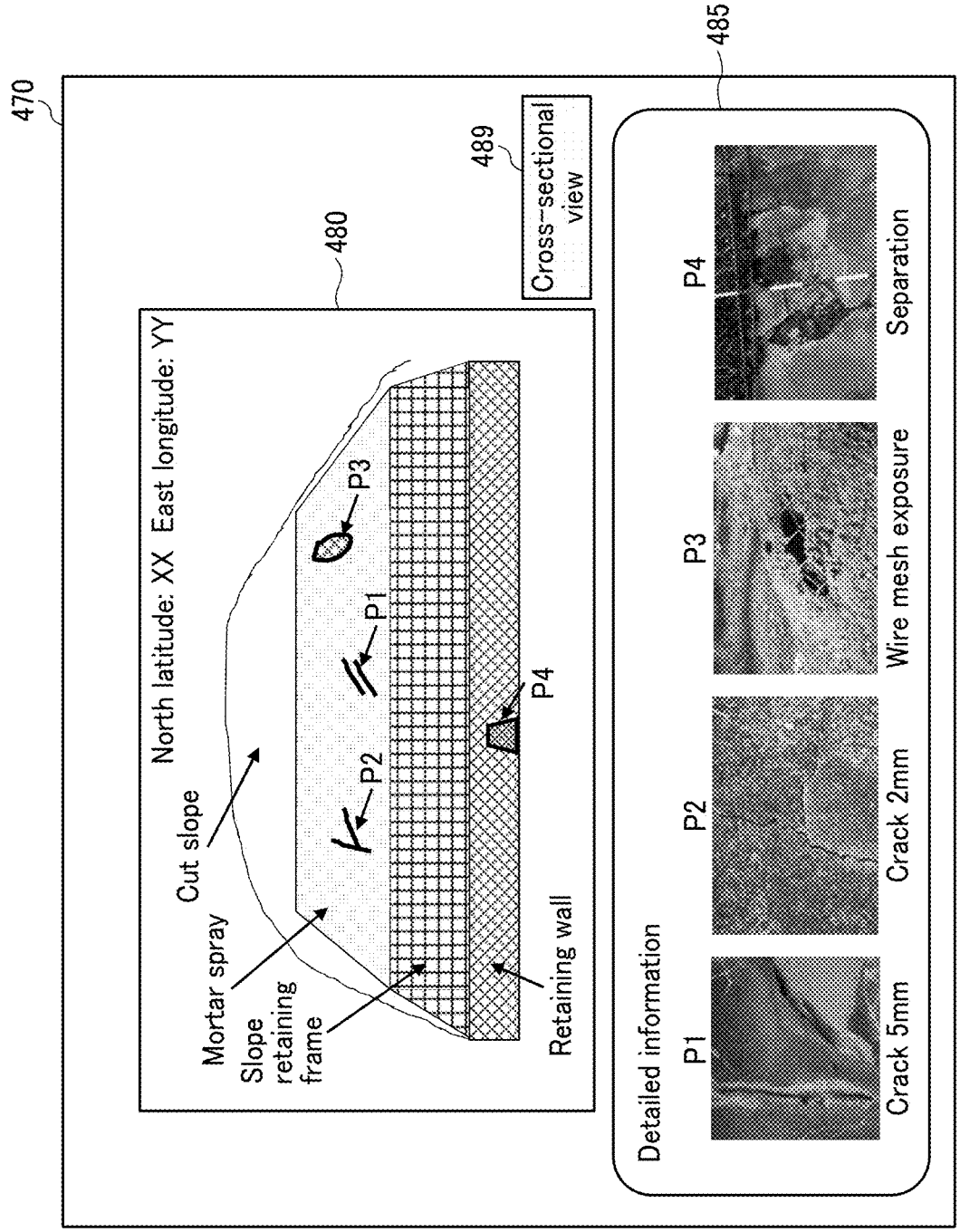
FIG. 19 is an illustration of an example of a display screen displaying a damage detection result, according to an embodiment of the present disclosure.

Next, the display control unit 33 controls the display 306 to display a display screen 470 indicating the damage detection result in step S75 (step S76). FIG. 19 is an illustration of an example of the display screen 470 displaying the damage detection result. A display screen 470 illustrated in FIG. 19 includes a display image area 480, a detailed information display area 485, and a "cross-sectional view" button 489. In the display image area 480, one or more detected positions of one or more damages in the entire slope as the evaluation target are displayed. In the detailed information display area 485, one or more captured images respectively corresponding to the one or more detected positions of damages are displayed. The "cross-sectional view" button 489 is a button to be pressed for displaying a cross-sectional view of the detected slope. The display image area 480 includes a plan view in which images (P1 to P4) indicating positions of the detected damages are drawn for an image indicating a two-dimensional shape of the slope as the evaluation target. The display image area 480 includes information indicating position coordinates (positioning data) indicating the position of the slope as the evaluation target.

Figure 20:
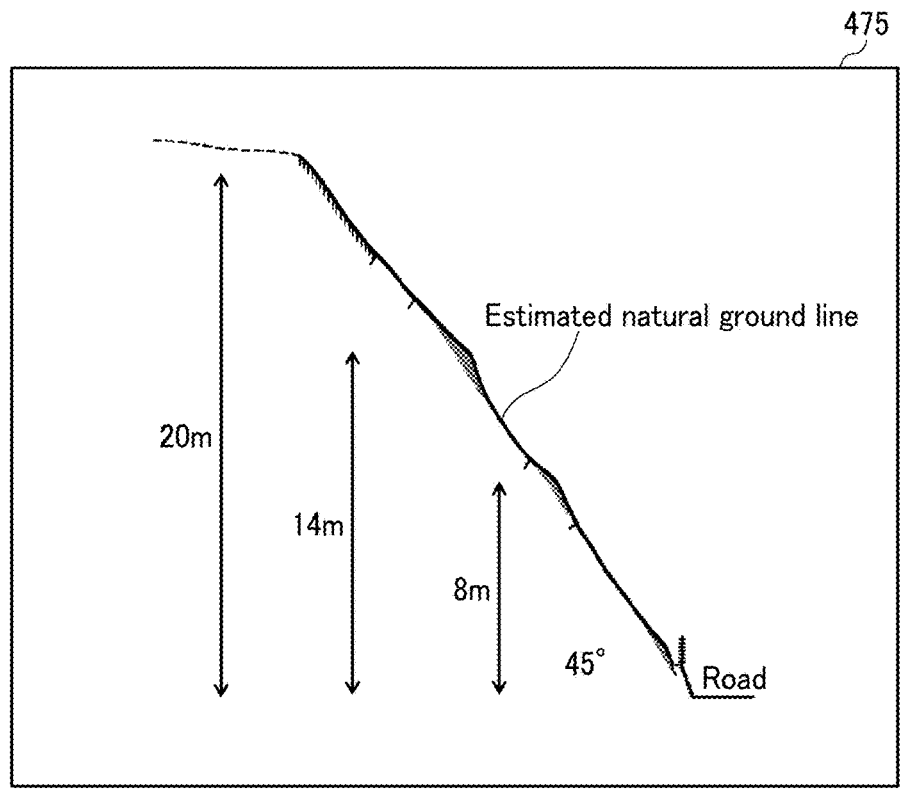
FIG. 20 is an illustration of an example of a cross-section image of a detected shape of a slope, according to an embodiment of the present disclosure.

In response to pressing of the "cross-sectional view" button 489 by the evaluator, the display control unit 33 controls the display 306 to display a cross-section image 475 illustrated in FIG. 20. The cross-section image 475 illustrated in FIG. 20 is a cross-sectional view of the slope as the evaluation target drawn based on the shape data detected by the detection unit 36. Since the shape data is detected using the sensor data obtained by the distance sensor 8a (three-dimensional sensor), as illustrated in FIG. 20, the cross-sectional view can express three-dimensional information such as the inclination or height of the slope, which cannot be calculated only from the two-dimensional image.

Next, in response to pressing the "map information" button 455 in the evaluation item selection area 430 by the evaluator, the receiving unit 32 receives a map information acquisition request (YES in step S77), and the operation proceeds to step S78. By contrast, when the receiving unit 32 receives no map information acquisition request (NO in step S77), the operation ends. The detection unit 36 generates map information indicating a location of the slope state as the evaluation target (step S78). Specifically, the detection unit 36 generates map information in which an image indicating the location is added to the location (north latitude, east longitude) indicated by the positioning data acquired in step S55, which corresponds to map data available using a predetermined service or application provided by, for example, an external web server. The map data provided from the external web server is managed by the map data management unit 37.

Figure 21:
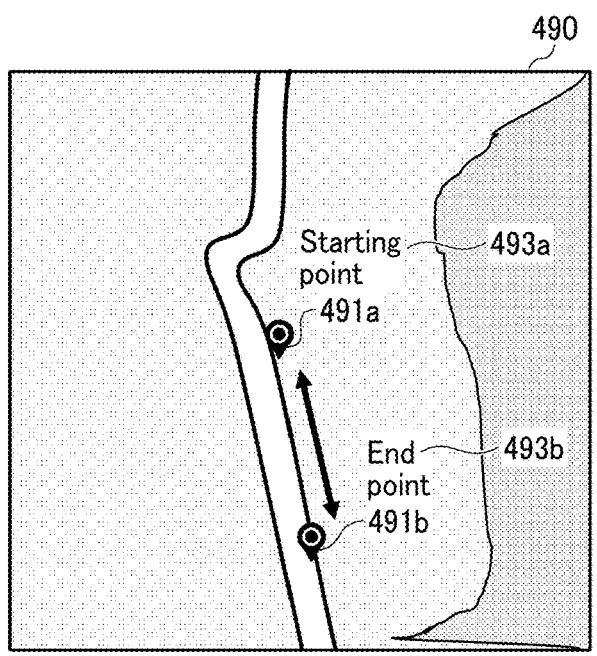
FIG. 21 is an illustration of an example of map information, according to an embodiment of the present disclosure.

Next, the display control unit 33 controls the display 306 to display the map information 490 generated in step S78 (step S79). FIG. 21 is an illustration of an example of the map information 490.

As described above, in the map information 490, an image 491a and an image 491b indicating the location of the slope as the evaluation target are drawn on the map data. In the map information 490 illustrated in FIG. 21, the image 491a at a start position of the inspection, and the image 491b is drawn an end position of the inspection. Further, a text 493a "start point" and text 493b "end point" are drawn in association with the image 491a and the image 491b, respectively. Thus, an area of the slope as the inspection target is displayed. When it is desirable to display a more accurate location of the slope, it is preferable that the detection unit 36 generate the map information by collating the positioning data with positioning map data of the Geographical Survey Institute, for example.

FIG. 22A to FIG. 22I are illustrations of examples of site information stored in association with the map information. The images illustrated in FIG. 22A to 22I are stored in association with the positioning data in the processed data management table illustrated in FIG. 98. In response to clicking on a desired position on the map information 490 illustrated in FIG. 21, the display control unit 33 controls the display 306 to display an image indicating an inspection site associated with the positioning data corresponding to the clicked position.

In the embodiment, the "inspection site" includes not only a section from the start position to the end position of the inspection illustrated in FIG. 21 but also a peripheral area of the section from the start position to the end position of the inspection required for determining soundness.

FIG. 22A is an image of a site of the start point indicated by the image 491a illustrated in FIG. 21. FIG. 22B is an image of a site of the end point indicated by the image 491b illustrated in FIG. 21. FIG. 22C is an image of a sidewalk at the inspection site. FIG. 22D is an image of a gutter at the inspection site.

FIGS. 22E and 22F are images of an evacuation area at the inspection site. FIG. 22G is an image indicating the pavement condition at the inspection site. FIGS. 22H and 22H are images of a road gradient at the inspection site.

By checking the images illustrated in FIG. 22A to 22I on the display 306 in advance before visiting the site for reinspection or the like, advance preparation and work at the site are made more efficient.

Referring again to FIG. 17, in response to pressing or the "detect sign" button 457 in the evaluation item selection area 430 by the evaluator, the receiving unit 32 receives a sign detection request that requests detection of a sign of a damage of the slope state (YES in step S80), and the operation proceeds to step S81. By contrast, when the receiving unit 32 receives no sign detection request is received (NO in step S80), the operation ends. The detection unit 36 performs sign detection processing of detecting a sign of a damage of the slope state on the evaluation target data (step S81).

As known in the art, when a deformation on a slope is observed, the state inspection system 1 identifies a state and a position of the deformation. However, a point of view is not known according to which information indicating a sign of a position where a deformation occurs is measured before the deformation occurs on the slope. In the embodiment, in sign detection processing of detecting a sign of damage of a slope state, a sign of deformation of the slope is detected based on measurement data of the slope including surrounding data indicating a physical quantity around the slope as sign data indicating a sign of damage of the slope.

The measurement data includes captured image data obtained by photographing the slope by the image capturing device 7, or the sensor data obtained by measuring the slope by a three-dimensional sensor such as the distance sensor 8a.

The surrounding data includes measurement data of an object other than the slope. The object other than the slope includes at least one of inflow water, earth and sand, rocks, and plants.

The measurement data of the slope including surrounding data indicating inflow water is occurring on the surface of the slope indicates a possibility that accumulated water are applying pressure from the back side of the slope. Thus, the presence of the sign of deformation of the slope is detected. Specifically, the presence of the sign of deformation of the slope is detected according to an amount, a type, and a position of inflow water in addition to the presence to the inflow water.

The measurement data of the slope including surrounding data indicating plants and moss are growing on the surface of the slope indicates a possibility that accumulated water is occurring and the accumulated water are applying pressure from the back side of the slope. Thus, the presence of the sign of deformation of the slope is detected. Specifically, the presence of the sign of deformation of the slope is detected according to amounts, types, and positions of plants and moss in addition to the presence to the plants and moss.

The measurement data of the slope including surrounding data indicating fallen rocks or earth and sand around the slope indicates a possibility of abnormality occurring on the back side and the upper side of the slope. Thus, the presence of the sign of deformation of the slope is detected. Specifically, the presence of the sign of deformation of the slope is detected according to an amount, a type, and a position of fallen rocks or earth and sand in addition to the presence to the fallen rocks or earth and sand.

The measurement data of the slope including surrounding data indicating clogging of a drainage hole, a pipe, and a drainage channel in a small step indicates a possibility that drainage from the back side to the front side of the slope is blocked, and accumulated water are applying pressure from the back side of the slope. Thus, the presence of the sign of deformation of the slope is detected. Specifically, the presence of the sign of deformation of the slope is detected according to an amount, a type, and a position of material that leads to the clogging in addition to the presence to the clogging.

When a drainage hole, a pipe, or a drainage channel of small step itself is damaged, such damage is detected as a deformation of the slope. On the other hand, clogging of a drainage hole, a pipe, or a drainage channel of a small step is detected as a sign of deformation of the slope, instead of deformation of the slope.

With regard to the measurement data of an object other than the slope described above, a sign of deformation of the slope may be detected according to a combination of multiple measurement data. Specifically, when there is surrounding data indicating that inflow water is occurring only in a small part of the slope and when moss spreads over the entire surface of the slope, inflow water is likely to spread over the entire surface of the slope. Thus, the presence of a sign of the deformation of the slope is detected.

The surrounding data includes measurement data of physical quantities other than the object. The measurement data of physical quantities other than the object includes measurement data of light.

When the measurement data of the slope includes surrounding data indicating the degree of sunshine, such the surrounding data is used for detection of the presence of a sign of deformation of the slope in combination with the measurement data of the object other than the slope. Specifically, moss growing in a sunny spot where the slope is easily dried indicates a possibility that inflow water is occurring, and accumulated water is applying pressure from the back side of the slope. Thus, the presence of the sign of deformation of the slope is detected.

The sign detection processing of detecting a sign of damage of a slope state generates a comment on a sign of deformation of the slope based on the measurement data of the slope including the surrounding data indicating the physical quantity around the slope as the sign data indicating a sign of damage of the slope. In step S36 of FIG. 13, the data management unit 53 of the data management apparatus 5 stores, in the processed data management DB 5003, coordinates of the position of the sign of deformation and the comment in association with coordinates corresponding to the X-axis direction and the Y-axis direction in the captured image data 7A illustrated in FIG. 11A.

Specifically, based on the captured image data, which is an example of the acquired surrounding data, the detection unit 36 refers to the training images in the state type management table illustrated in FIG. 8, to generate a comment indicating the type, the amount, and the position of the physical quantity around the slope such as inflow water. For example, a comment "moss rate 30% a, growing mostly in the vicinity of a height of 3 to 20 m of the starting point" is generated.

Next, the display control unit 33 controls the display 306 to display a display screen 1470 indicating a result of the sign detection processing in step S81 (step S82). Details of the display screen are described below.

Further, in response to pressing of the "cross-sectional view" button 1489 by the evaluator, the display control unit 33 controls the display 306 to display the cross-section image 475 in substantially the same manner as illustrated in FIG. 20.

Thus, the evaluation system 4 detects, as evaluation of the slope state, the shape of the slope including the three-dimensional information, the degree of damage to the slope, the sign of deformation of the slope, and the position of the slope as the evaluation target.

Referring again to FIG. 14, in response to pressing of the "Upload" button 491 in the evaluation screen 400 by the evaluator, the receiving unit 32 receives an upload request that requests an upload of the evaluation result (step S58). The communication unit 31 uploads (transmits) the evaluation result to the data management apparatus 5 (step S59). Thus, the communication unit 51 of the data management apparatus 5 receives the evaluation data transmitted from the evaluation apparatus 3. The data management unit 53 of the data management apparatus 5 registers the evaluation data received in step S59 in the processed data management DB 5003 (see FIG. 9B) (step S60). In this case, the data management unit 53 stores the evaluation data in one folder in association with the evaluation target data on which the evaluation has been performed.

Further, in response to pressing of the "create report" button 493 in the evaluation screen 400 by the evaluator, the receiving unit 32 receives a request for generating an evaluation report (step S61). The report generation unit 38 generates an evaluation report based on the detection result of the slope state by the detection unit 36 (step S62). The report generation unit 38 generates an evaluation report by arranging the evaluation data indicating the above-described evaluation result according to an inspection guideline issued by, for example, the government, of in format requested by the entity in charge of roads.

Figure 24:
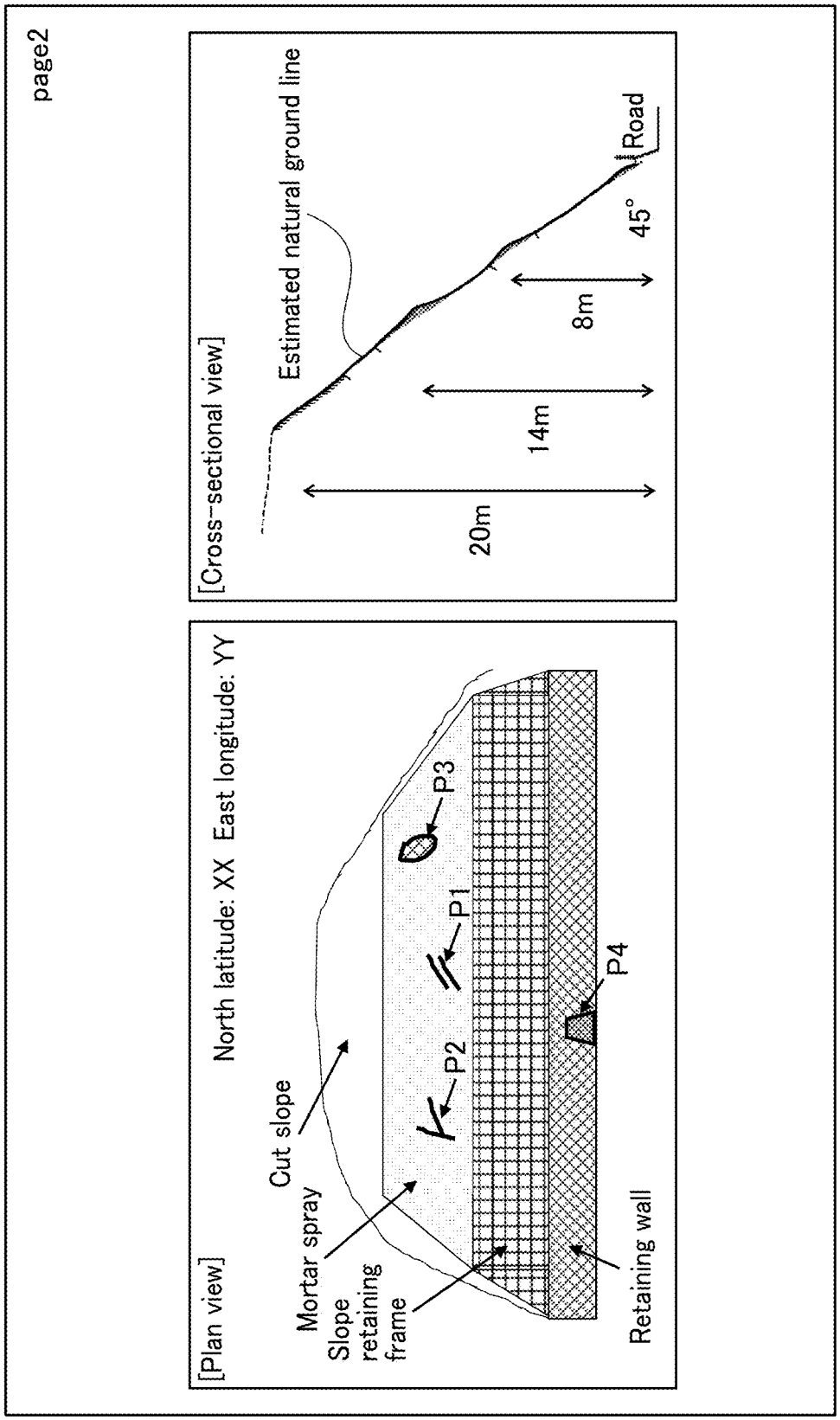
FIG. 24 is an illustration of an example of an evaluation report generated by the evaluation apparatus, according to an embodiment of the present disclosure.

FIG. 23 to FIG. 25 are illustrations of examples of the evaluation report generated by the evaluation apparatus 3. FIG. 23 illustrates the first page of the evaluation report. The first page includes reference items such as a route name are displayed in an upper area. The first page further includes a position map indicating a location of a slope as the inspection target and an evaluation result are displayed in a lower area. The position map illustrated in FIG. 23 includes the map information (see FIG. 21) generated by the detection unit 36.

FIG. 24 illustrates the second page of the evaluation report. The second page includes a plan view and a cross-sectional view. The evaluation report illustrated in FIG. 24 is generated based on the damage detection result and the shape detection result by the detection unit 36. The plan view includes an image indicating the damage analysis result (see FIG. 19) by the detection unit 36. The cross-sectional view includes the cross-sectional view (see FIG. 20) of the slope as the evaluation target drawn based on the shape detection result by the detection unit 36.

FIG. 25 illustrates third page of the evaluation report. The third page includes images represented by the captured image data obtained by photographing the slope as the evaluation target. The evaluation report illustrated in FIG. 25 visually indicates the state and shape of the slope illustrated by the plan view and the cross-sectional view of FIG. 24.

As described, the evaluation apparatus 3 creates the evaluation report to be provided to the entity in charge of roads using the evaluation result of the slope state. Contents described in the evaluation report and the layout of the evaluation report are not limited to those described above.

As described, the evaluation system 4 evaluates the slope state using the captured image data, the sensor data (three-dimensional data), and the positioning data acquired by the mobile apparatus system 60, to generate a report indicating the shape of the slope and the position and degree of damage. Thus, the evaluation system 4 enhances the quality and efficiency of the report generation function as an image determination service used for a slope inspection or a slope shape or damage determination service.

In the state detection processing, the detection unit 36 does not have to perform all the processing illustrated in FIG. 17. It suffices that the detection unit 36 performs at least the shape detection processing of steps S71 to S73. The evaluator instructs the detection unit 36 to perform the damage detection processing of steps S74 to S76 and the map information generation processing of steps S77 to S79 in addition to the shape detection processing as needed, to generate the evaluation report in which detailed evaluation results are described.

Figure 26:
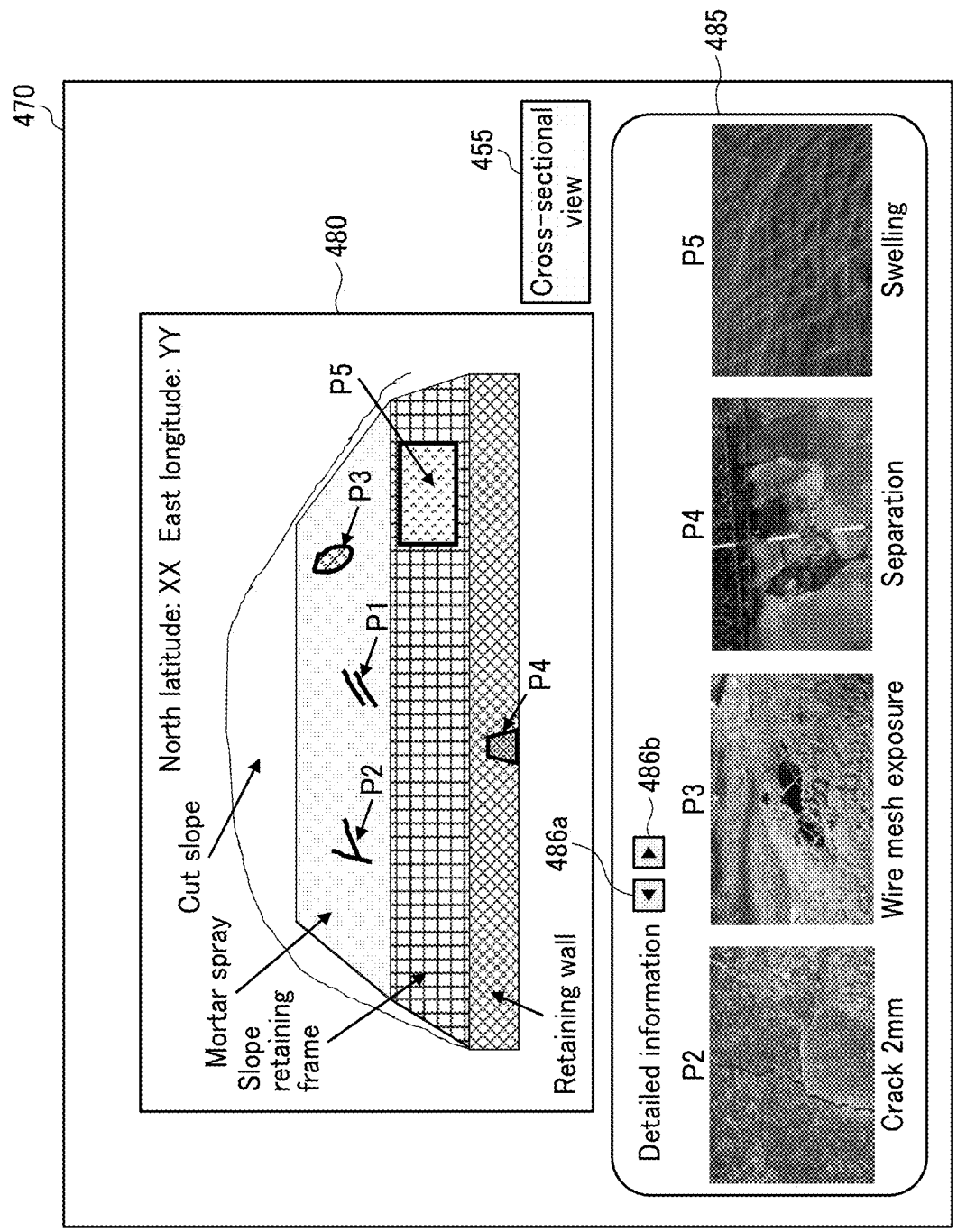
FIG. 26 is an illustration of another example of a display screen displaying a damage detection result, according to an embodiment of the present disclosure.

Modifications of Evaluation of Slope State:

Referring to FIG. 26 and FIG. 27, modifications of the evaluation processing of the slope state are described.

FIG. 26 is an illustration of a display screen displaying a result of the damage detection. FIG. 27 is an illustration of a cross-section image of the detected shape of the slope. In the display screen 470 illustrated in FIG. 26 and the cross-section image 475 illustrated in FIG. 27, a newly detected deformation (P5) is drawn in addition to the examples illustrated in FIG. 18 and FIG. 19. At the position of P5, swelling (floating) is detected. Thus, by performing detection using the distance sensor, more detailed three-dimensional information can be obtained.

Figure 28:
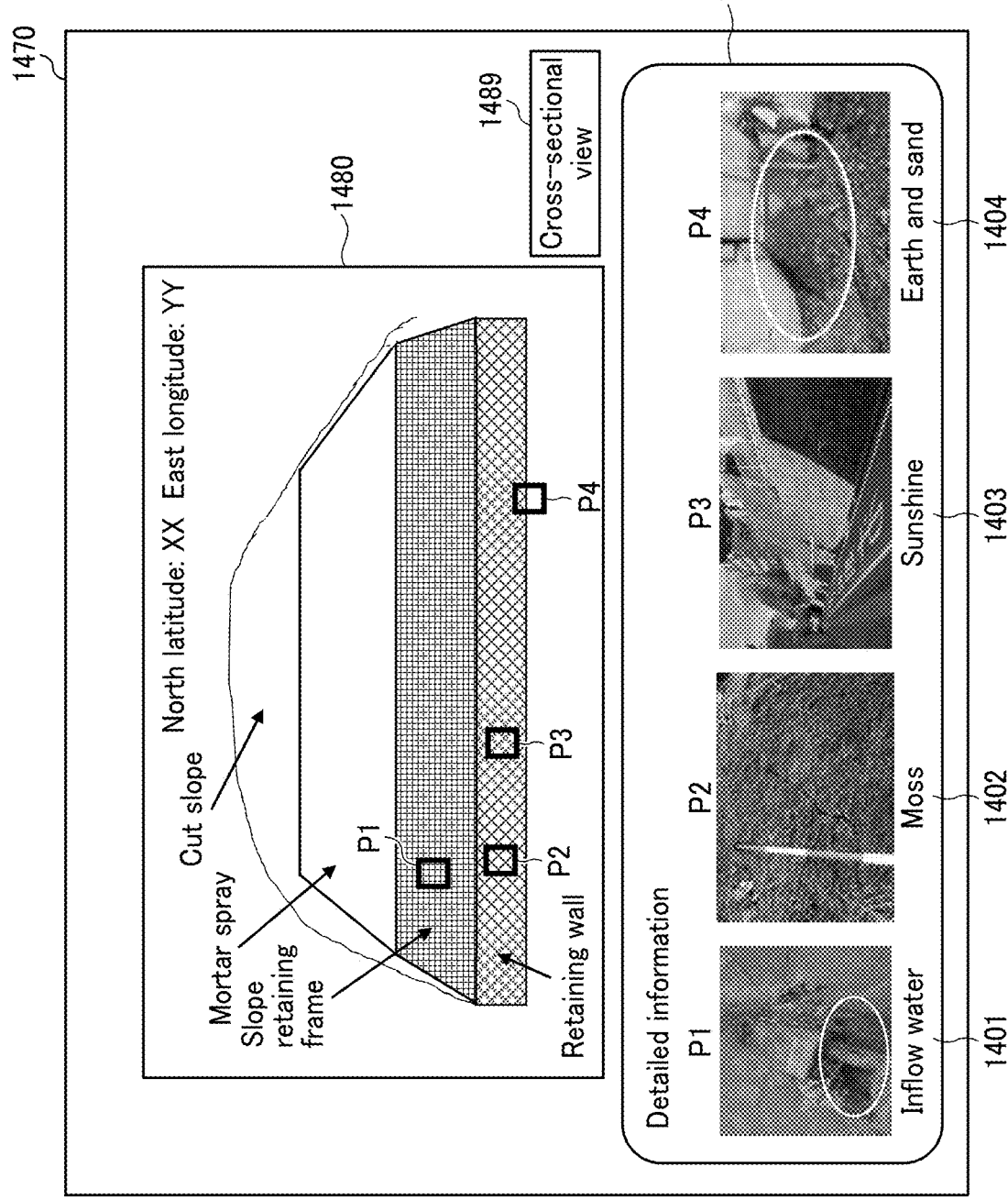
FIG. 28 is an illustration of an example of a display screen displaying a result of sign detection, according to an embodiment of the present disclosure.

FIG. 28 is a diagram illustrating an example of a display screen displaying a result of the sign detection, and corresponds to the display screen displayed on the display 306 in step S82 of FIG. 17.

The display screen 1470 illustrated in FIG. 28 includes a display image area 1480, a detailed information display area 1485, and the "cross-sectional view" button 1489. In the display image area 1480, one or more detected positions of one or more signs of deformation in the entire slope as the evaluation target are displayed. In the detailed information display area 1485, one or more captured images respectively corresponding to the one or more detected positions of the signs of deformation are displayed. The "cross-sectional view" button 1489 is a button to be pressed for displaying a cross-sectional view of the detected slope. The display image area 1480 includes a plan view in which images (P1 to P4) indicating positions of the detected signs of deformation are drawn for an image indicating a two-dimensional shape of the slope as the evaluation target. The display image area 1480 includes information indicating position coordinates (positioning data) indicating the position of the slope as the evaluation target.

In the detailed information display area 1485, comments 1401 to 1404 are displayed in association with the images P1 to P4 indicating the positions of the signs of deformation, respectively.

As described in step S82 of FIG. 17, these comments 1401 to 1404 are generated as comments indicating the types of physical quantities around the slope by referring to the training images of the state type management table illustrated in FIG. 8 based on the images P1 to P4.

FIG. 29 and FIG. 30 are illustrations of examples of the evaluation report including a result of the sign detection.

The evaluation report illustrated in FIG. 29 including the result of the sign detection includes captured images P1 to P4 and comments 1401 to 1404 indicating signs of deformation in the slope as the evaluation target corresponding to the images P1 to P4 and the comments 1401 to 1404 displayed in the detailed information display area 1485 illustrated in FIG. 28 displayed on the display 306.

The evaluation report illustrated in FIG. 30 including the result of the sign detection includes a captured image P1 and a captured image P2 obtained by photographing the slope as the evaluation target, and a comment 1411 and a comment 1412. The evaluation report illustrated in FIG. 30 further includes a captured image P3 and a captured image P4 indicating signs of deformation in the slope as the evaluation report, and a comment 1413 and a comment 1414.

The evaluation report including the result of the sign detection illustrated in FIG. 29 and FIG. 30 may be included in the evaluation report illustrated in FIG. 23 to FIG. 25. Alternatively, the evaluation report including the result of the sign detection illustrated in FIG. 29 and FIG. 30 may be used as supplementary materials for the evaluation report illustrated in FIG. 23 to FIG. 25.

Figure 31:
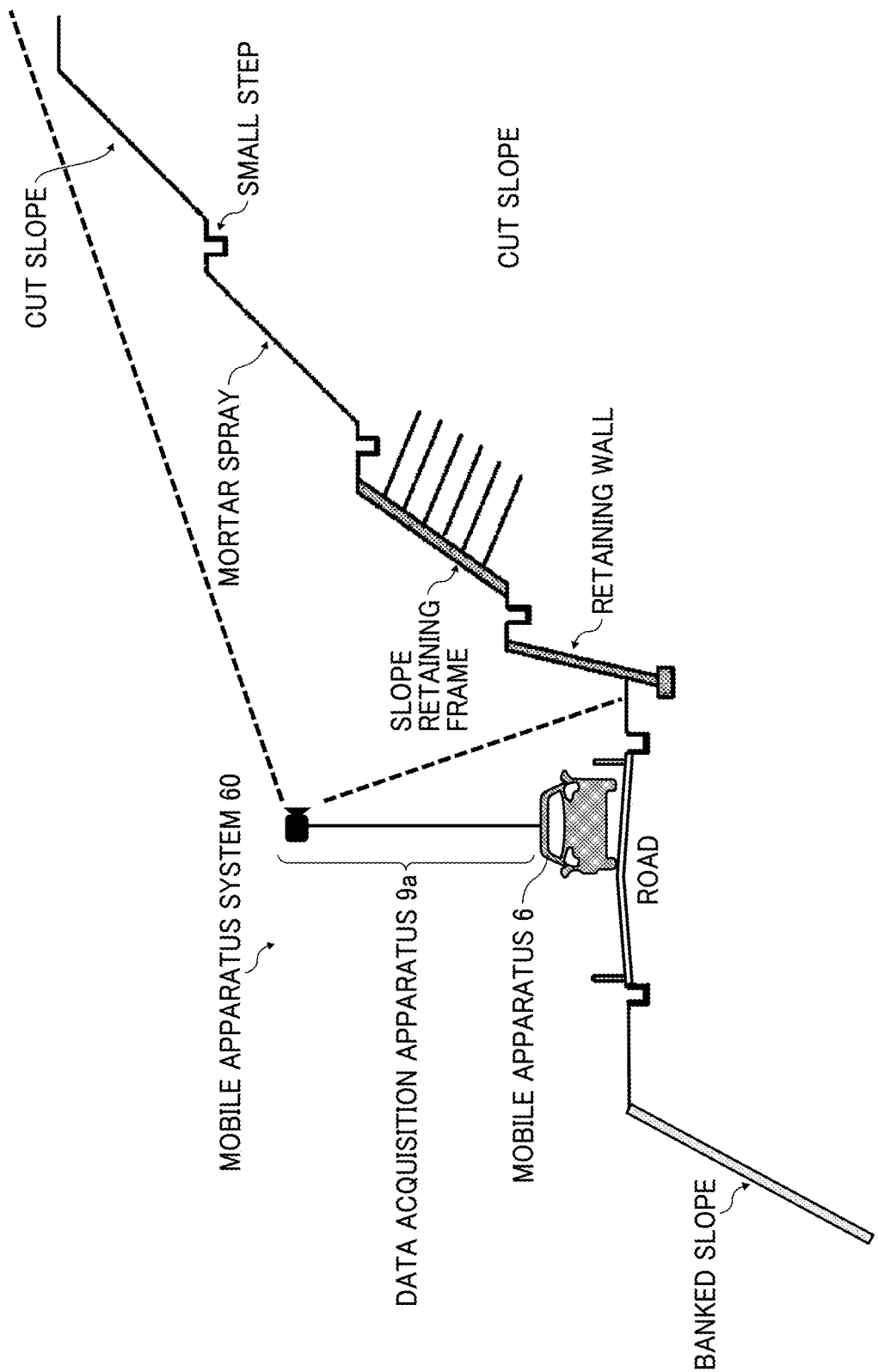
FIG. 31 is an illustration of an example of a situation in which a slope state is inspected using the mobile apparatus system according to Modification 1.
Figure 32:
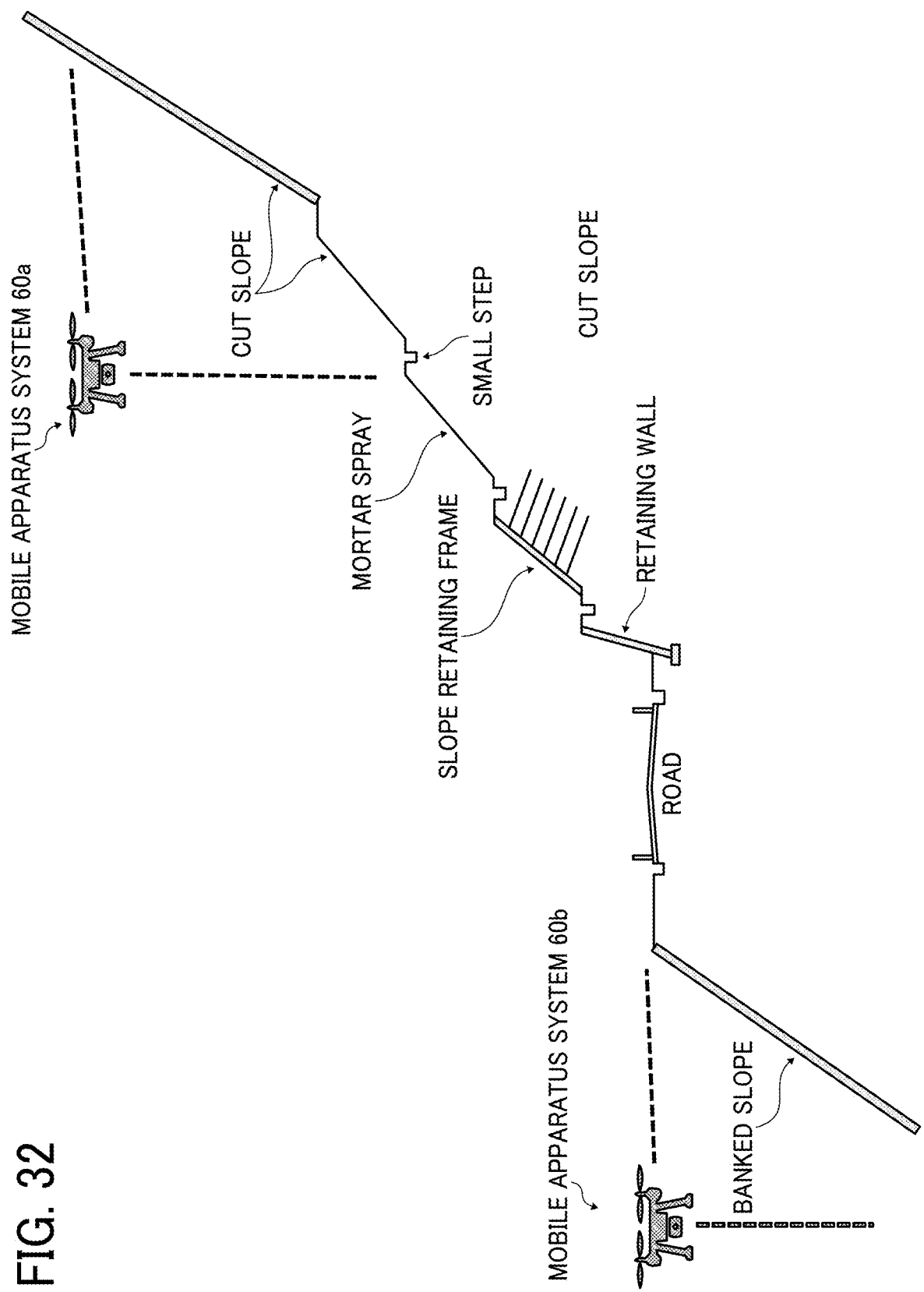
FIG. 32 is an illustration of an example of a situation in which a slope state is inspected using the mobile apparatus system according to Modification 2.
Figure 33:
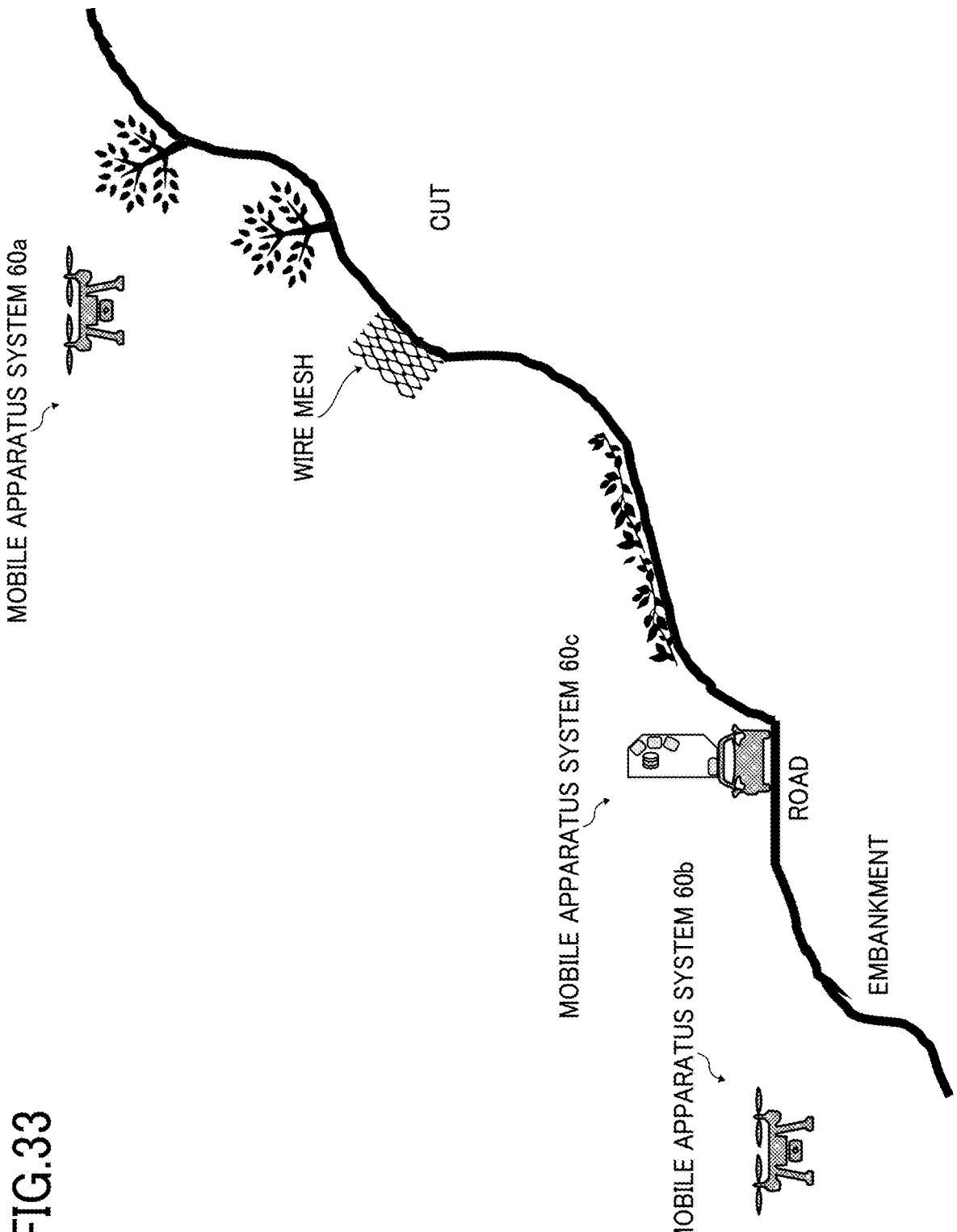
FIG. 33 is an illustration of an example of a situation in which a slope state is inspected using the mobile apparatus system according to Modification 3.

Modifications of Mobile Apparatus System:

Modification 1:

Referring to FIG. 31 to FIG. 33, modifications of the mobile apparatus system 60 are described. FIG. 31 is an illustration of an example of a situation in which a slope state is inspected using the mobile apparatus system 60 according to Modification 1. The mobile apparatus system 60 according to Modification 1 is a system in which the data acquisition apparatus 9 is fixed to a pole installed on the upper surface of the mobile apparatus 6 in order to enable imaging of high places.

Since the height of the image capturing device 7 according to the above-described embodiment from the ground is low, there are difficulties in photographing a small step at a higher position from a retaining wall, a small step at a higher position from a slope retaining frame, or a small step at a higher position from mortar spray as illustrated in FIG. 31. As illustrated in FIG. 31, since current small steps as earthwork structures are not covered, dead leaves or the like may be accumulated in the small steps, causing a trouble of clogging waterways. For this reason, small steps have to be cleaned up at regular intervals. When it is difficult for a person to climb a slope to check the degree of clogging of waterways, the degree of clogging can be checked by causing the mobile apparatus 6 to travel and the mobile apparatus system 60 according to Modification 1 that can capture an image from a high place to perform photographing processing. This greatly improves inspection efficiency.

Modification 2:

FIG. 32 is an illustration of an example of a situation in which a slope state is inspected using the mobile apparatus system 60 according to Modification 2. The mobile apparatus system 60 (60a, 60b) according to Modification 2 uses a drone, which is an example of the mobile apparatus 6, equipped with the data acquisition apparatus 9, to capture an image of a high place that cannot be captured by the image capturing device equipped with the pole according to Modification 1 or a banked slope below the side of a road, for example.

The drone as the mobile apparatus 6 is equipped with not only the image capturing device 7 but also the data acquisition apparatus 9 including a sensor device such as the distance sensor 8a, the GNSS sensor 8b, or the angle sensor 8c. Thus, the drone as the mobile apparatus 6 can evaluate a state of a high place or an embarkment that cannot be evaluated by a vehicle as the mobile apparatus 6. As embarkments or high places are especially difficult for a person to go to close for visual observation, photographing by a drone as in Modification 2 is desired. Further, embarkments or slopes in high places have many places covered with vegetation such as trees and grasses. For this reason, preferably, the data acquisition apparatus 9 includes the image capturing device 7 that can capture a wide-angle image.

Modification 3:

FIG. 33 is an illustration of an example of a situation in which a slope state is inspected using the mobile apparatus system 60 according to Modification 3. As illustrated in FIG. 33, a slope has a complicated structure unlike tunnels or bridges, which are structure on roads. For example, in some cases, a slope has an incline that is wavy rather than flat (e.g., an earthwork structure obtained by spraying mortar on a quay wall). In some cases, vegetation is grown on a slope. In some cases, a slope is covered with a wire mesh. For this reason, the mobile apparatus system 60 (60a, 60b, 60k) according to Modification 3 includes, as the sensor device 8, a spectral camera, an infrared camera, or an expanded depth of field (EDof) camera that can acquire wavelength information in order to distinguish an object such as a plant or a wire mesh from the shape of the slope.

Further, preferably, the mobile apparatus system 60 according to Modification 3 includes, in addition to or in alternative to a tool for distinguishing the shape of the slope from other objects, a lighting device equipped to the data acquisition apparatus 9, so that a slope is photographed under various conditions such as weather and sunshine. Preferably, the lighting device is a line lighting device that irradiates an area corresponding to an imaging range of the image capturing device 7, or a time-division lighting device synchronized with the image capturing device 7 and the sensor device 8.

Preferably, in order to process data acquired by the mobile apparatus system 60 according to Modification 3, the evaluation target data generation unit 35 of the evaluation apparatus 3 has an image processing function such as an image stabilization function, a focal depth correction function (blur correction function), a distortion correction function, or a contrast enhancement function so as not to overlook even small deformations. Further, preferably, the evaluation target data generation unit 35 has a function of removing noise that conceals a deformation on an earthwork structure such as grass, moss, or wire mesh, or a function of distinguishing a shadow of grass or the like from a deformation such as a crack. Thus, using the mobile apparatus system 60 according to Modification 3, the state inspection system 1 can accurately evaluate a slope state in a place having a complicated structure or a place where grass, moss, a wire mesh, or the like is present.

Figure 34:
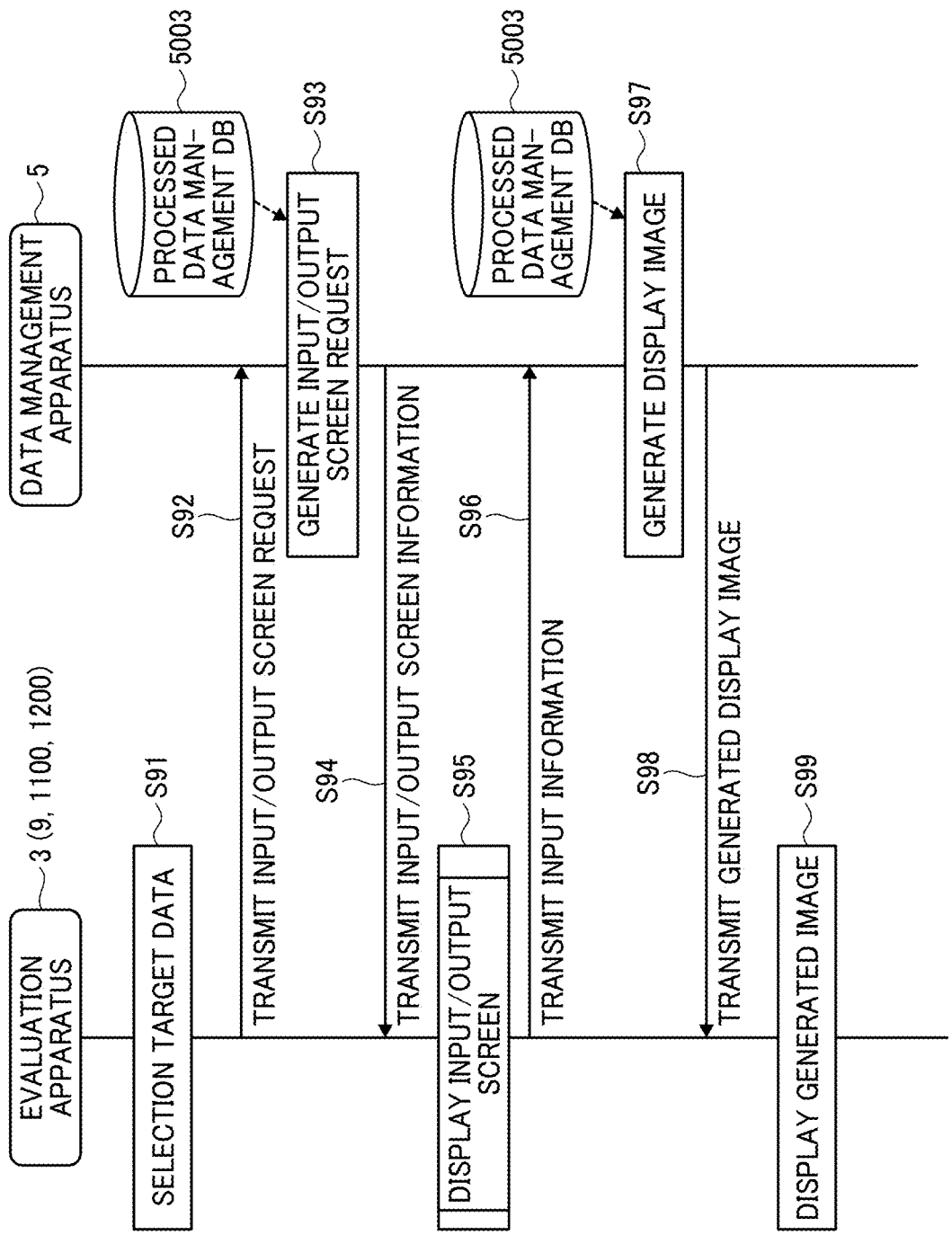
FIG. 34 is a sequence diagram illustrating an example of display operation performed by the state inspection system, according to an embodiment of the present disclosure.

FIG. 34 is a sequence diagram illustrating an example of display operation performed by the state inspection system 1.

In the following, a sequence between the evaluation apparatus 3 and the data management apparatus 5 is described. The same or substantially the same sequence are performed between the data acquisition apparatus 9, the terminal apparatus 1100, and the terminal apparatus 1200 and the data management apparatus 5.

In response to designating of a desired folder by, for example, using the "designate folder" button 411 illustrated in FIG. 15 by a user of the evaluation apparatus 3, the receiving unit 32 of the evaluation apparatus 3 receives selection of a target data (step S91). In the example of FIG. 15, the receiving unit 32 receives selection of evaluation data stored in the "folder 0615". Alternatively, the user of the evaluation apparatus 3 selects a desired position in the map information managed by the map data management unit 37 of the evaluation apparatus 3, the receiving unit 32 of the evaluation apparatus 3 may receive selection of location information in the map information.

Next, the communication unit 31 transmits a request for an input/output screen relating to the target data selected in step S91 to the data management apparatus 5. The communication unit 51 of the data management apparatus 5 receives the request transmitted from the evaluation apparatus 3 (step S92). This request includes a folder name of the folder selected in step S91. Alternatively, this request may include the location information in the map information.

Next, the storing and reading unit 59 of the data management apparatus 5 searches the processed data management DB 5003 (see FIG. 9B) using the folder name included in the request received in step S92 as a search key, to read an image associated with the folder name included in the request. Alternatively, the storing and reading unit 59 searches the acquired data management DB 5001 using the location information included in the request received in step S92 as a search key, to read an image associated with the location information included in the request.

The generation unit 54 of the data management apparatus 5 generates an input/output screen including the image data based on the image data read by the storing and reading unit 59 (step S93). This input/output screen is a screen for receiving an instruction operation for instructing generation of an image indicating a particular position in a slope.

The communication unit SI transmits input/output screen information relating to the input/output screen generated in step S93 to the evaluation apparatus 3. The communication unit 31 of the evaluation apparatus 3 receives the input/output screen information transmitted from the data management apparatus 5 (step S94). Step S94 is an example of a generation reception screen transmission step.

Next, the display control unit 33 of the evaluation apparatus 3 controls the display 306 to display the input/output screen received in step S94 (step S95). The receiving unit 32 of the evaluation apparatus 3 receives an input operation by the user with respect to the displayed input/output screen. The input operation includes an instruction operation for instructing generation of an image indicating the particular position in the slope. Step S95 is an example of a receiving step.

The communication unit 31 transmits input information relating to the input operation received by the receiving unit 32 to the data management apparatus 5. The communication unit 51 of the data management apparatus 5 receives the input information transmitted from the evaluation apparatus 3 (Step S96). This input information includes instruction information instructing generation of an image indicating the particular position in the slope.

According to the received input information, the generation unit 54 of the data management apparatus 5 generates a display image using the image read by the storing and reading unit 59 in step S93 (step S97).

This display image includes a surface display image and a cross-section display image. The surface display image includes a surface image indicating a surface of a slope and a surface position image indicating the particular position in the surface image. The cross-section display image includes a cross-section image indicating a cross-section of the slope and a cross-section position image indicating the particular position in the cross section image. Step S97 is an example of an image generation step.

The communication unit 51 of the data management apparatus 5 transmits the display image generated in step S97 to the evaluation apparatus 3. The communication unit 31 of the evaluation apparatus 3 receives the display image transmitted from the data management apparatus 5 (step S98). Step S98 is an example of a display image transmission step.

The display control unit 33 of the evaluation apparatus 3 controls the display 306 to display the display image received in step S98 (step S99). Step S99 is an example of a display step.

Although the description provided above referring to FIG. 34 is of an example in which the display processing is performed between the evaluation apparatus 3 and the data management apparatus 5, in another example, the evaluation apparatus 3 may independently perform the display processing.

In this case, steps S92, S94, S96, and S98 relating to data transmission and reception are omitted, and the evaluation apparatus 3 independently performs the processes of steps S91, S93, S95, S97, and S99, to perform the same display processing as described referring to FIG. 34. In the same or substantially the same manner to the evaluation apparatus 3, each of the data acquisition apparatus 9, the terminal apparatus 1100, and the terminal apparatus 1200 can also independently perform the display processing.

Figure 35:
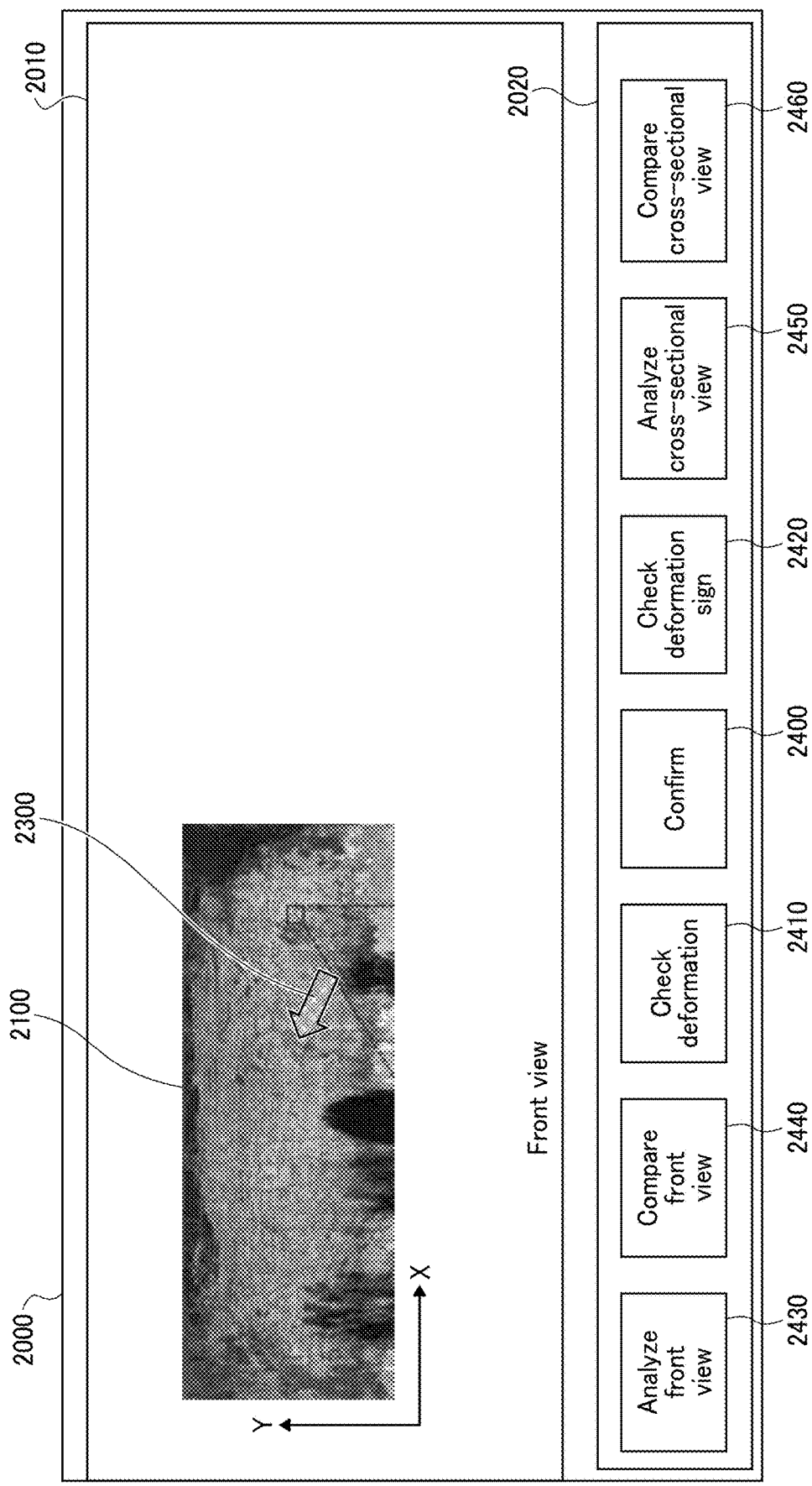
FIG. 35 is an illustration for describing an operation on a display screen of the state inspection system, according to an embodiment of the present disclosure.

Generation of Surface Display Image According to Operation Designating Particular Position:

FIG. 35 is an illustration for describing an operation on a display screen of the state inspection system 1. FIG. 35 illustrates an input/output screen 2000 displayed on the display 306 of the evaluation apparatus 3 in step S95 of the sequence diagram of FIG. 34. The input/output screen 2000 displayed on a display of each of the data acquisition apparatus 9, the terminal apparatus 1100, and the terminal apparatus 1200 in the same or substantially the same manner as the evaluation apparatus 3.

The display control unit 33 of the evaluation apparatus 3 controls the display 306 to display the input/output screen 2000 including a designation reception screen 2010 and a generation instruction reception screen 2020. The designation reception screen 2010 receives a designation operation for designating a particular position on a slope. The generation instruction reception screen 2020 receives an instruction operation for instructing generation of an image indicating the particular position in the slope.

The display control unit 33 controls the display 306 to display a surface image 2100 indicating a surface of the slope in the designation reception screen 2010, and to display a pointer 2300 operated by the pointing device 312 on the surface image 2100.

The surface image 2100 is an image read from the captured image data illustrated in FIG. 9A in step S92 of FIG. 34. The display control unit 33 controls the display 306 to display the surface image 2100 in association with the captured image 1 and the captured image 2 illustrated in FIG. 10 and the X-axis direction and the Y-axis direction illustrated in the captured image data 7A illustrated in FIG. 11.

The display control unit 33 controls the display 306 to display the generation instruction reception screen 2020 including a designated position confirmation button 2400, a deformation check button 2410, a deformation sign check button 2420, a front view analysis button 2430, a front view comparison button 2440, a cross-sectional view analysis button 2450, and a cross-sectional view comparison button 2460. The deformation check button 2410, the deformation sign check button 2420, the front view analysis button 2430, the front view comparison button 2440, the cross-sectional view analysis button 2450, and the cross-sectional view comparison button 2460 are buttons for instructing generation of an image indicating a particular position in the slope, with a position of an area satisfying a predetermined condition in the surface image 2100 or the cross-section image 2200 as the particular position.

The designated position confirmation button 240X) is a button for instructing to confirm the particular position in the slope designated on the designation reception screen 2010 and to generate the image indicating the particular position on the slope.

The deformation check button 2410 is a button for instructing generation of an image indicating a particular position in the slope, with a position indicating a deformation of the slope as the particular position. The deformation sign check button 2420 is a button for instructing generation of an image indicating a particular position in the slope, with a position indicating a sign of deformation of the slope as the particular position.

The front view analysis button 2430 is a button for instructing generation of an image indicating a particular position in the slope, with an area obtained by analyzing the surface image 2100 as the particular position. The front view comparison button 2440 is a button for instructing generation of an image indicating a particular position in the slope, with an area obtained by comparing the surface image 2100 with another image as the particular position.

The cross-sectional view analysis button 2450 is a button for instructing generation of an image indicating a particular position in the slope, with an area obtained by analyzing a cross-section image described below as the particular position. The cross-sectional view comparison button 2460 is a button for instructing generation of an image indicating a particular position in the slope, with an area obtained by comparing the cross-section image with another image as the particular position.

FIG. 36A and FIG. 36B are flowcharts of processes based on the operation described referring to FIG. 35. FIG. 36A illustrates processes performed by the evaluation apparatus 3. FIG. 36B illustrates processes performed by the data management apparatus 5.

In response to pointing to a certain position on the surface image 2100 by the pointer 2300, the receiving unit 32 of the evaluation apparatus 3 receives the pointing operation (step S101). In response to an operation to the designated position confirmation button 2400, the receiving unit 32 receives this operation (step S102).

Next, the determination unit 34 of the evaluation apparatus 3 detects XY coordinates of the pointed position in the surface image 2100 as a particular position (step S103). This particular position may indicate a point on the XY coordinates or may indicate an area on the XY coordinates.

Next, the communication unit 31 of the evaluation apparatus 3 transmits input information relating to the input operation received by the receiving unit 32 to the data management apparatus 5 (step S104). This input information includes designation information and instruction information. The designation information designates the particular position in XY coordinates based on the pointing operation by the pointer 2300. The instruction information instructs generation of an image indicating the particular position in the slope according to an operation to the designated position confirmation button 2400. The instruction information is an example of a creation instruction.

The communication unit 51 of the data management apparatus 5 receives the input information transmitted from the evaluation apparatus 3. According to the instruction information and the designation information included in the received input information, the generation unit 54 generates a surface position image that overlaps the XY coordinates of the particular position and superimposes the surface position image on the surface image using the image data illustrated in FIG. 11A to generate a surface display image (step S105). The surface position image does not have to exactly match the XY coordinates of the particular position. It suffices that the surface position image overlaps the XY coordinates of the particular position.

Next, the generation unit 54 generates the cross-section image corresponding to the X coordinate of the particular position using the image data illustrated in FIG. 11A and the distance measurement data illustrated in FIG. 11B (step S106). When the distance measurement data illustrated in FIG. 11B does not include the X coordinate of the particular position, the generation unit 54 generates the cross-section image based on data in the vicinity of the X coordinate of the particular position included in the distance measurement data illustrated in FIG. 11B.

The description provided above is of an example in which the generation unit 54 generates the cross-section image of a cross section including the Z-axis direction and the vertical direction illustrated in FIG. 10 in step S107. Alternatively, the generation unit 54 may generate the cross-section image of a cross section including directions inclined from the Z-axis direction and the vertical direction or the cross section image of a cross section including a direction inclined from the Z-axis direction.

The generation unit 54 generates a cross-section position image that overlaps the Y coordinates of the particular position and superimposes the cross-section position image on a ridgeline of the cross-section image, to generate the cross-section display image (step S107).

The communication unit 51 transmits the surface display image generated in step S106 and the cross-section display image generated in step S108 to the evaluation apparatus 3 (step S108).

Then, as described referring to steps S98 and S99 of FIG. 34, the communication unit 31 of the evaluation apparatus 3 receives the surface display image and the cross-section display image transmitted from the data management apparatus 5. The display control unit 33 of the evaluation apparatus 3 controls the display 306 to display the received surface display image and cross-section display image.

Figure 37:
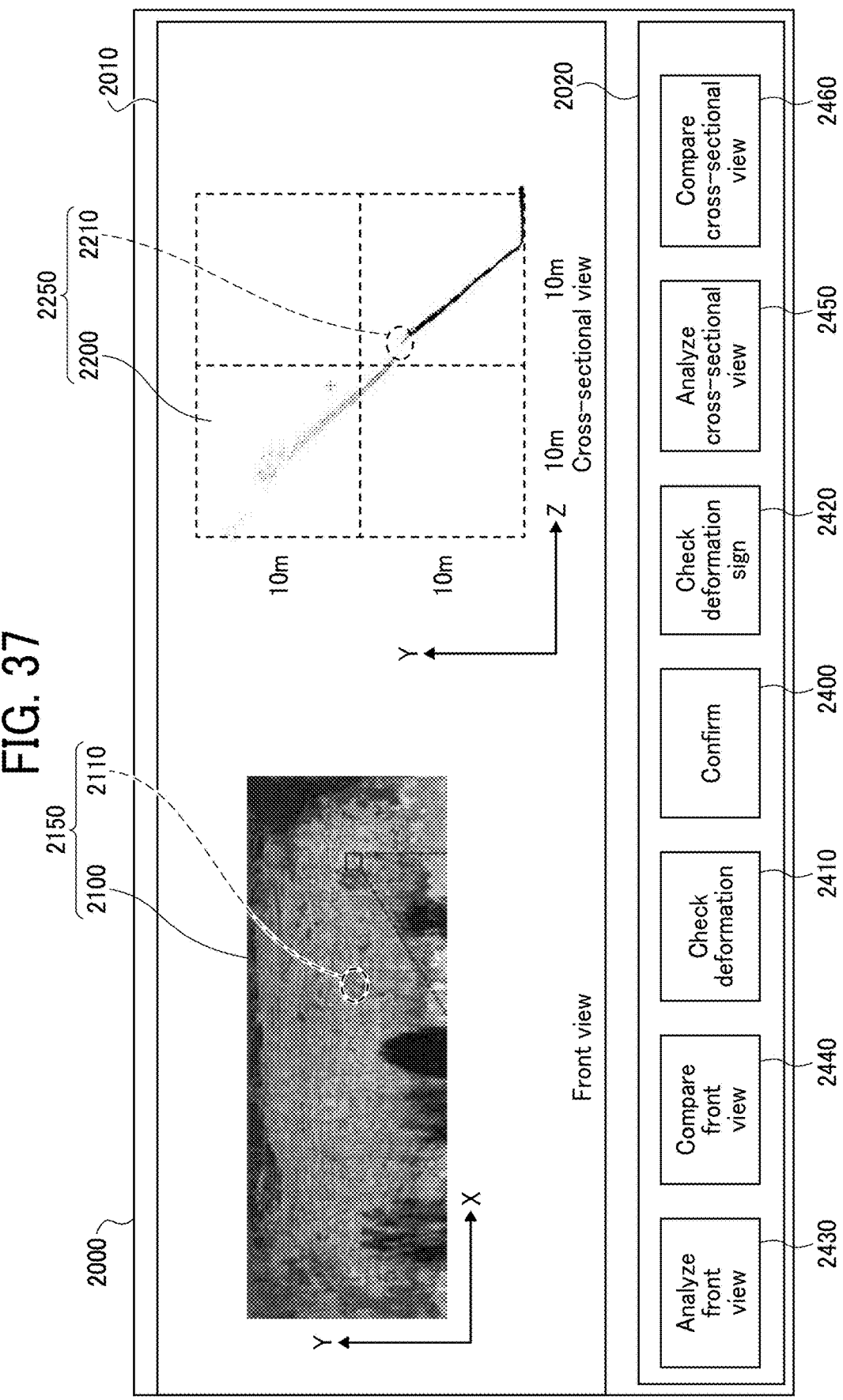
FIG. 37 is an illustration of an example of a display screen after processes described referring to FIG. 34, according to an embodiment of the present disclosure.

FIG. 37 illustrates an example of a display screen after the processes described referring to FIG. 34. FIG. 37 illustrates the input/output screen 2000 displayed on the display 306 of the evaluation apparatus 3 in step S99 of the sequence diagram of FIG. 34.

Content displayed in the generation instruction reception screen 2020 is the same as the content illustrated in FIG. 35. However, content displayed in the designation reception screen 2010 is different from that illustrated in FIG. 35.

The display control unit 33 of the evaluation apparatus 3 controls the display 306 to display a surface display image 2150 and a cross-section display image 2250 in the designation reception screen 2010. The surface display image 2150 includes a surface image 2100 indicating a surface of a slope and a surface position image 2110 indicating the particular position in the surface image 2100. The cross-section display image 2250 includes a cross-section image 2200 indicating a cross-section of the slope and a cross-section position image 2210 indicating the particular position in the cross-section image 2200.

The display control unit 33 displays the cross-section image 2200 in association with the Y-axis direction and the Z-axis direction illustrated in FIG. 10.

The user can appropriately check the state of the particular position by comparing the surface position image 2110 with the cross-section position image 2210.

Figure 38:
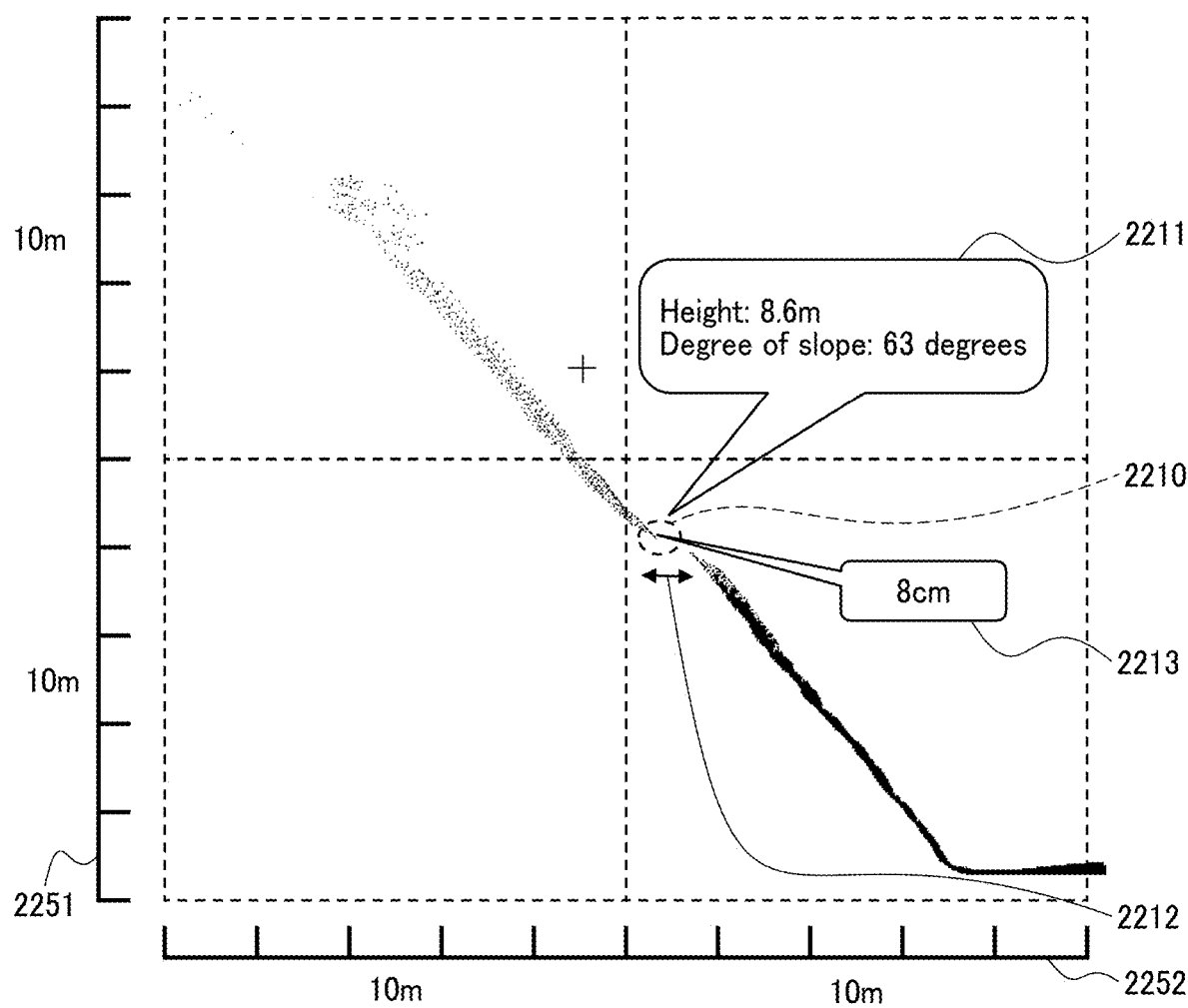
FIG. 38 is a specific example of a cross-section display image displayed on a display screen, according to an embodiment of the present disclosure.

FIG. 38 is a specific example of the cross-section display image 2250 displayed on the display screen.

The display control unit 33 of the evaluation apparatus 3 controls the display 306 to display the cross-section display image 2250 in association with a scale 2251 in the Y-axis direction and a scale 2252 in the Z-axis direction.

Further, the display control unit 33 controls the display 306 to display detailed information 2211 such as a length and a height of the particular position in association with the cross-section position image 2210.

Furthermore, the display control unit 33 controls the display 306 to display a ruler 2212 and distance information 2213 such as 8 cm in response to an operation of pointing two points with the pointer 2300.

Figure 39B:
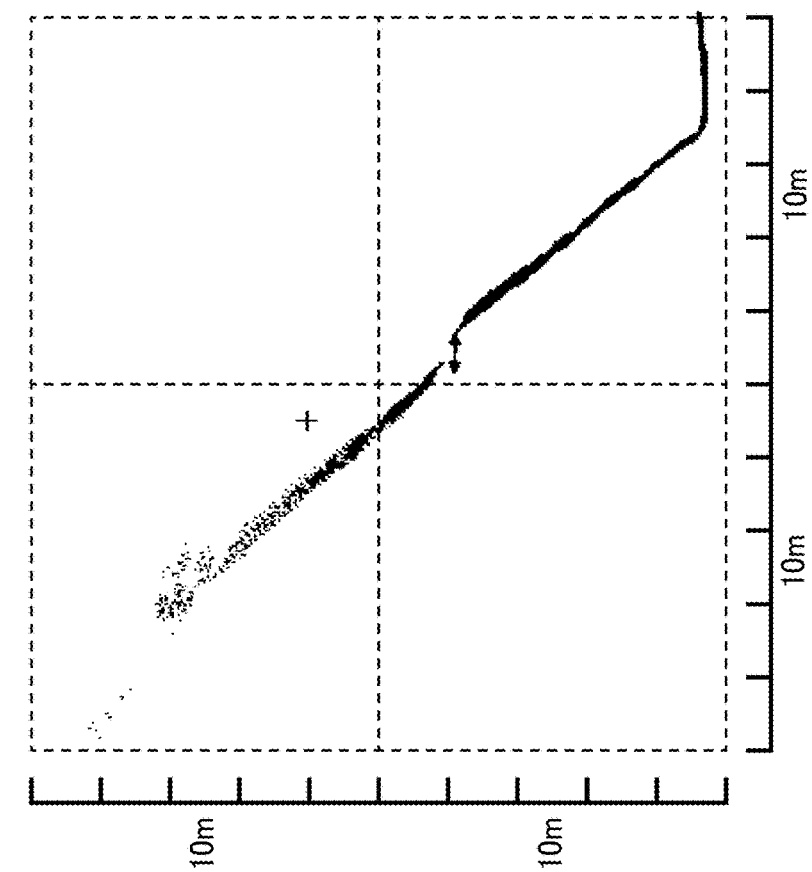
FIG. 39A and FIG. 39B are illustrations for describing a cross-section display image displayed on a display screen, according to an embodiment of the present disclosure.
Figure 39A:
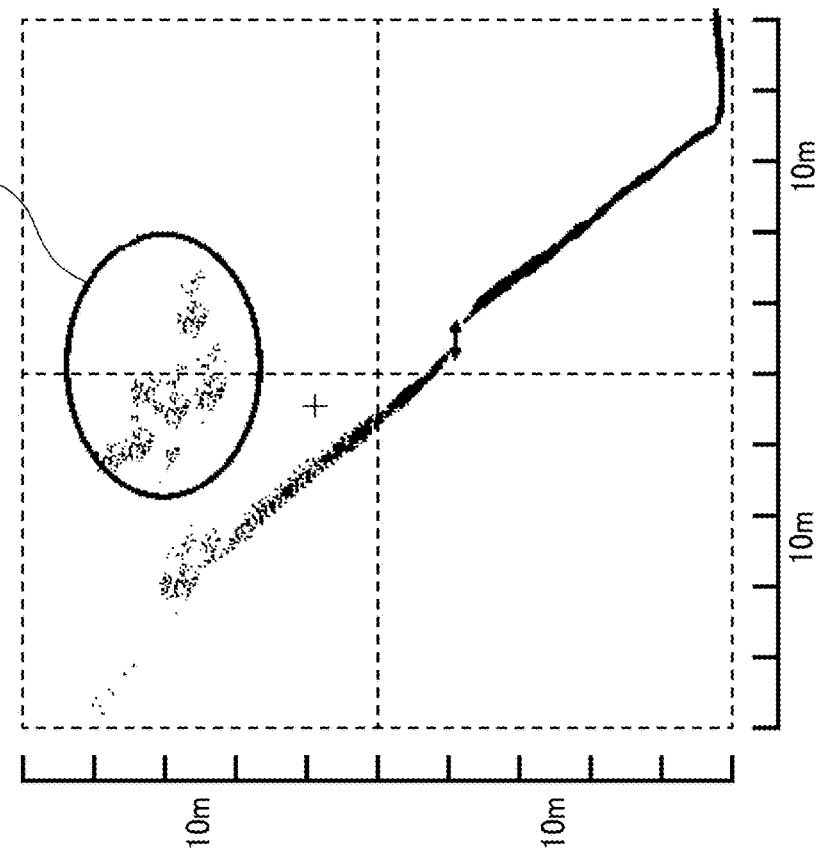

FIG. 39A and FIG. 39B are illustrations for describing the cross-section display image displayed on the display screen.

In FIG. 39A, the display control unit 33 of the evaluation apparatus 3 displays an area 2201 that does not relate to the slope, such as a tree branch or a utility pole, with the cross-section display image 2250. However, as illustrated in FIG. 39B, the display control unit 33 of the evaluation apparatus 3 preferably does not display the area 2201 that does not relate to the slope, such as a tree branch or a utility pole.

Figure 40:
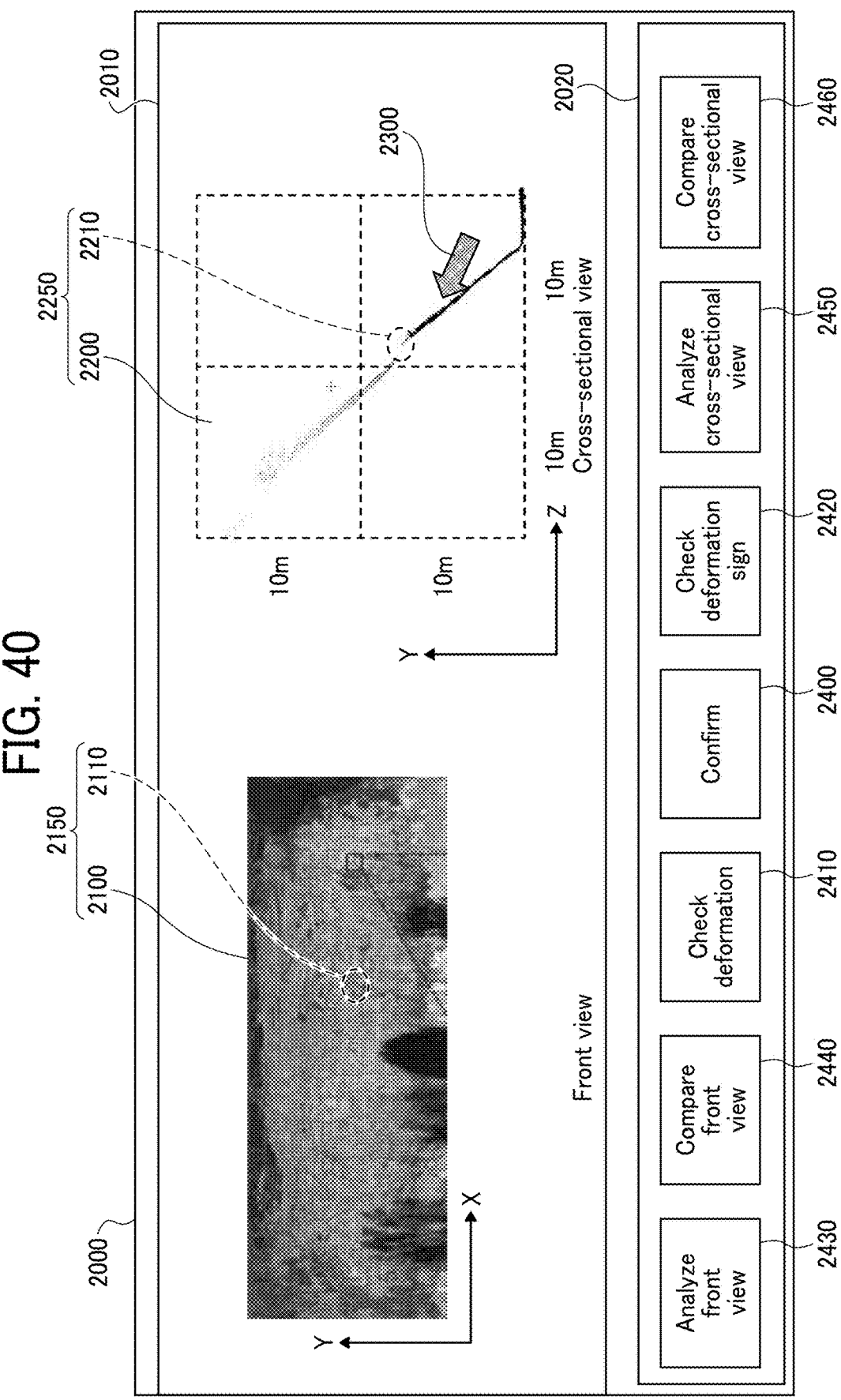
FIG. 40 is an illustration for describing an operation on a display screen, according to an embodiment of the present disclosure.

Generation of Cross-Section Display Image According to Operation of Designating Particular Position:

FIG. 40 is an illustration for describing an operation on the display screen. FIG. 40 illustrates an operation on the display screen illustrated in FIG. 37. The display control unit 33 controls the display 306 to display the pointer 2300 operated by the pointing device 312 on the cross-section image 2200.

Figure 41B:
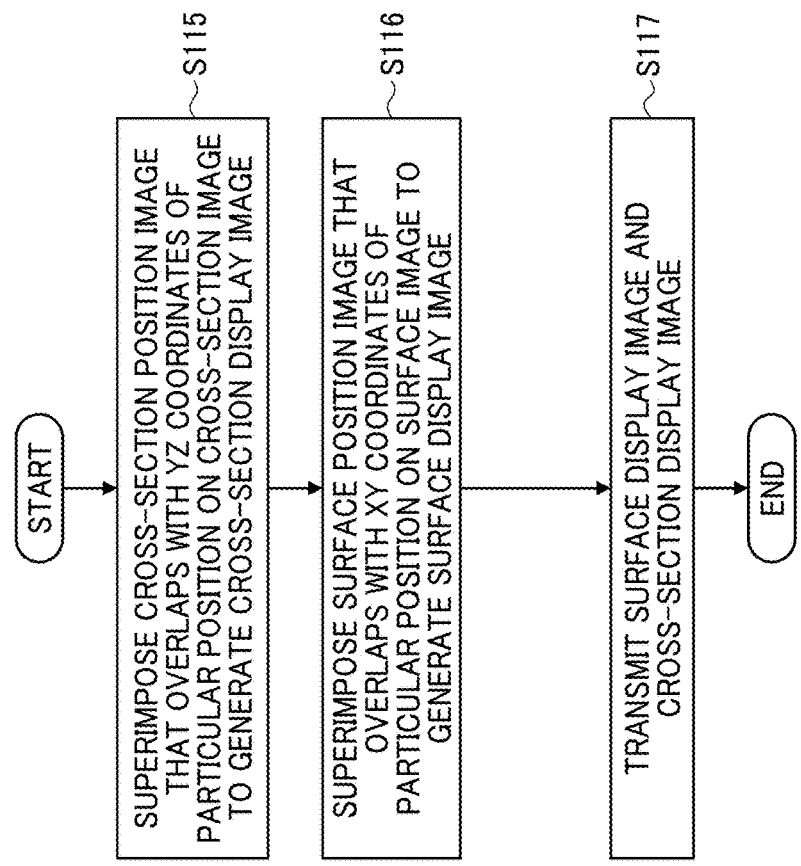
FIG. 41A and FIG. 41B are flowcharts of processes based on an operation described referring to FIG. 38, according to an embodiment of the present disclosure.
Figure 41A:
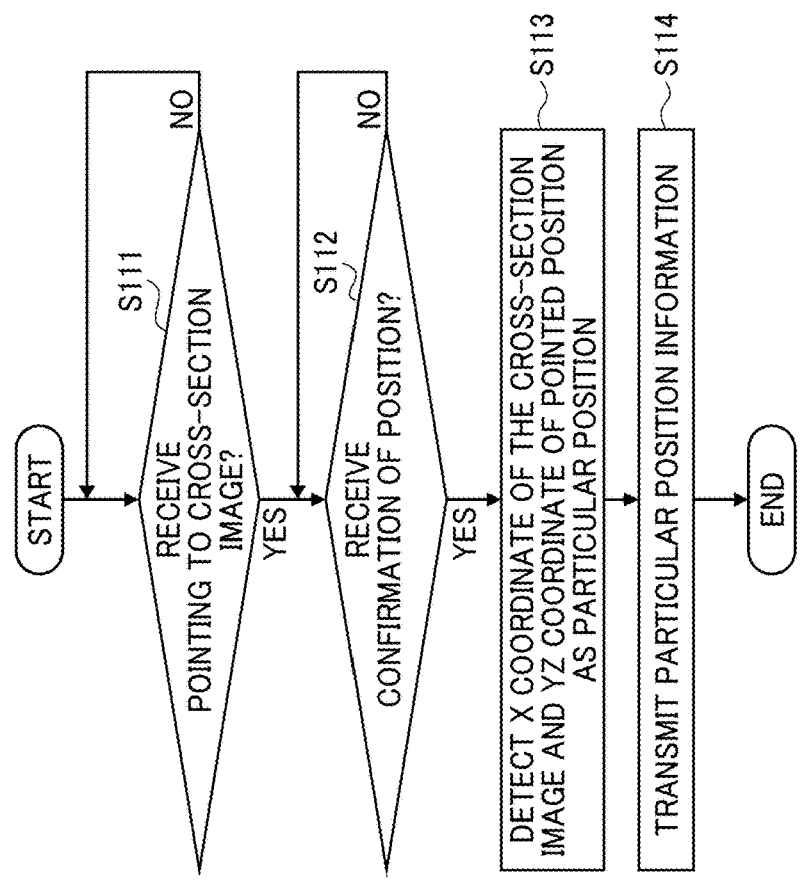

FIG. 41A and FIG. 41B are flowcharts of processes on the operation described referring to FIG. 38.

FIG. 41A illustrates processes performed by the evaluation apparatus 3. FIG. 41B illustrates processes performed by the data management apparatus 5.

In response to pointing to a certain position on the cross-section image 220 by the pointer 2300, the receiving unit 32 of the evaluation apparatus 3 receives the pointing operation (step S111). In response to an operation to the designated position confirmation button 2400, the receiving unit 32 receives this operation (step S112).

Next, the determination unit 34 of the evaluation apparatus 3 detects an X coordinate of the cross-section image 2200 and YZ coordinates of the pointed position in the cross-section image 2200 as a particular position (step S113). This particular position may indicate a point on the YZ coordinates or may indicate an area on the YZ coordinates.

Next, the communication unit 31 of the evaluation apparatus 3 transmits input information relating to the input operation received by the receiving unit 32 to the data management apparatus 5 (step S114). This input information includes designation information and instruction information. The designation information designates the particular position in XYZ coordinates based on the pointing operation by the pointer 2300. The instruction information instructs generation of an image indicating the particular position in the slope according to an operation to the designated position confirmation button 2400.

The communication unit 51 of the data management apparatus 5 receives the input information transmitted from the evaluation apparatus 3. According to the instruction information and the designation information included in the received input information, the generation unit 54 generates the cross-section position image that overlaps the YZ coordinates of the particular position on the cross-section image and superimposes the cross-section position image on the cross-section image using the image data illustrated in FIG. 11A and the distance measurement data in FIG. 11B, to generate the cross-section display image (step S115).

The generation unit 54 generates the surface position image that overlaps the XY coordinates of the particular position and superimposes the surface position image on the surface image using the image data illustrated in FIG. 11A, to generate the surface display image (step S116). The surface position image does not have to exactly match the XY coordinates of the particular position. It suffices that the surface position image overlaps the XY coordinates of the particular position.

The communication unit 51 transmits the cross-section display image generated in step S115 and the surface display image generated in step S116 to the evaluation apparatus 3 (step S117).

Then, as described referring to steps S98 and S99 of FIG. 34, the communication unit 31 of the evaluation apparatus 3 receives the surface display image and the cross-section display image transmitted from the data management apparatus 5. The display control unit 33 of the evaluation apparatus 3 controls the display 306 to display the received surface display image and cross-section display image.

Figure 42:
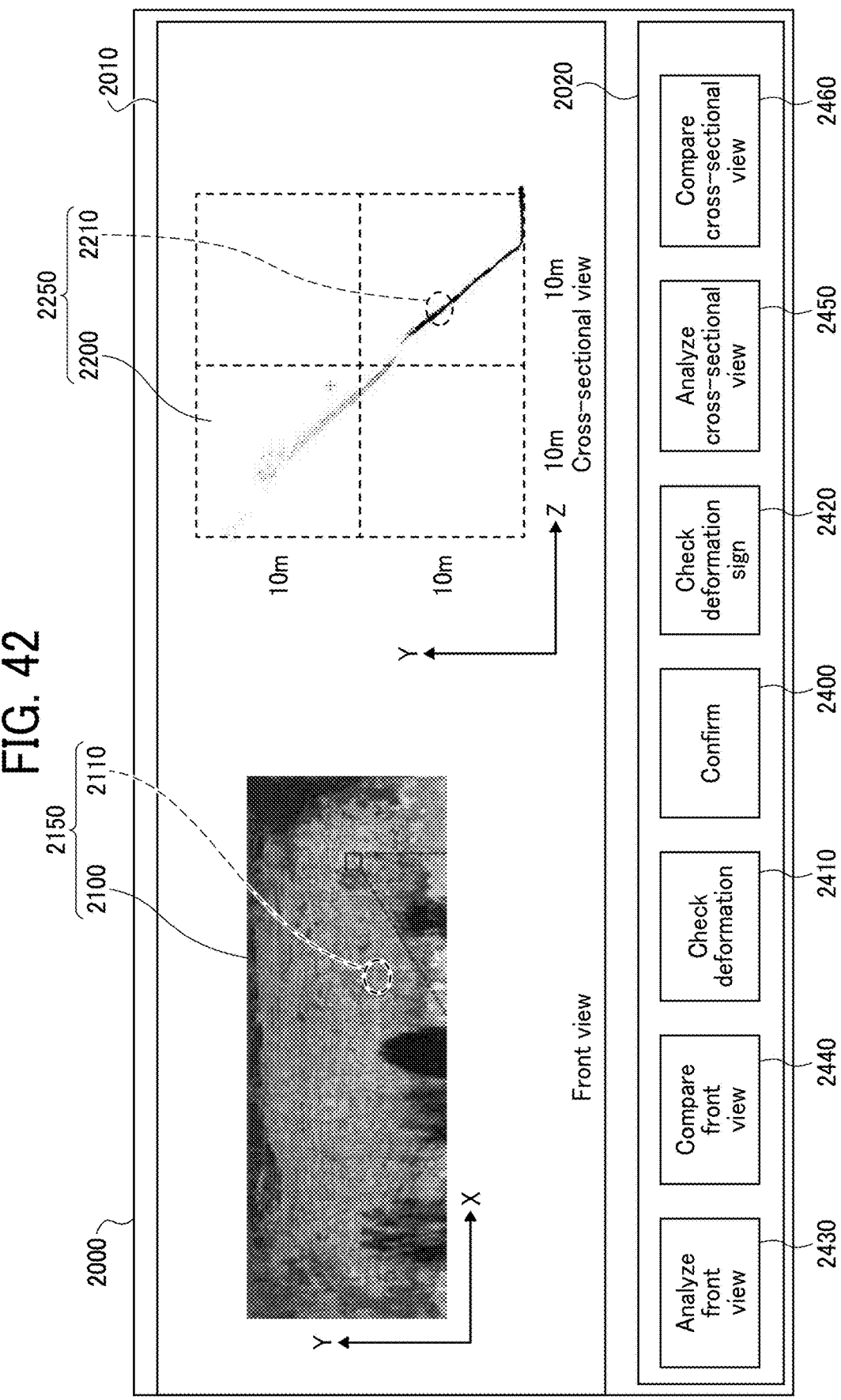
FIG. 42 is an illustration of an example of a display screen after processes described referring to FIG. 39A and FIG. 39B, according to an embodiment of the present disclosure.

FIG. 42 illustrates an example of a display screen after the processes described referring to FIG. 41A and FIG. 41B. FIG. 42 illustrates the input/output screen 2000 displayed on the display 306 of the evaluation apparatus 3 after the processes described referring to FIG. 41A and FIG. 41B.

The display control unit 33 of the evaluation apparatus 3 controls the display 306 to display the surface position image 2110 and the cross-section position image 2210 at the position operated by the pointer 2300 in FIG. 40.

Figure 43B:
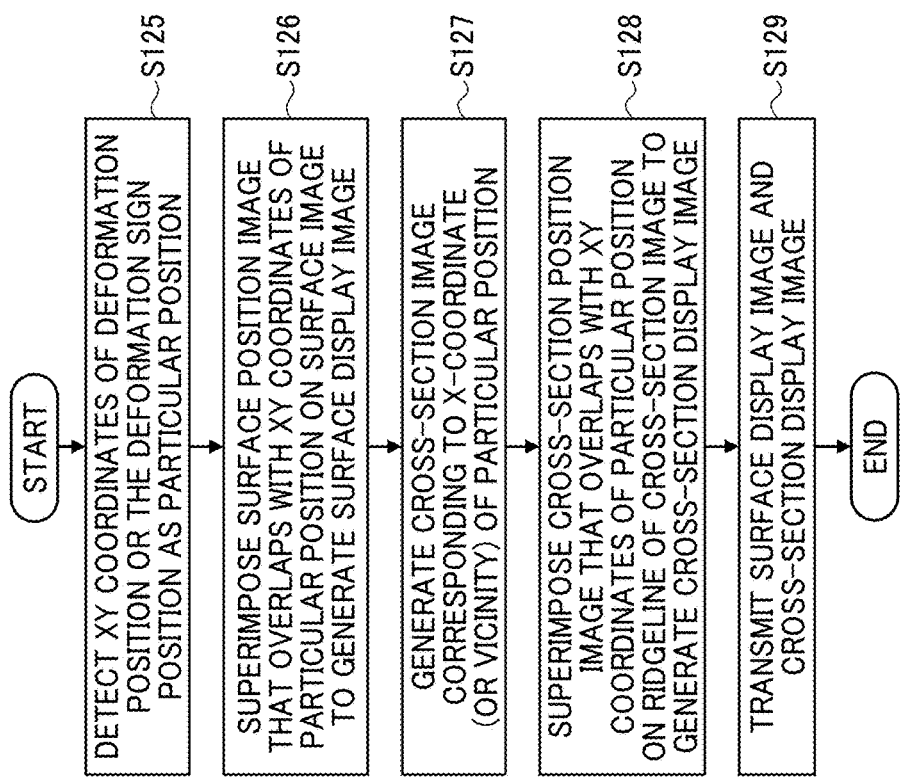
FIG. 43A and FIG. 43B are flowcharts of processes of checking deformation position or a position of a deformation sign, according to an embodiment of the present disclosure.
Figure 43A:
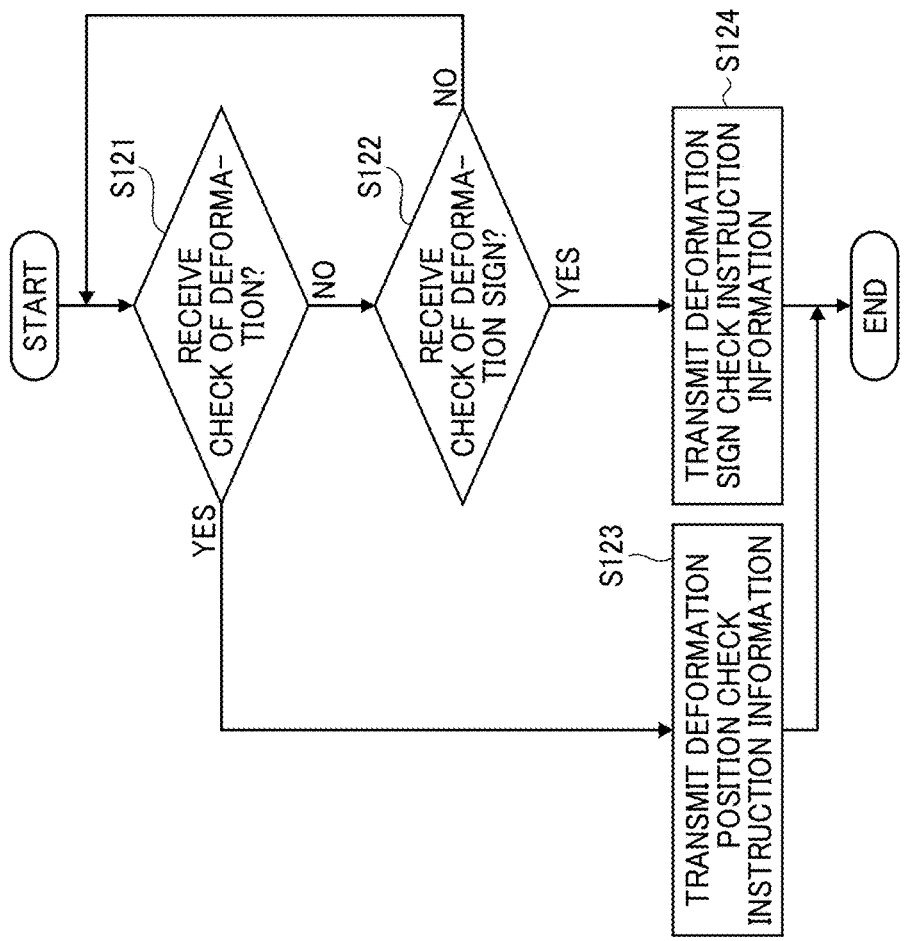

Generation of Display Image Based on Particular Position Indicating Deformation or Position of Deformation Sign:

FIG. 43A and FIG. 43B are flowcharts of processes of checking deformation position or a position of a deformation sign.

FIG. 43A illustrates processes performed by the evaluation apparatus 3. FIG. 43B illustrates processes performed by the data management apparatus 5.

In response to an operation to the deformation check button 2410, the receiving unit 32 of the evaluation apparatus 3 receives this operation (step S121). In response to an operation to the deformation sign check button 2420, the receiving unit 32 receives this operation (step S122).

The communication unit 31 of the evaluation apparatus 3 transmits input information relating to the input operation received by the receiving unit 32 to the data management apparatus 5.

When the deformation check button 2410 is operated, the communication unit 31 transmits instruction information that instructs generation of an image indicating a particular position in the slope, with a position indicating deformation of the slope as the particular position (step S123). When the deformation sign check button 2420 is operated, the communication unit 31 transmits instruction information that instructs generation of an image indicating a particular position in the slope, with a position indicating a sign of deformation of the slope as the particular position (step S124).

The communication unit 51 of the data management apparatus 5 receives the input information transmitted from the evaluation apparatus 3. The determination unit 52 detects XY coordinates of the deformation position or the position of a deformation sign that is read from the processed data management DB 5003 by the storing and reading unit 59 as the particular position (step S125).

The generation unit 54 generates the surface position image that overlaps the XY coordinates of the particular position and superimposes the surface position image on the surface image using the image data illustrated in FIG. 11A, to generate the surface display image (step S126). The surface position image does not have to exactly match the XY coordinates of the particular position. It suffices that the surface position image overlaps the XY coordinates of the particular position.

Next, the generation unit 54 generates the cross-section image corresponding to the X coordinate of the particular position using the image data illustrated in FIG. 11A and the distance measurement data illustrated in FIG. 11B (step S127). When the distance measurement data illustrated in FIG. 11B does not include the X coordinate of the particular position, the generation unit 54 generates the cross-section image based on data in the vicinity of the X coordinate of the particular position included in the distance measurement data illustrated in FIG. 11B.

The description provided above is of an example in which the generation unit 54 generates the cross-section image of a cross section including the Z-axis direction and the vertical direction illustrated in FIG. 10 in step S127. Alternatively, the generation unit 54 may generate the cross-section image of a cross section including directions inclined from the Z-axis direction and the vertical direction or the cross section image of a cross section including a direction inclined from the Z-axis direction.

The generation unit 54 generates the cross-section position image that overlaps the Y coordinates of the particular position and superimposes the cross-section position image on a ridgeline of the cross-section image, to generate the cross-section display image (step S128).

The communication unit 51 transmits the surface display image generated in step S126 and the cross-section display image generated in step S128 to the evaluation apparatus 3 (step S129).

Then, as described referring to steps S98 and S99 of FIG. 34, the communication unit 31 of the evaluation apparatus 3 receives the surface display image and the cross-section display image transmitted from the data management apparatus 5. The display control unit 33 of the evaluation apparatus 3 controls the display 306 to display the received surface display image and cross-section display image.

Figure 44B:
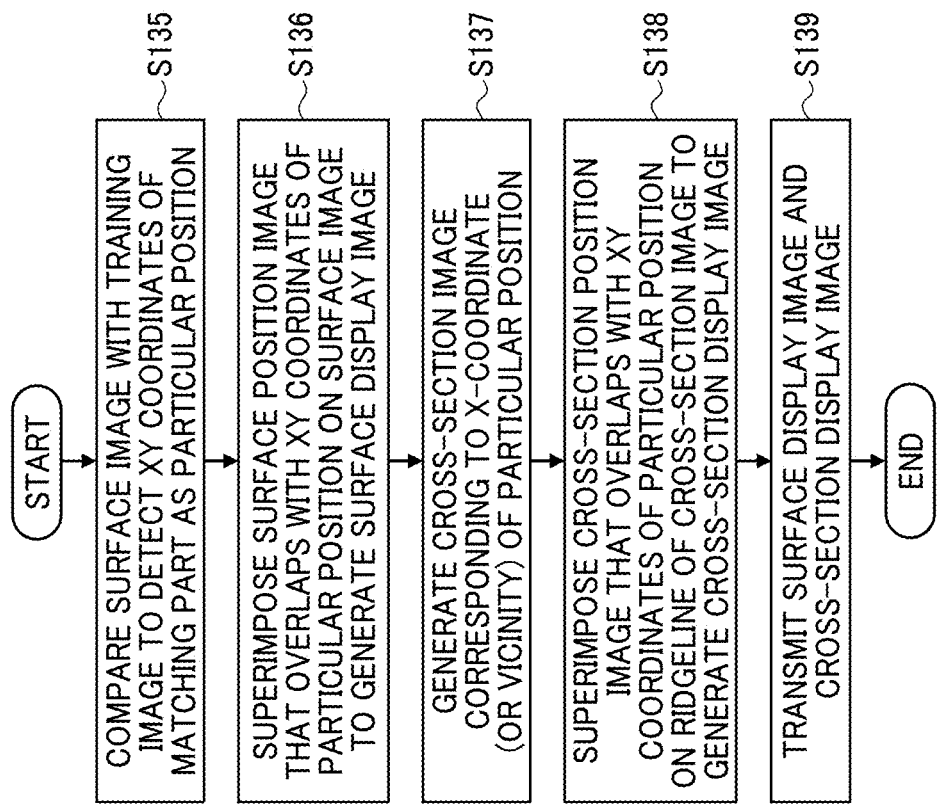
FIG. 44A and FIG. 44B are flowcharts of processes relating to a surface image analysis, according to an embodiment of the present disclosure.
Figure 44A:
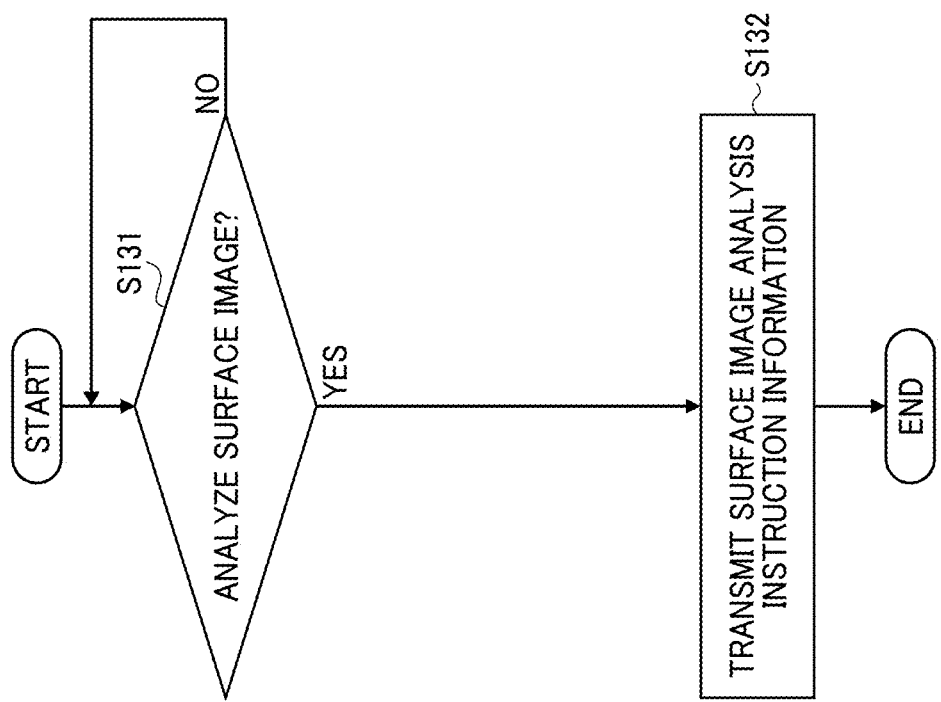

Generation of Display Image Based on Particular Position According to Analysis Result of Surface Image:

FIG. 44A and FIG. 44B are flowcharts of processes relating to a surface image analysis. FIG. 44A illustrates processes performed by the evaluation apparatus 3. FIG. 44B illustrates processes performed by the data management apparatus 5.

In response to an operation to the front view analysis button 2430, the receiving unit 32 of the evaluation apparatus 3 receives this operation (step S131). The communication unit 31 of the evaluation apparatus 3 transmits input information relating to the input operation received by the receiving unit 32 to the data management apparatus 5 (step S132). This input information includes instruction information instructing generation of an image indicating a particular position in the slope, with an area obtained by analyzing the surface image 2100 as the particular position.

The communication unit 51 of the data management apparatus 5 receives the input information transmitted from the evaluation apparatus 3. The determination unit 52 compares the surface image read from the processed data management DB 5003 by the storing and reading unit 59 with the training image, to detect XY coordinates of an area matching the training image as the particular position (step S135). In this step, the data management apparatus 5 acquires the training images illustrated in FIG. 7 and FIG. 8 from the state type management DB 3001 of the evaluation apparatus 3.

The determination unit 52 can compare the surface image with each of multiple training images, to detect the XY coordinates of areas, each matching each of the multiple training images, as multiple particular positions.

The generation unit 54 generates the surface position image that overlaps the XY coordinates of the particular position and superimposes the surface position image on the surface image using the image data illustrated in FIG. 11A, to generate the surface display image (step S136). The surface position image does not have to exactly match the XY coordinates of the particular position. It suffices that the surface position image overlaps the XY coordinates of the particular position.

When the multiple particular positions are detected, the generation unit 54 can generate the surface display image by superimposing surface position images overlapping the XY coordinates of the multiple particular positions on the surface image.

Next, the generation unit 54 generates the cross-section image corresponding to the X coordinate of the particular position using the image data illustrated in FIG. 11A and the distance measurement data illustrated in FIG. 11B (step S137). When the distance measurement data illustrated in FIG. 11B does not include the X coordinate of the particular position, the generation unit 54 generates the cross-section image based on data in the vicinity of the X coordinate of the particular position included in the distance measurement data illustrated in FIG. 11B.

The description provided above is of an example in which the generation unit 54 generates the cross-section image of a cross section including the Z-axis direction and the vertical direction illustrated in FIG. 10 in step S137. Alternatively, the generation unit 54 may generate the cross-section image of a cross section including directions inclined from the Z-axis direction and the vertical direction or the cross section image of a cross section including a direction inclined from the Z-axis direction.

When the multiple particular positions are detected, the generation unit 54 can generate multiple cross-section images that respectively overlap the X coordinates of the multiple particular positions.

The generation unit 54 generates the cross-section position image that overlaps the Y coordinates of the particular position and superimposes the cross-section position image on a ridgeline of the cross-section image, to generate the cross-section display image (step S138).

When the multiple particular positions are detected, the generation unit 54 can perform the process of step S138 for each of the multiple cross-section images.

The communication unit 51 transmits the surface display image generated in step S136 and the one or multiple cross-section display images generated in step S138 to the evaluation apparatus 3 (step S139).

Then, as described referring to steps S98 and S99 of FIG. 34, the communication unit 31 of the evaluation apparatus 3 receives the surface display image and the one or multiple cross-section display images transmitted from the data management apparatus 5. The display control unit 33 of the evaluation apparatus 3 controls the display 306 to display the received surface display image and one or more cross-section display images.

Figure 45:
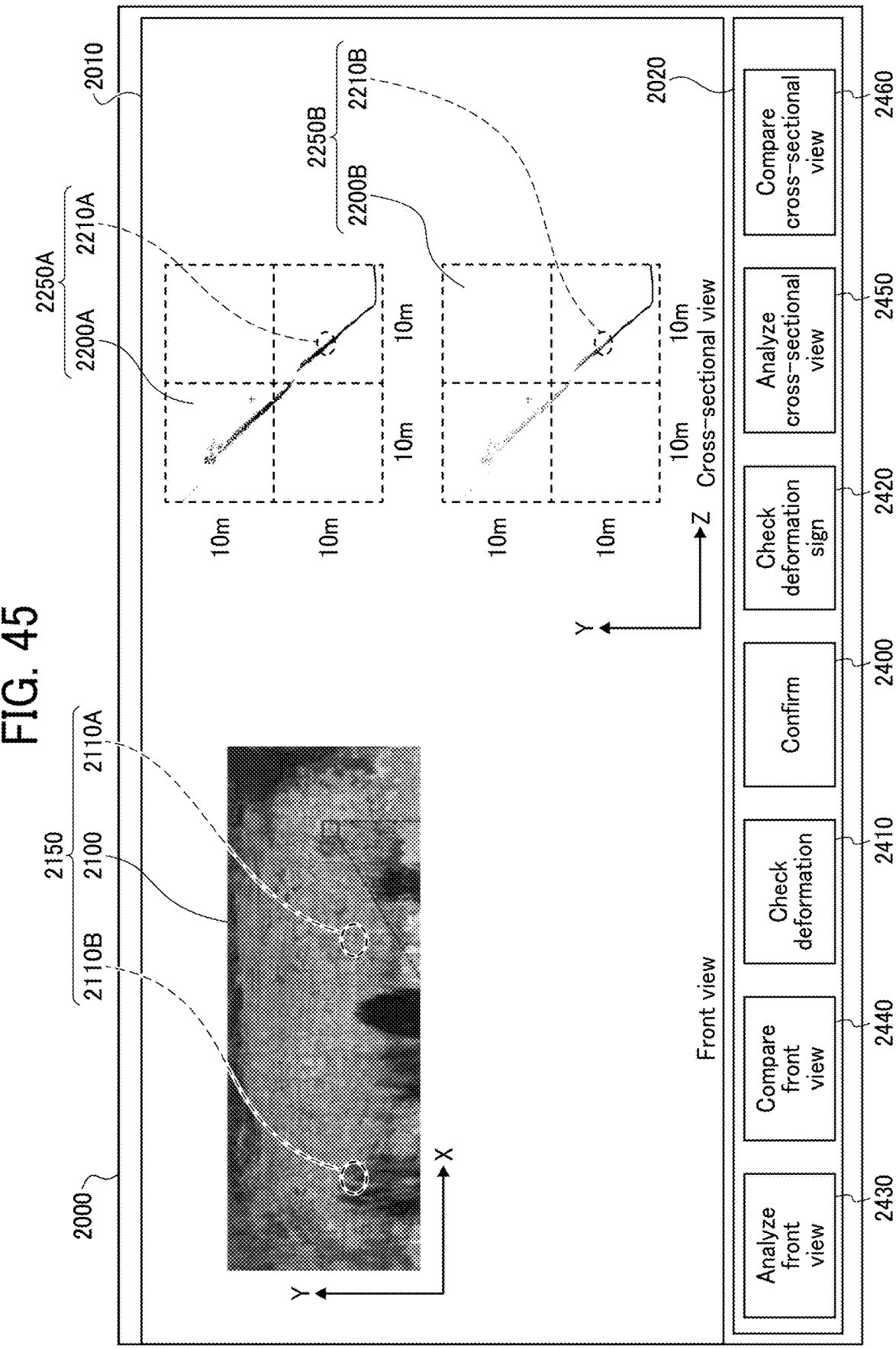
FIG. 45 is an illustration of an example of a display screen after processes described referring to FIG. 42, according to an embodiment of the present disclosure.

FIG. 45 illustrates an example of a display screen after the processes described referring to FIG. 44A and FIG. 44B. FIG. 45 illustrates the input/output screen 2000 displayed on the display 306 of the evaluation apparatus 3 after the processes described referring to FIG. 44A and FIG. 44B.

The display control unit 33 of the evaluation apparatus 3 controls the display 306 to display the surface display image 2150 including the surface image 2100, a first surface position image 2110A, and a second surface position image 2110B. The first surface position image 2110A indicates a first particular position in the surface image 2100. The second surface position image 2110B indicates a second particular position in the surface image 2100.

The display control unit 33 controls the display 306 to display a first cross-section display image 2250A and a second cross-section display image 2250B. The first cross-section display image 2250A includes a first cross-section image 2200A and a first cross-section position image 2210A indicating the first particular position in the first cross-section image 2200A. The second cross-section display image 2250B includes a second cross-section image 2200B and a second cross-section position image 2210B indicating the second particular position in the second cross-section image 2200B.

In one example, the first particular position indicates an area in the surface image, the area being determined to match the training image indicating a longitudinal and lateral crack pattern in step S135 of FIG. 44B. In one example, the second particular position indicates an area in the surface image, the area being determined to match the training image indicating a dense crack pattern in step S135 of FIG. 44B.

Figure 46B:
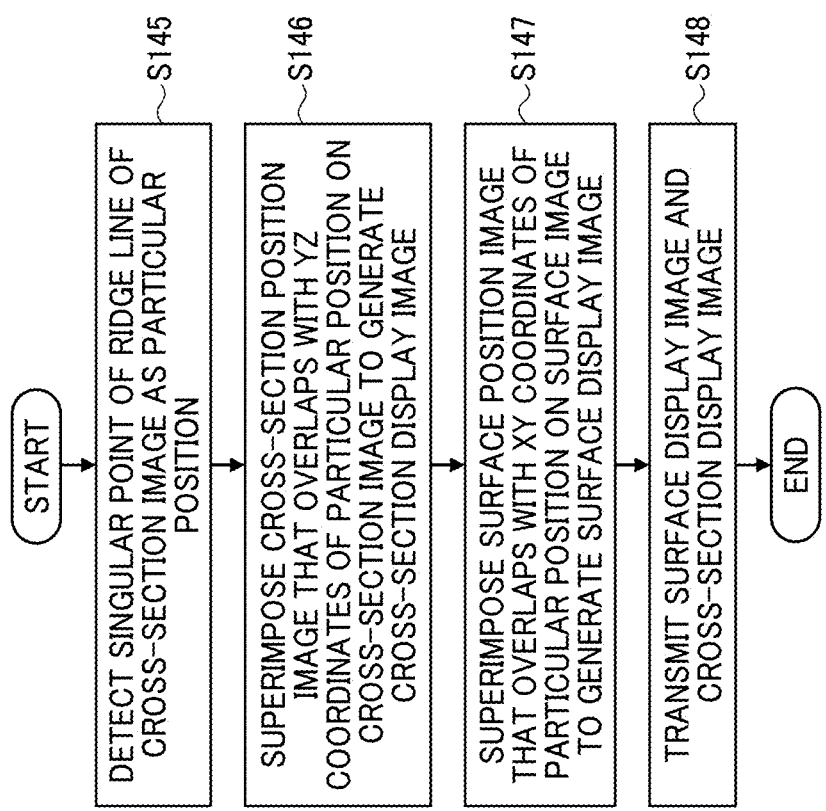
FIG. 46A and FIG. 46B are flowcharts of processes relating to a cross-section image analysis, according to an embodiment of the present disclosure.
Figure 46A:
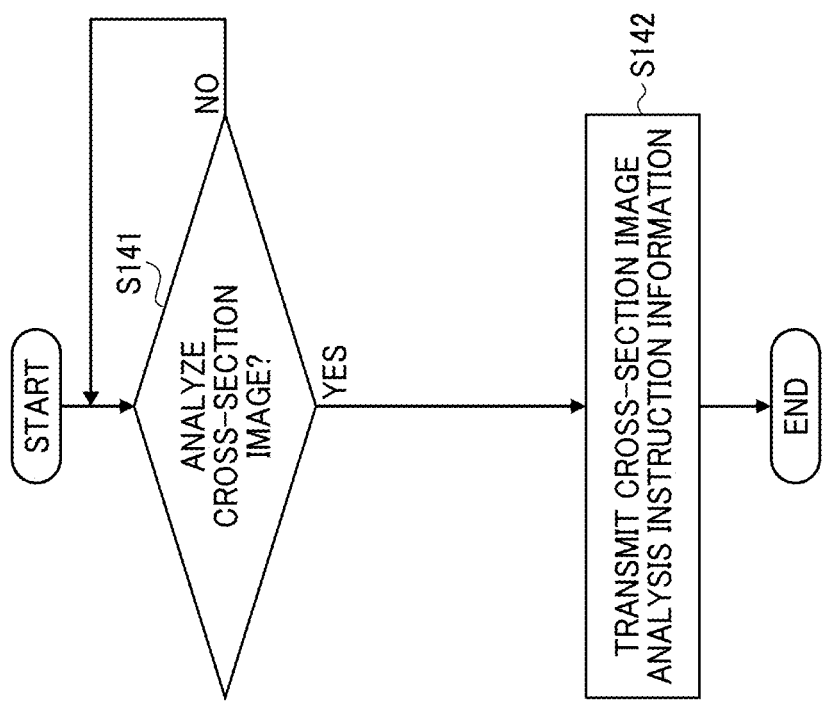

Generation of Display Image Based on Particular Position According to Analysis Result of Cross-Section Image:

FIG. 46A and FIG. 46B are flowcharts of processes relating to a cross-section image analysis.

FIG. 46A illustrates processes performed by the evaluation apparatus 3. FIG. 46B illustrates processes performed by the data management apparatus 5.

In response to an operation to the cross-sectional view analysis button 2450, the receiving unit 32 of the evaluation apparatus 3 receives this operation (step S141). The communication unit 31 of the evaluation apparatus 3 transmits input information relating to the input operation received by the receiving unit 32 to the data management apparatus 5 (step S142). This input information includes instruction information instructing generation of an image indicating a particular position in the slope, with an area obtained by analyzing the cross-section image 2200 as the particular position.

The communication unit 51 of the data management apparatus 5 receives the input information transmitted from the evaluation apparatus 3. The determination unit 52 detects a singularity of a ridgeline of the cross-section image as a particular position (step S145). In one example, the determination unit 52 detects, as the singularity and the particular position, an area where the inclination of the ridgeline of the cross-section image is changed by a predetermined value or more as compared with other areas.

When the determination unit 52 determines that there are multiple singularities on the ridgeline of the cross-section image, the determination unit 52 can detect each of the singularities as the particular position.

The generation unit 54 generates the cross-section position image that overlaps the YZ coordinates of the particular position and superimposes the cross-section position image on the cross-section image, to generate the cross-section display image (step S146).

The generation unit 54 generates the surface position image that overlaps the XY coordinates of the particular position and superimposes the surface position image on the surface image, to generate the surface display image (step S147).

The communication unit 51 transmits the cross-section display image generated in step S146 and the surface display image generated in step S147 to the evaluation apparatus 3 (step S148).

Then, as described referring to steps S98 and S99 of FIG. 34, the communication unit 31 of the evaluation apparatus 3 receives the surface display image and the cross-section display image transmitted from the data management apparatus 5. The display control unit 33 of the evaluation apparatus 3 controls the display 306 to display the received surface display image and cross-section display image.

Figure 47B:
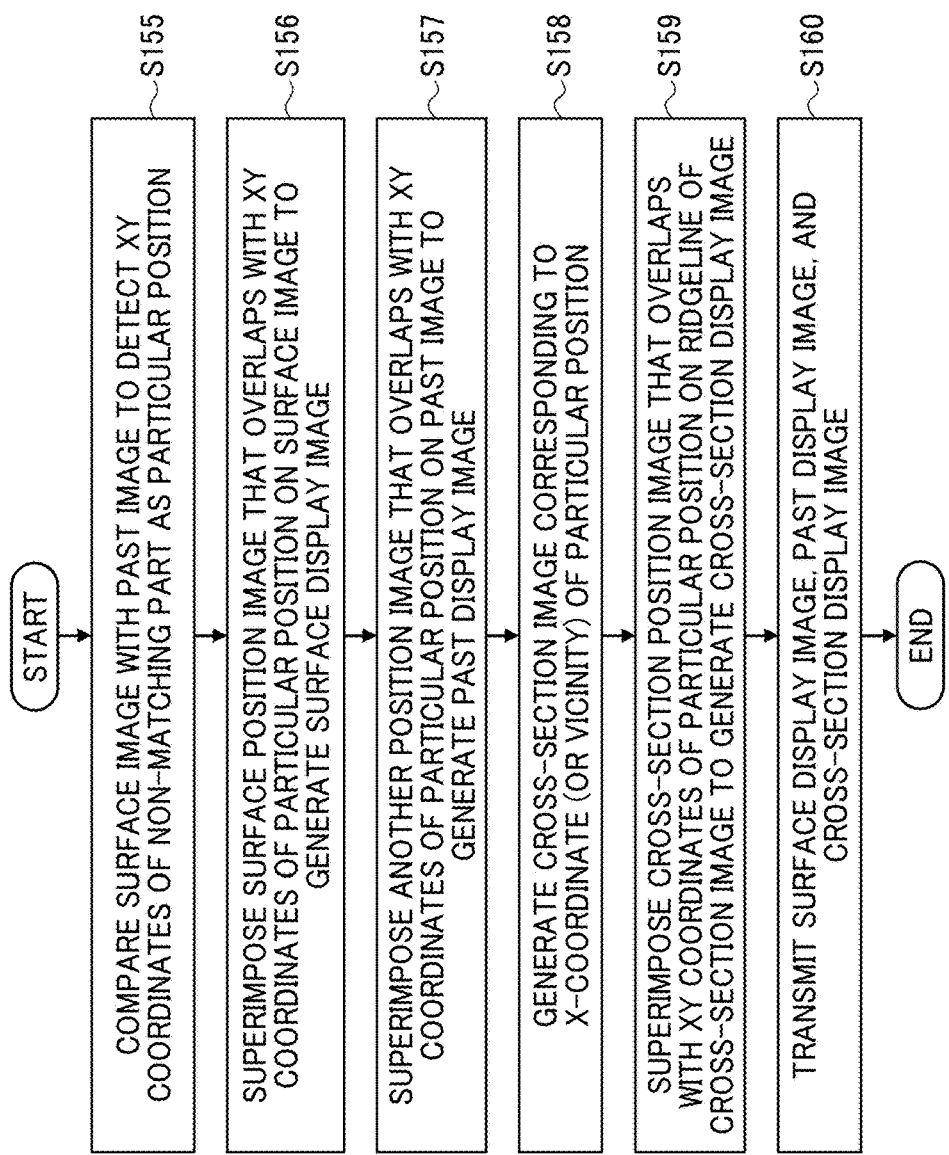
FIG. 47A and FIG. 47B are flowcharts of processes relating to a surface image comparison, according to an embodiment of the present disclosure.
Figure 47A:
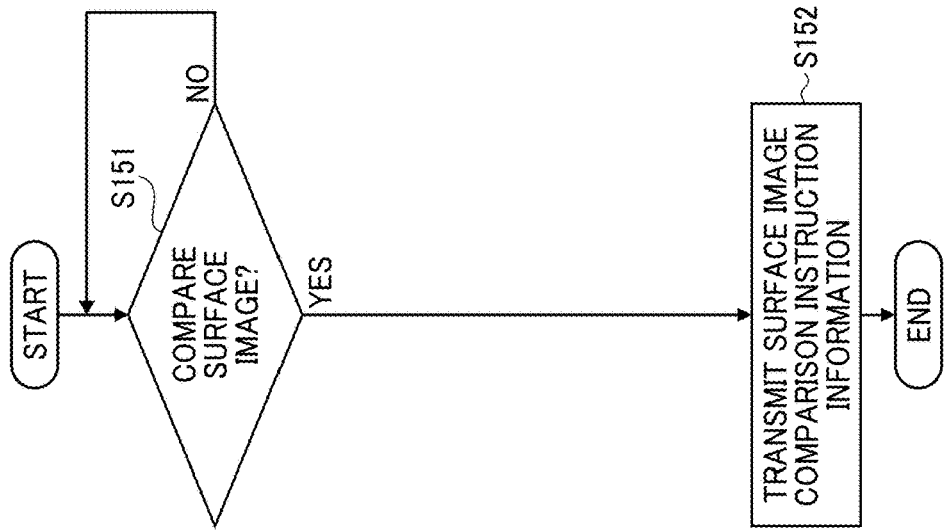

Generation of Display Image Based on Particular Position According to Comparison Result with Past Image:

FIG. 47A and FIG. 47B are flowcharts of processes relating to a surface image comparison. FIG. 47A illustrates processes performed by the evaluation apparatus 3. FIG. 47B illustrates processes performed by the data management apparatus 5.

In response to an operation to the front view comparison button 2440, the receiving unit 32 of the evaluation apparatus 3 receives this operation (step S151). The communication unit 31 of the evaluation apparatus 3 transmits input information relating to the input operation received by the receiving unit 32 to the data management apparatus 5 (step S152). This input information includes instruction information instructing generation of an image indicating a particular position in the slope, with an area obtained by comparing the surface image 2100 with another image as the particular position.

The communication unit 51 of the data management apparatus 5 receives the input information transmitted from the evaluation apparatus 3. The determination unit 52 compares the surface image read from the processed data management DB 5003 by the storing and reading unit 59 with a past surface image, to detect XY coordinates of an area that is different from the past surface image as the particular position (step S155). In one example, the storing and reading unit 59 can read the past image obtained by photographing the same area as the surface image from the processed data management DB 5003 by using the positioning data illustrated in FIG. 9B as a search key.

The determination unit 52 can compare the surface image with the past image, to detect the XY coordinates of areas, each being different from the past image, as multiple particular positions.

The generation unit 54 generates the surface position image that overlaps the XY coordinates of the particular position and superimposes the surface position image on the surface image, to generate the surface display image (step S156). The surface position image does not have to exactly match the XY coordinates of the particular position. It suffices that the surface position image overlaps the XY coordinates of the particular position.

When the determination unit 52 detects the multiple particular positions, the generation unit 54 can generate the surface display image by superimposing surface position images respectively overlapping the XY coordinates of the multiple particular positions on the surface image.

Next, the generation unit 54 generates another position image that overlaps the XY coordinates of the particular position and superimposes the generated another position image on the past image, to generate a past display image (step S157). The another position image does not have to exactly match the XY coordinates of the particular position. It suffices that the another position image overlaps the XY coordinates of the particular position.

When the determination unit 52 detects the multiple particular positions, the generation unit 54 can generate the past display image by superimposing multiple another position images respectively overlapping the XY coordinates of the multiple particular positions on the surface image.

Next, the generation unit 54 generates the cross-section image corresponding to the X coordinate of the particular position using the image data illustrated in FIG. 11A and the distance measurement data illustrated in FIG. 11B (step S158). When the distance measurement data illustrated in FIG. 11B does not include the X coordinate of the particular position, the generation unit 54 generates the cross-section image based on data in the vicinity of the X coordinate of the particular position included in the distance measurement data illustrated in FIG. 11B.

The description provided above is of an example in which the generation unit 54 generates the cross-section image of a cross section including the Z-axis direction and the vertical direction illustrated in FIG. 10 in step S157. Alternatively, the generation unit 54 may generate the cross-section image of a cross section including directions inclined from the Z-axis direction and the vertical direction or the cross section image of a cross section including a direction inclined from the Z-axis direction.

When the determination unit 52 detects the multiple particular positions, the generation unit 54 can generate multiple cross-section images that respectively overlap the X coordinates of the multiple particular positions.

The generation unit 54 generates the cross-section position image that overlaps the Y coordinates of the particular position and superimposes the cross-section position image on a ridgeline of the cross-section image, to generate the cross-section display image (step S159).

When the determination unit 52 detects the multiple particular positions, the generation unit 54 can perform the process of step S159 for each of the multiple cross-section images.

The communication unit 51 transmits the surface display image generated in step S156, the past display image generated in step S157, and the one or multiple cross-section display images generated in step S159 to the evaluation apparatus 3 (step S160).

Then, as described referring to steps S98 and S99 of FIG. 34, the communication unit 31 of the evaluation apparatus 3 receives the surface display image, the past display image, and the one or multiple cross-section display images transmitted from the data management apparatus 5. The display control unit 33 of the evaluation apparatus 3 controls the display 306 to display the received surface display image, past display image, and one or multiple cross-section display images.

Figure 48:
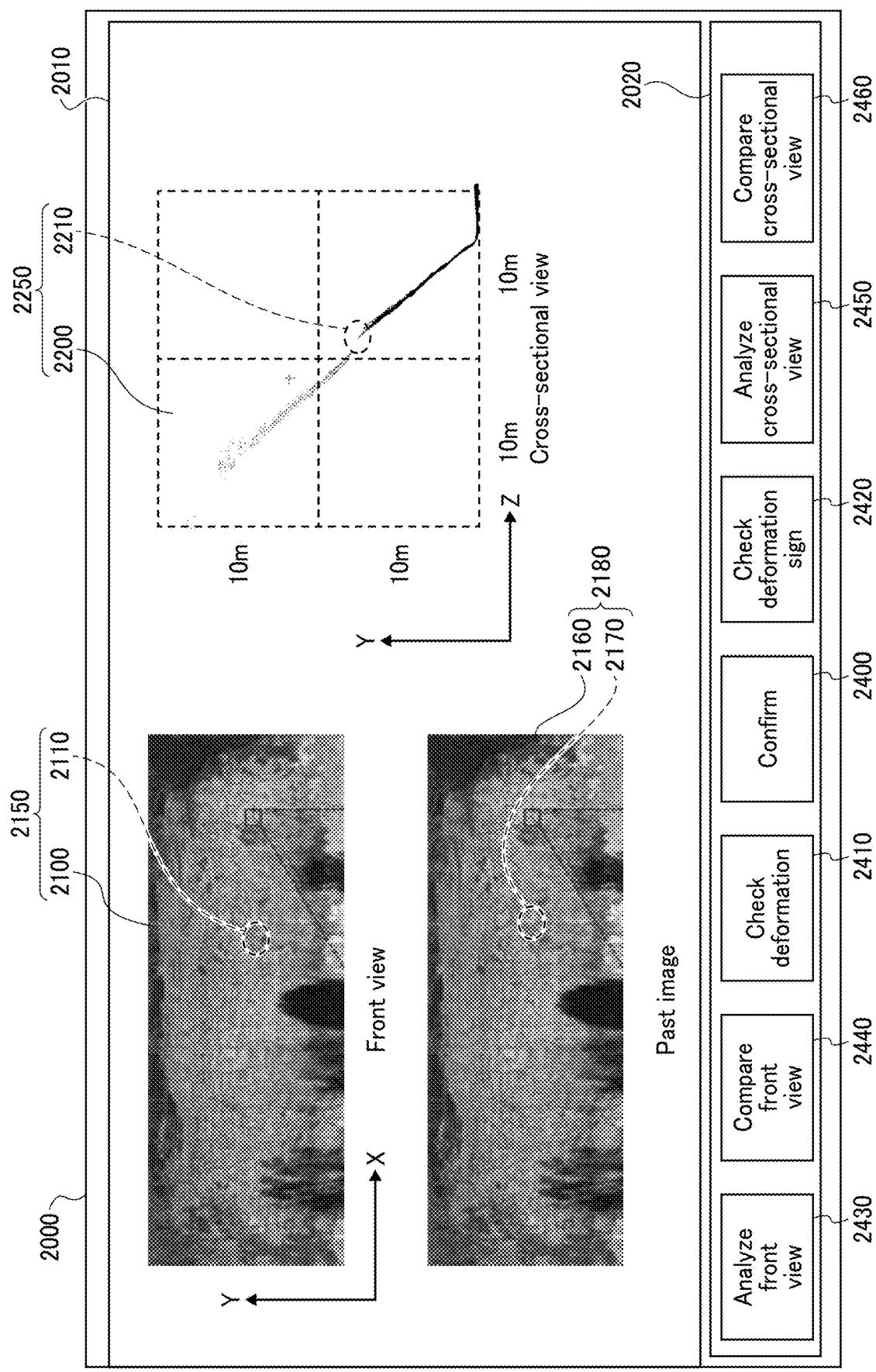
FIG. 48 is an illustration of an example of a display screen after processes described referring to FIG. 45, according to an embodiment of the present disclosure.

FIG. 48 illustrates an example of a display screen after the processes described referring to FIG. 47A and FIG. 47B. FIG. 48 illustrates the input/output screen 2000 displayed on the display 306 of the evaluation apparatus 3 after the processes described referring to FIG. 47A and FIG. 47B.

The display control unit 33 of the evaluation apparatus 3 controls the display 306 to display the surface display image 2150, the cross-section display image 2250, and a past display image 2180. The surface display image 2150 includes the surface image 2100 and the surface position image 2110. The cross-section display image 2250 includes the cross-section image 2200 and the cross-section position image 2210. The past display image 2180 includes a past image 2160 and another position image 2170 indicating the particular position in the past image 2160.

FIG. 49 is a flowchart of a modification of processes relating to the surface image comparison. FIG. 49 illustrates a modification of the processes performed by the data management apparatus 5 illustrated in FIG. 47B.

The communication unit 51 of the data management apparatus 5 receives the input information transmitted from the evaluation apparatus 3. The determination unit 52 compares the surface image read from the processed data management DB 5003 by the storing and reading unit 59 with an inspection image, to detect XY coordinates of an area corresponding to an inspection position in the inspection image as a particular position (step S165).

In one example, the data management apparatus 5 can acquire from, for example, the storage medium 315 the inspection image in which multiple inspection positions (P1 to P4) are drawn as indicated by the display image area 480 of FIG. 19.

The determination unit 52 can detect the XY coordinates of the multiple inspection positions in the inspection image as the multiple particular positions.

The generation unit 54 generates the surface position image that overlaps the XY coordinates of the particular position and superimposes the surface position image on the surface image, to generate the surface display image (step S166). The surface position image does not have to exactly match the XY coordinates of the particular position. It suffices that the surface position image overlaps the XY coordinates of the particular position.

When the determination unit 52 detects the multiple particular positions, the generation unit 54 can generate the surface display image by superimposing surface position images respectively overlapping the XY coordinates of the multiple particular positions on the surface image.

Next, the generation unit 54 generates the cross-section image corresponding to the X coordinate of the particular position using the image data illustrated in FIG. 11A and the distance measurement data illustrated in FIG. 11B (step S167). When the distance measurement data illustrated in FIG. 11B does not include the X coordinate of the particular position, the generation unit 54 generates the cross-section image based on data in the vicinity of the X coordinate of the particular position included in the distance measurement data illustrated in FIG. 11B.

The description provided above is of an example in which the generation unit 54 generates the cross-section image of a cross section including the Z-axis direction and the vertical direction illustrated in FIG. 10 in step S167. Alternatively, the generation unit 54 may generate the cross-section image of a cross section including directions inclined from the Z-axis direction and the vertical direction or the cross section image of a cross section including a direction inclined from the Z-axis direction.

When the determination unit 52 detects the multiple particular positions, the generation unit 54 can generate multiple cross-section images that respectively overlap the X coordinates of the multiple particular positions.

The generation unit 54 generates a cross-section position image that overlaps the Y coordinates of the particular position and superimposes the cross-section position image on a ridgeline of the cross-section image, to generate the cross-section display image (step S168).

When the determination unit 52 detects the multiple particular positions, the generation unit 54 can perform the process of step S168 for each of the multiple cross-section images.

The communication unit 51 transmits the surface display image generated in step S166 and the one or multiple cross-section display images generated in step S168 to the evaluation apparatus 3 (step S169).

Then, as described referring to steps S98 and S99 of FIG. 34, the communication unit 31 of the evaluation apparatus 3 receives the surface display image, the past display image, and the one or multiple cross-section display images transmitted from the data management apparatus 5. The display control unit 33 of the evaluation apparatus 3 controls the display 306 to display the received surface display image, past display image, and one or multiple cross-section display images.

Figure 50A:
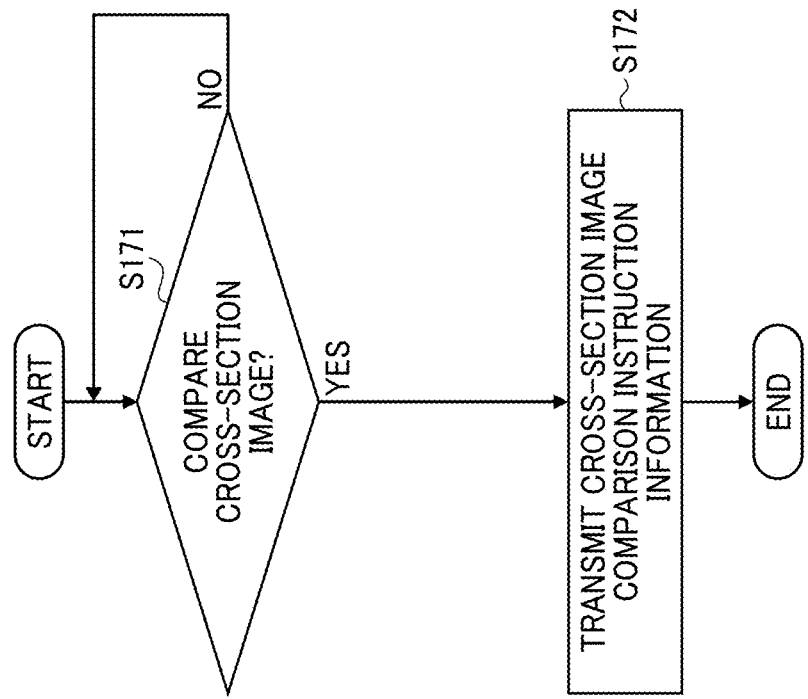
FIG. 50A and FIG. 50B are flowcharts of processes relating to a cross-section image comparison, according to an embodiment of the present disclosure.
Figure 50B:
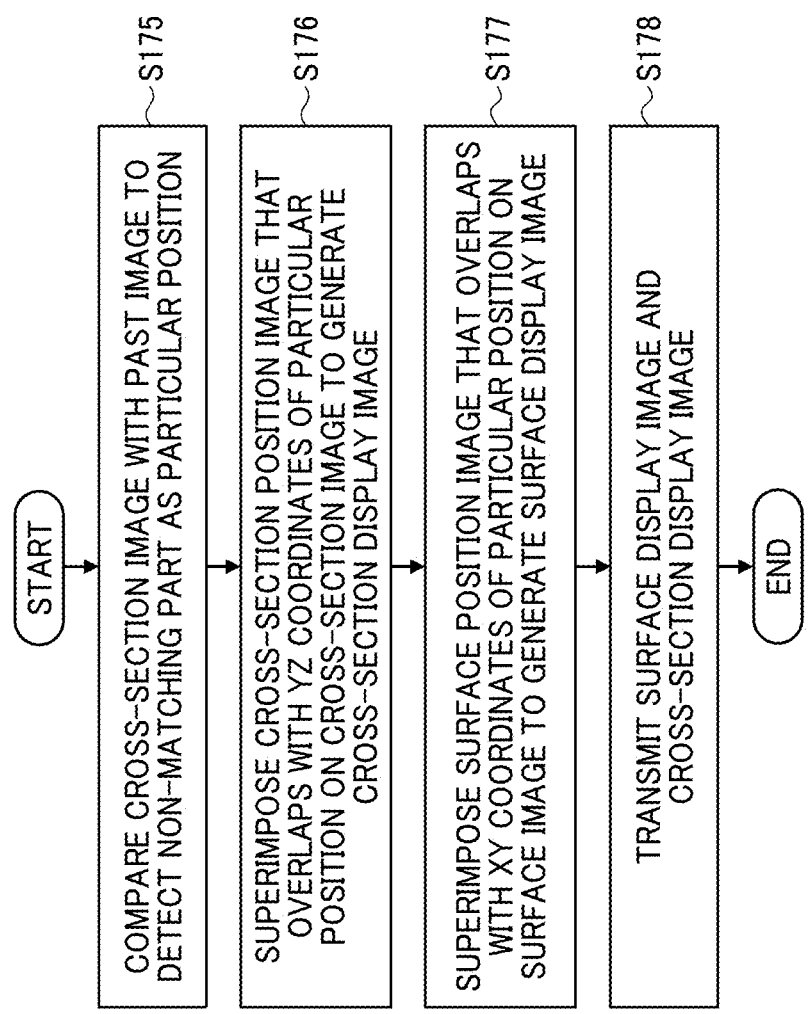

FIG. 50A and FIG. 50B are flowcharts of processes relating to a cross-section image comparison. FIG. 50A illustrates processes performed by the evaluation apparatus 3. FIG. 50B illustrates processes performed by the data management apparatus 5.

In response to an operation to the cross-sectional view comparison button 2460, the receiving unit 32 of the evaluation apparatus 3 receives this operation (step S171). The communication unit 31 of the evaluation apparatus 3 transmits input information relating to the input operation received by the receiving unit 32 to the data management apparatus 5 (step S172). This input information includes instruction information instructing generation of an image indicating a particular position in the slope, with an area obtained by comparing the cross-section image 2200 with another image as the particular position.

The communication unit 51 of the data management apparatus 5 receives the input information transmitted from the evaluation apparatus 3. The determination unit 52 compares the cross-section image with a past cross-section image, to detects YZ coordinates of an area that is different from the past cross-section image as the particular position (step S175).

The determination unit 52 can compare the cross-section image with the past image, to detect the YZ coordinates of areas, each being different from the past image, as multiple particular positions.

The generation unit 54 generates the cross-section position image that overlaps the YZ coordinates of the particular position and superimposes the cross-section position image on the cross-section image, to generate the cross-section display image (step S176). The cross-section position image does not have to exactly match the YZ coordinates of the particular position. It suffices that the cross-section position image overlaps the YZ coordinates of the particular position.

When the determination unit 52 detects the multiple particular positions, the generation unit 54 can generate cross-section display images by superimposing cross-section position images respectively overlapping the YZ coordinates of the multiple particular positions on the cross-section image.

Next, the generation unit 54 generates the surface position image that overlaps the XY coordinates of the particular position and superimposes the surface position image on the surface image, to generate the surface display image (step S177).

When the determination unit 52 detects the multiple particular positions, the generation unit 54 can generate the surface display image including multiple surface position images.

The communication unit 51 transmits the cross-section display image generated in step S176 and the surface display image generated in step S177 to the evaluation apparatus 3 (step S178).

Then, as described referring to steps S98 and S99 of FIG. 34, the communication unit 31 of the evaluation apparatus 3 receives the surface display image and the cross-section display image transmitted from the data management apparatus 5. The display control unit 33 of the evaluation apparatus 3 controls the display 306 to display the received surface display image and cross-section display image.

Figure 51:
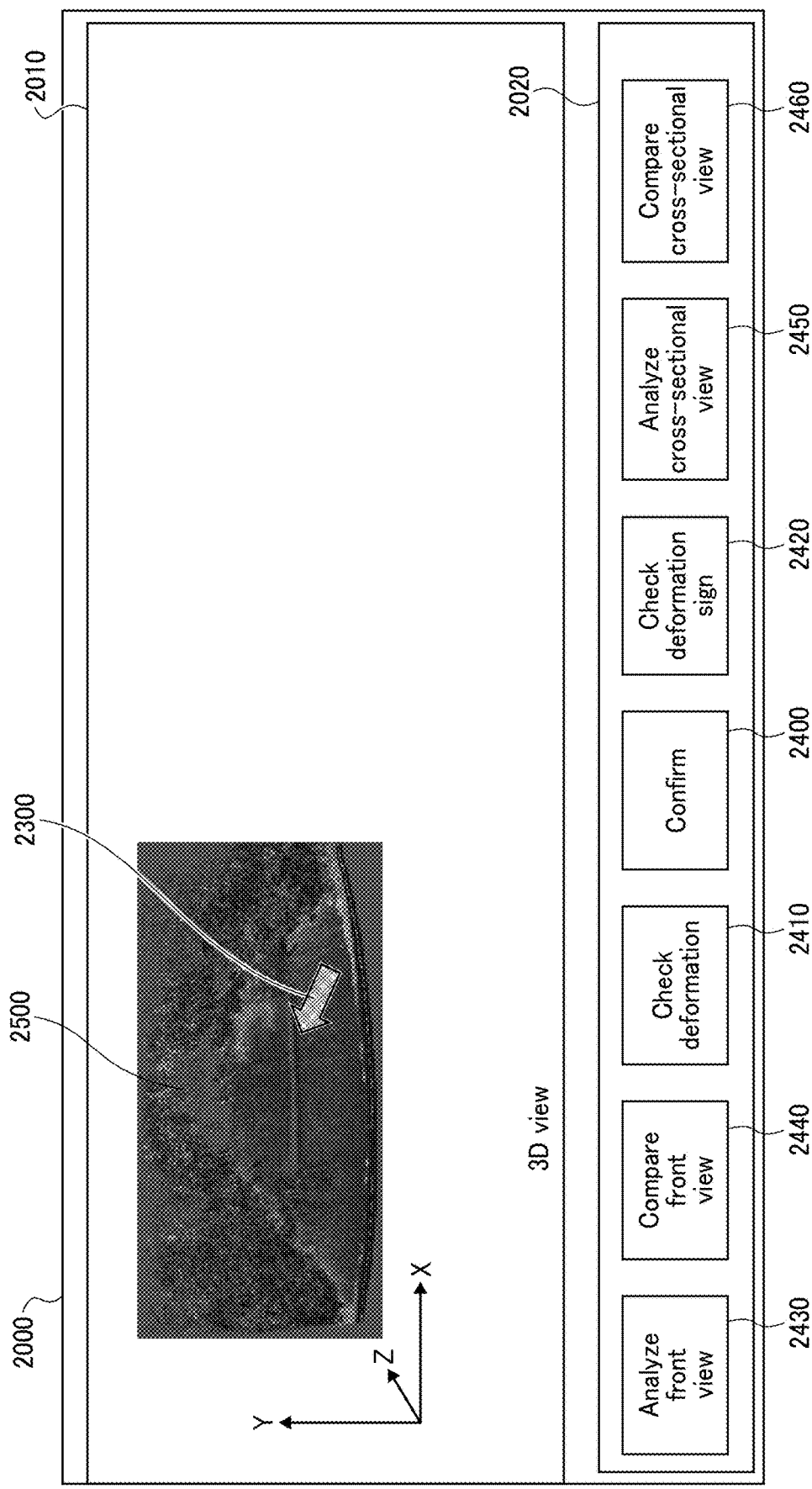
FIG. 51 is an illustration for describing an operation on a three-dimensional (3D) display screen, according to an embodiment of the present disclosure.

Generation of 3D Surface Display Image Based on Operation of Designating Particular Position:

FIG. 51 is an illustration for describing an operation on a three-dimensional (3D) display screen.

The display control unit 33 of the evaluation apparatus 3 controls the display 306 to display, instead of the surface image 2100 illustrated in FIG. 35, a 3D image 2500 indicating a three-dimensional shape of a slope in the designation reception screen 2010, and to display the pointer 2300 operated by the pointing device 312 on the 3D image 2500.

The 3D image 2500 is an image generated using the image data illustrated in FIG. 11A and the distance measurement data illustrated in FIG. 11B. The display control unit 33 controls the display 306 to display the 3D image 2500 in association with the X-axis direction, the Y-axis direction, and the Z-axis direction illustrated in the captured image 1 and the captured image 2 illustrated in FIG. 10.

The display control unit 33 can change a display area of the displayed 3D image 2500 by changing a position and an orientation of a virtual camera at a position of a viewpoint from which the 3D image 2500 is viewed.

Figure 52A:
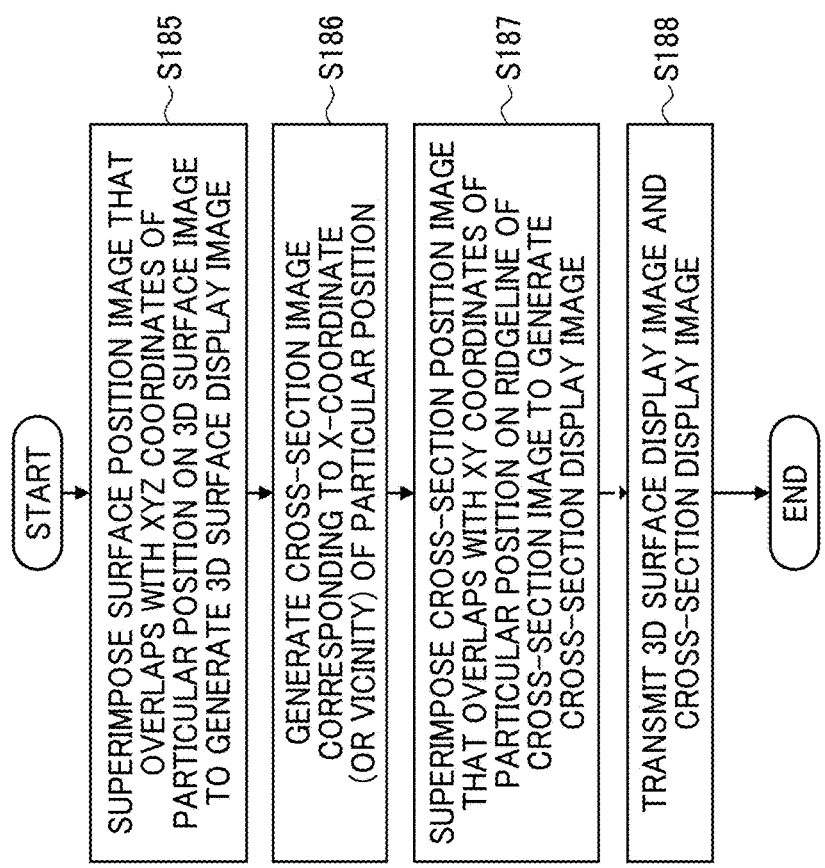
FIG. 52A and FIG. 52B are flowcharts of processes based on an operation described referring to FIG. 49, according to an embodiment of the present disclosure.
Figure 52B:
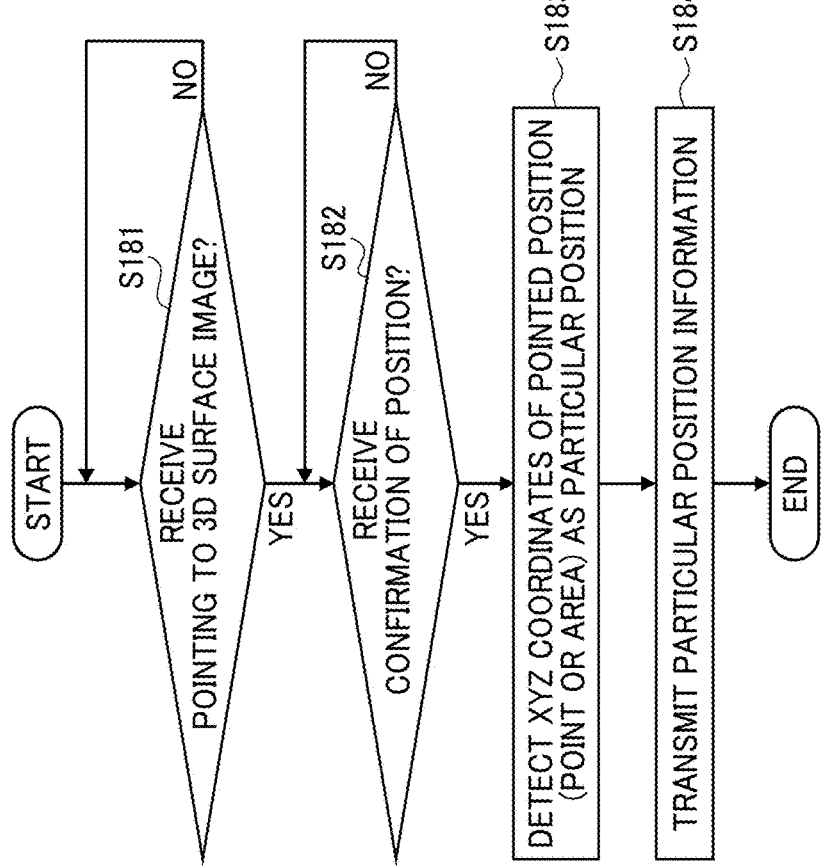

FIG. 52A and FIG. 52B are flowcharts of processes on the operation described referring to FIG. 51. FIG. 52A illustrates processes performed by the evaluation apparatus 3. FIG. 52B illustrates processes performed by the data management apparatus 5.

In response to pointing to a certain position on the 3D image 2500 by the pointer 2300, the receiving unit 32 of the evaluation apparatus 3 receives the pointing operation (step S181). In response to an operation to the designated position confirmation button 2400, the receiving unit 32 receives this operation (step S182).

Next, the determination unit 34 of the evaluation apparatus 3 detects XYZ coordinates of the pointed position in the 3D image 2500 as a particular position (step S183). This particular position may indicate a point on the XYZ coordinates or may indicate an area on the XYZ coordinates.

Next, the communication unit 31 of the evaluation apparatus 3 transmits input information relating to the input operation received by the receiving unit 32 to the data management apparatus 5 (step S184). This input information includes designation information and instruction information. The designation information designates the particular position in XYZ coordinates based on the pointing operation by the pointer 2300. The instruction information instructs generation of an image indicating the particular position in the slope according to an operation to the designated position confirmation button 2400.

The communication unit 51 of the data management apparatus 5 receives the input information transmitted from the evaluation apparatus 3. According to the instruction information and the designation information included in the received input information, the generation unit 54 generates a 3D position image that overlaps the XYZ coordinates of the particular position and superimposes the 3D position image on the 3D image using the image data illustrated in FIG. 11A, to generate a 3D display image (step S186). The surface position image does not have to exactly match the XYZ coordinates of the particular position. It suffices that the surface position image overlaps the XYZ coordinates of the particular position.

Next, the generation unit 54 generates the cross-section image corresponding to the X coordinate of the particular position using the image data illustrated in FIG. 11A and the distance measurement data illustrated in FIG. 11B (step S187). When the distance measurement data illustrated in FIG. 11B does not include the X coordinate of the particular position, the generation unit 54 generates the cross-section image based on data in the vicinity of the X coordinate of the particular position included in the distance measurement data illustrated in FIG. 11B.

The description provided above is of an example in which the generation unit 54 generates the cross-section image of a cross section including the Z-axis direction and the vertical direction illustrated in FIG. 10 in step S187. Alternatively, the generation unit 54 may generate the cross-section image of a cross section including directions inclined from the Z-axis direction and the vertical direction or the cross section image of a cross section including a direction inclined from the Z-axis direction.

The generation unit 54 generates a cross-section position image that overlaps the Y coordinates of the particular position and the superimposes the cross-section position image on a ridgeline of the cross-section image, to generate the cross-section display image (step S188).

The communication unit 51 transmits the 3D display image generated in step S185 and the cross-section display image generated in step S187 to the evaluation apparatus 3 (step S188).

Then, as described referring to steps S98 and S99 of FIG. 34, the communication unit 31 of the evaluation apparatus 3 receives the 3D display image and the cross-section display image transmitted from the data management apparatus 5. The display control unit 33 of the evaluation apparatus 3 controls the display 306 to display the received 3D image and cross-section display image.

The generation unit 54 may further generate the surface position image that overlaps the XY coordinates of the particular position and superimposes the surface position image on the surface image using the image data illustrated in FIG. 11A, to generate the surface display image. The communication unit 51 may further transmit the surface display image to the evaluation apparatus 3. In this case, the communication unit 31 of the evaluation apparatus 3 further receives the surface display image transmitted from the data management apparatus 5. The display control unit 33 of the evaluation apparatus 3 controls the display 306 to further display the received surface display image.

Figure 53:
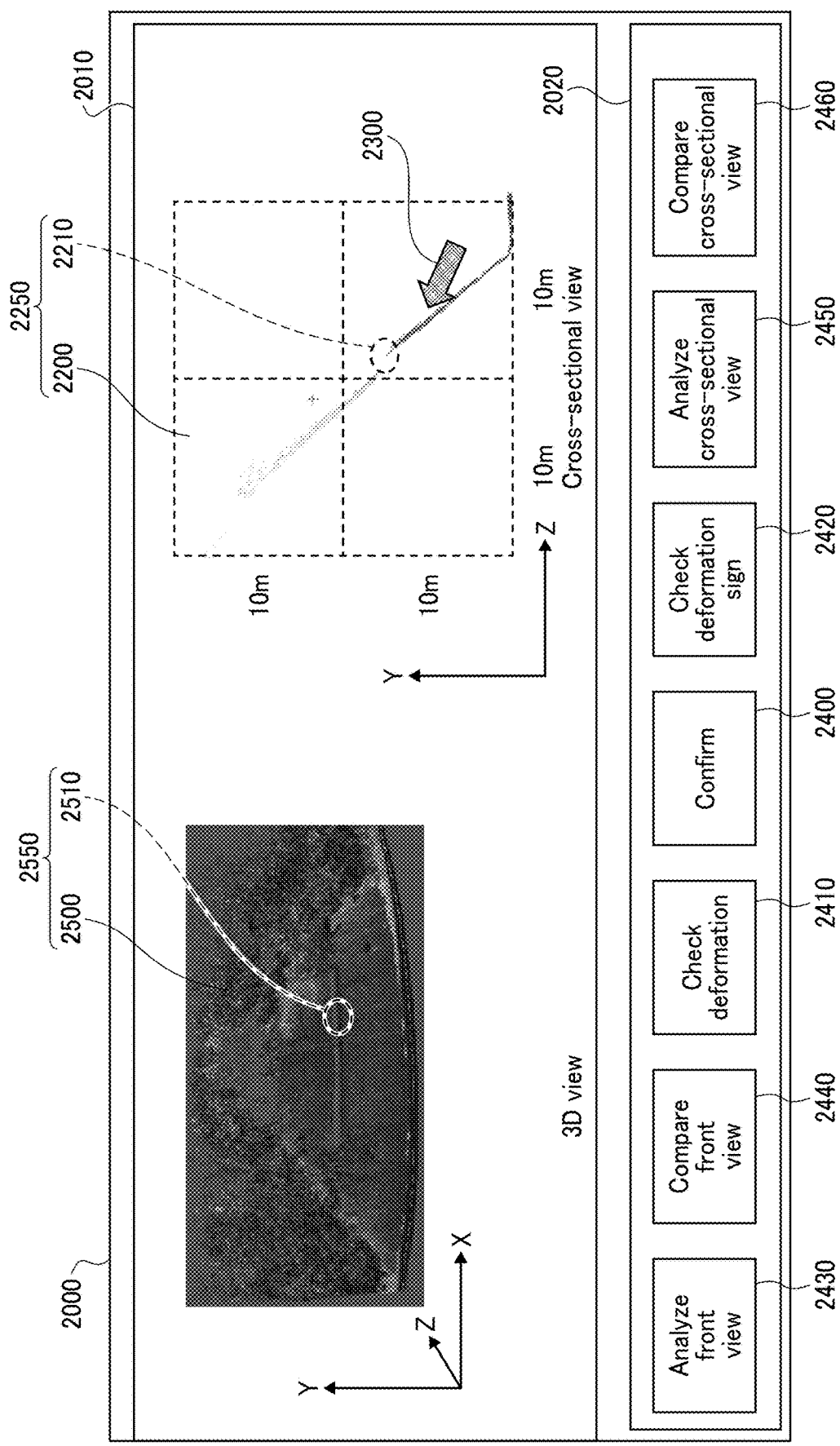
FIG. 53 is an illustration of an example of a display screen after processes described referring to FIG. 50A and FIG. 50B, according to an embodiment of the present disclosure.

FIG. 53 illustrates an example of a display screen after the processes described referring to FIG. 52A and FIG. 52B.

The display control unit 33 of the evaluation apparatus 3 controls the display 306 to display, instead of the surface display image 2150 illustrated in FIG. 37, a 3D display image 2550 including the 3D image 2500 and a 3D position image 2510 indicating the particular position in the 3D image 2500 on the designation reception screen 2010, and to display the cross-section display image 2250 on the designation reception screen 2010.

The display control unit 33 may control the display 306 to further display the surface display image 2150 illustrated in FIG. 37 on the designation reception screen 2010, or to switch display between the surface display image 2150 and the 3D display image 2550.

Figure 54B:
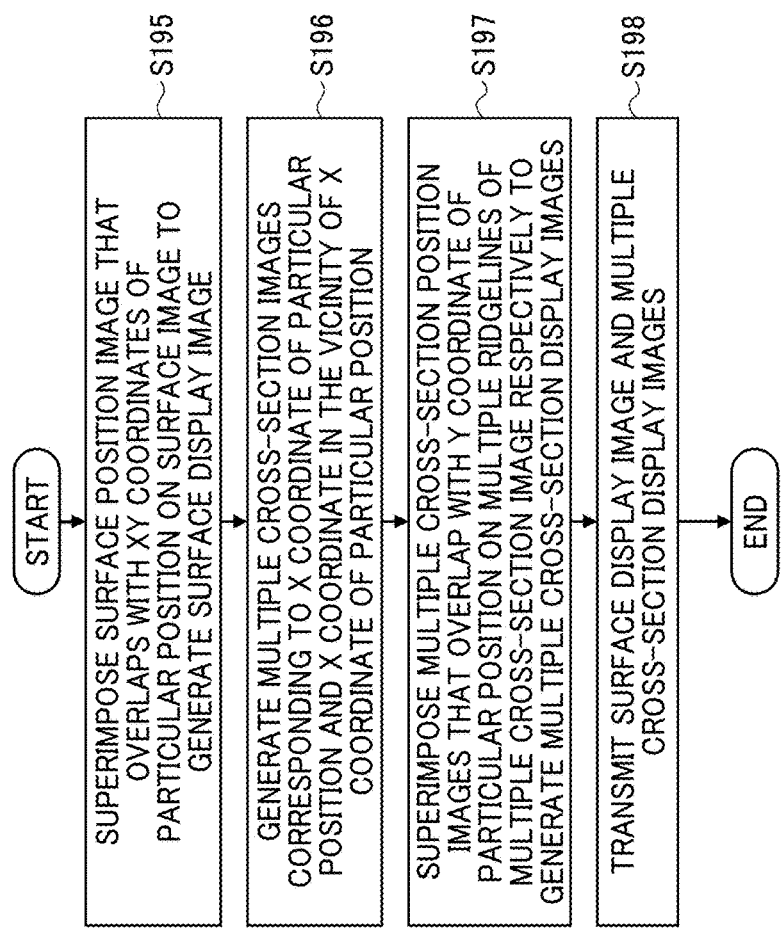
FIG. 54A and FIG. 54B are flowcharts of examples of modifications of the processes described referring to FIG. 34.
Figure 54A:
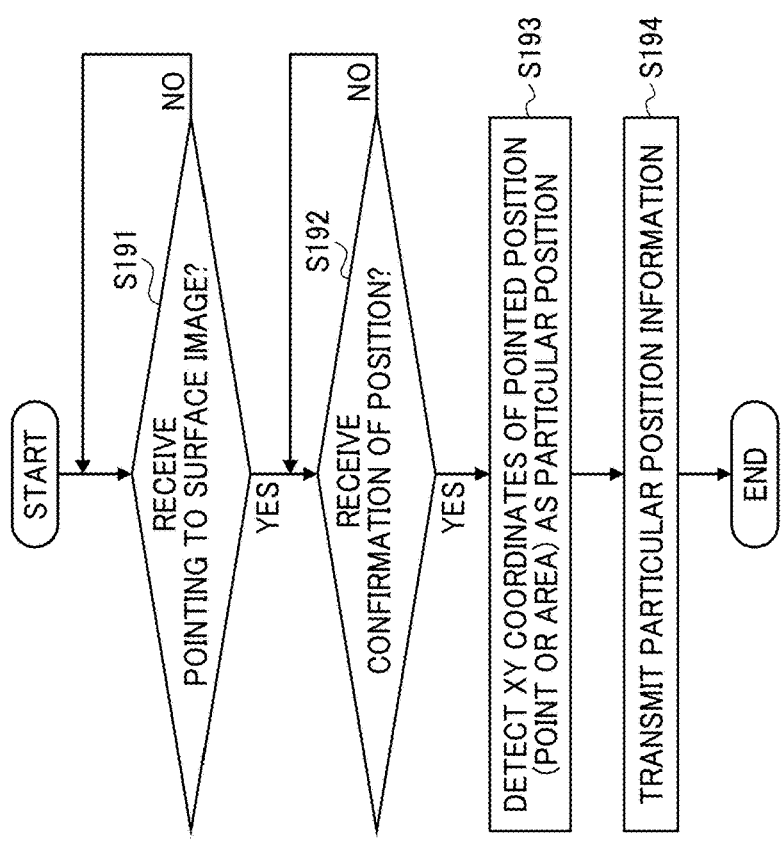

Generation of Multiple Cross-Section Display Images Based on Operation of Designating Particular Position:

FIG. 54A and FIG. 54B are flowcharts of examples of modifications of the processes described referring to FIG. 36A and FIG. 36B. FIG. 54A illustrates processes performed by the evaluation apparatus 3. FIG. 54B illustrates processes performed by the data management apparatus 5.

Processes of steps S191 to S194 of FIG. 54A are performed in the same or substantially the same manner as steps S101 to S104 of FIG. 36A.

The communication unit 51 of the data management apparatus 5 receives the input information transmitted from the evaluation apparatus 3. According to the instruction information and the designation information included in the received input information, the generation unit 54 generates a surface position image that overlaps the XY coordinates of the particular position and superimposes the surface position image on the surface image using the image data illustrated in FIG. 11A, to generate the surface display image (step S195). The surface position image does not have to exactly match the XY coordinates of the particular position. It suffices that the surface position image overlaps the XY coordinates of the particular position.

Next, the generation unit 54 generates the cross-section image corresponding to the X coordinate of the particular position and a cross-section image corresponding to an X coordinate in the vicinity of the particular position using the image data illustrated in FIG. 11A and the distance measurement data illustrated in FIG. 11B (step S196).

The description provided above is of an example in which the generation unit 54 generates the cross-section image of a cross section including the Z-axis direction and the vertical direction illustrated in FIG. 10 in step S196. Alternatively, the generation unit 54 may generate the cross-section image of a cross section including directions inclined from the Z-axis direction and the vertical direction or the cross section image of a cross section including a direction inclined from the Z-axis direction.

The generation unit 54 superimposes generates multiple cross-section position images, each overlapping the Y coordinates of the particular position, and superimposes the multiple cross-section position images on ridgelines of multiple cross-section images respectively, to generate multiple cross-section display images (step S197).

The communication unit 51 transmits the surface display image generated in step S195 and the multiple cross-section display images generated in step S197 to the evaluation apparatus 3 (step S198).

Then, as described referring to steps S98 and S99 of FIG. 34, the communication unit 31 of the evaluation apparatus 3 receives the surface display image and the multiple cross-section display image transmitted from the data management apparatus 5. The display control unit 33 of the evaluation apparatus 3 controls the display 306 to display the received surface display image and multiple cross-section display image.

Figure 55:
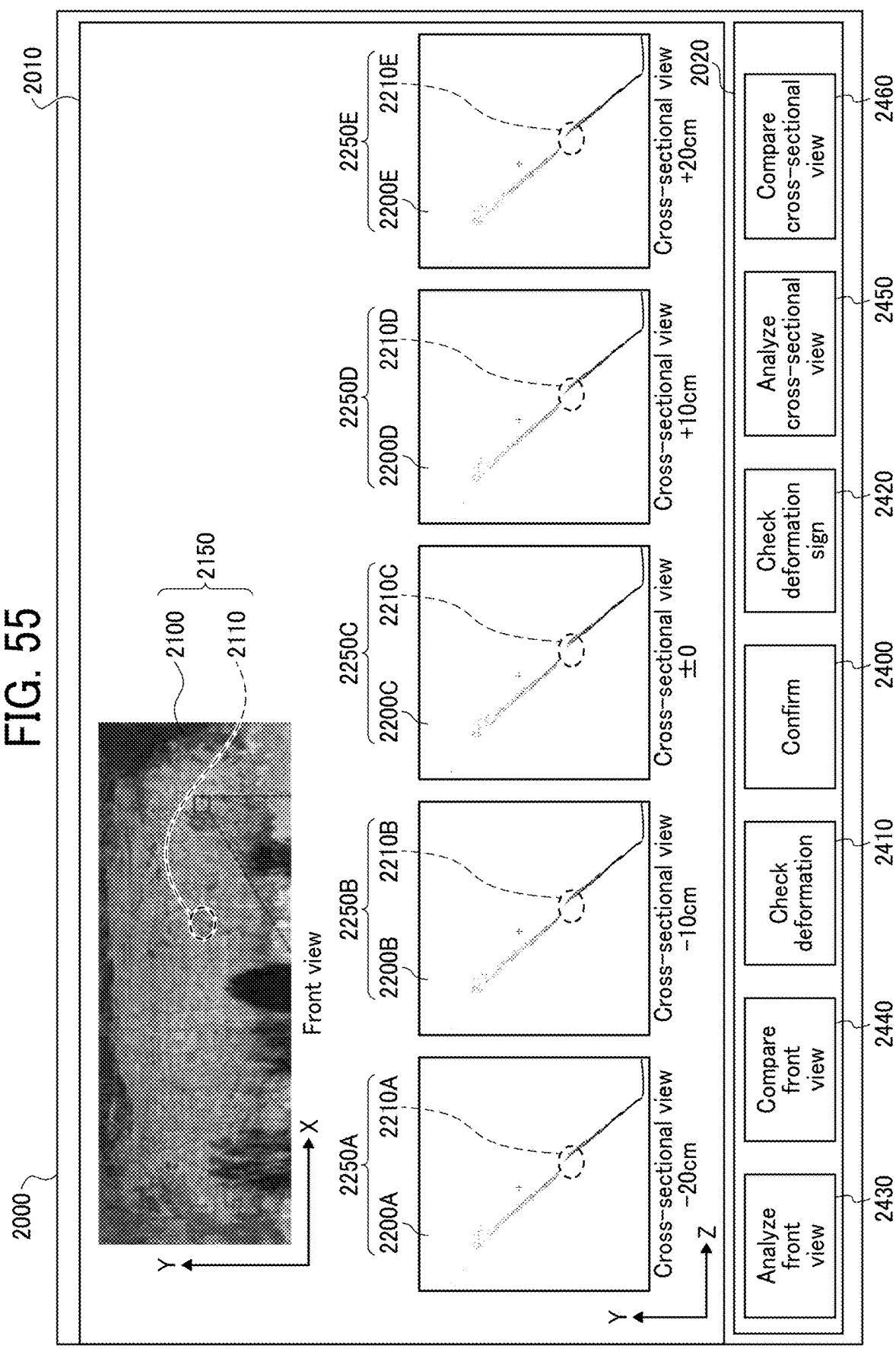
FIG. 55 is an illustration of an example of a display screen after processes described referring to FIG. 52A and FIG. 52B, according to an embodiment of the present disclosure.

FIG. 55 illustrates an example of a display screen after the processes described referring to FIG. 54A and FIG. 54B.

The display control unit 33 of the evaluation apparatus 3 controls the display 306 to display, instead of the cross-section display image 2250 illustrated in FIG. 37, the multiple cross-section display images including the first cross-section display image 2250A to a cross-section display image 2250E on the designation reception screen 2010.

The first cross-section display image 2250A to the cross-section display image 2250E includes respectively the first cross-section image 2200A to a cross-section image 2200E and the first cross-section position image 2210A to a cross-section position image 2210E.

The display control unit 33 controls the display 306 to further display a deviation amount in the X-axis direction in association with each of the first cross-section display image 2250A to the cross-section display image 2250E.

In FIG. 55, with the cross-section display image 2250C as a reference of ±0, the first cross-section display image 2250A indicates a cross-section deviated by −20 cm in the X-axis direction with respect to the cross-section display image 2250C. The cross-section display image 2250B indicates a cross-section deviated by −10 cm in the X-axis direction with respect to the cross-section display image 2250C. The cross-section display image 2250D indicates a cross-section deviated by +10 cm in the X-axis direction with respect to the cross-section display image 2250C. The cross-section display image 2250E indicates a cross-section deviated by +20 cm in the X-axis direction with respect to the cross-section display image 2250C.

Figure 56B:
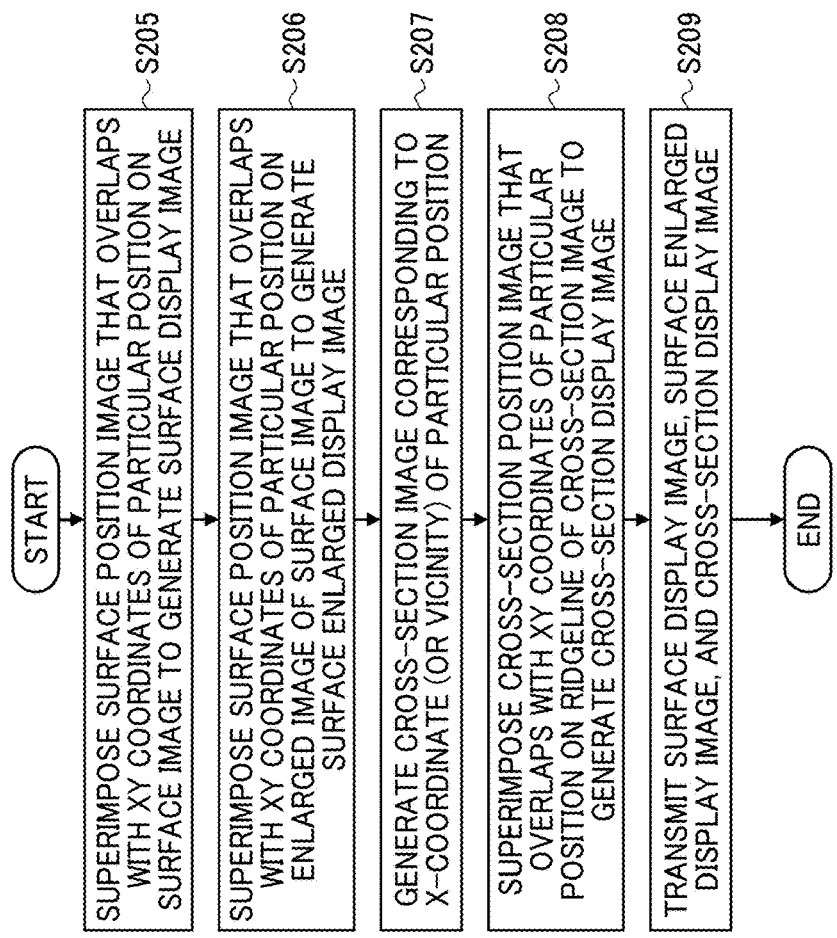
FIG. 56A and FIG. 56B are flowcharts of examples of second modifications of the processes described referring to FIG. 34, according to an embodiment of the present disclosure.
Figure 56A:
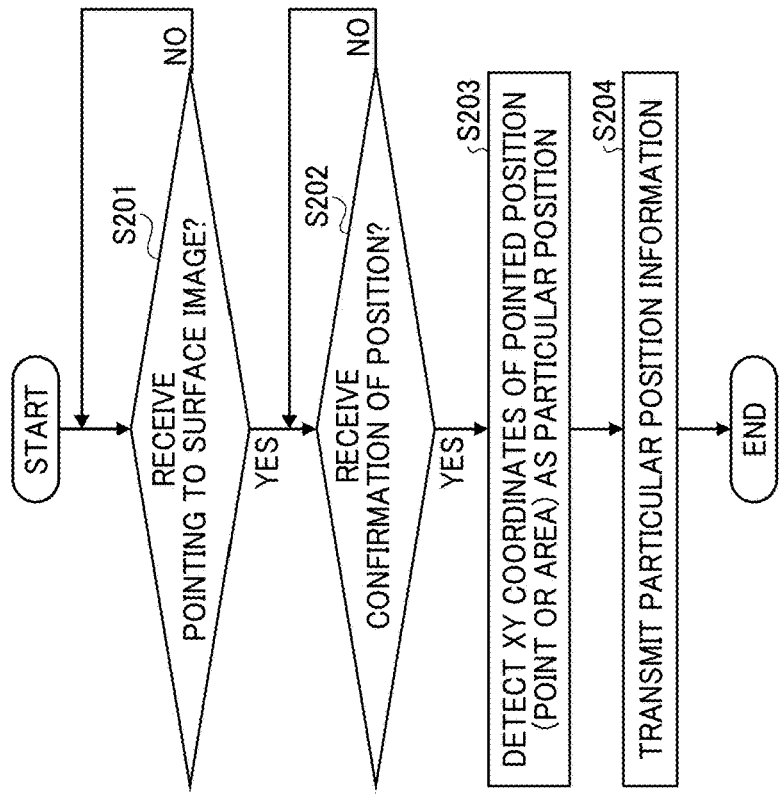

Generation of Multiple Surface Display Images Based on Operation of Designating Particular Position:

FIG. 56A and FIG. 56B are flowcharts of examples of second modifications of the processes described referring to FIG. 36A and FIG. 36B. FIG. 56A illustrates processes performed by the evaluation apparatus 3. FIG. 56B illustrates processes performed by the data management apparatus 5.

Processes of steps S201 to S204 of FIG. 56A are performed in the same or substantially the same manner as steps S101 to S104 of FIG. 36A.

The communication unit 51 of the data management apparatus 5 receives the input information transmitted from the evaluation apparatus 3. According to the instruction information and the designation information included in the received input information, the generation unit 54 generates a surface position image that overlaps the XY coordinates of the particular position and superimposes the surface position image on the surface image using the image data illustrated in FIG. 11A, to generate the surface display image (step S205). The surface position image does not have to exactly match the XY coordinates of the particular position. It suffices that the surface position image overlaps the XY coordinates of the particular position.

The generation unit 54 generates the surface position image that overlaps the XY coordinates of the particular position and superimposes the surface position image on an enlarged image of the surface image, to generate an enlarged surface display image (step S206).

Next, the generation unit 54 generates the cross-section image corresponding to the X coordinate of the particular position using the image data illustrated in FIG. 11A and the distance measurement data illustrated in FIG. 11B (step S207). When the distance measurement data illustrated in FIG. 11B does not include the X coordinate of the particular position, the generation unit 54 generates the cross-section image based on data in the vicinity of the X coordinate of the particular position included in the distance measurement data illustrated in FIG. 11B. When the distance measurement data illustrated in FIG. 11B does not include the X coordinate of the particular position, the generation unit 54 generates the cross-section image based on data in the vicinity of the X coordinate of the particular position included in the distance measurement data illustrated in FIG. 11B.

The description provided above is of an example in which the generation unit 54 generates the cross-section image of a cross section including the Z-axis direction and the vertical direction illustrated in FIG. 10 in step S207. Alternatively, the generation unit 54 may generate the cross-section image of a cross section including directions inclined from the Z-axis direction and the vertical direction or the cross section image of a cross section including a direction inclined from the Z-axis direction.

The generation unit 54 generates a cross-section position image that overlaps the Y coordinates of the particular position and superimposes the cross-section position image on a ridgeline of the cross-section image, to generate the cross-section display image (step S208).

The communication unit 51 transmits the surface display image generated in step S205, the enlarged surface display image generated in step S206, and the cross-section display image generated in step S208 to the evaluation apparatus 3 (step S209).

Then, as described referring to steps S98 and S9) of FIG. 34, the communication unit 31 of the evaluation apparatus 3 receives the surface display image, the enlarged surface display image, and the cross-section display image transmitted from the data management apparatus 5. The display control unit 33 of the evaluation apparatus 3 controls the display 306 to display the received surface display image, enlarged cross-section display image, and cross-section display image.

Figure 57:
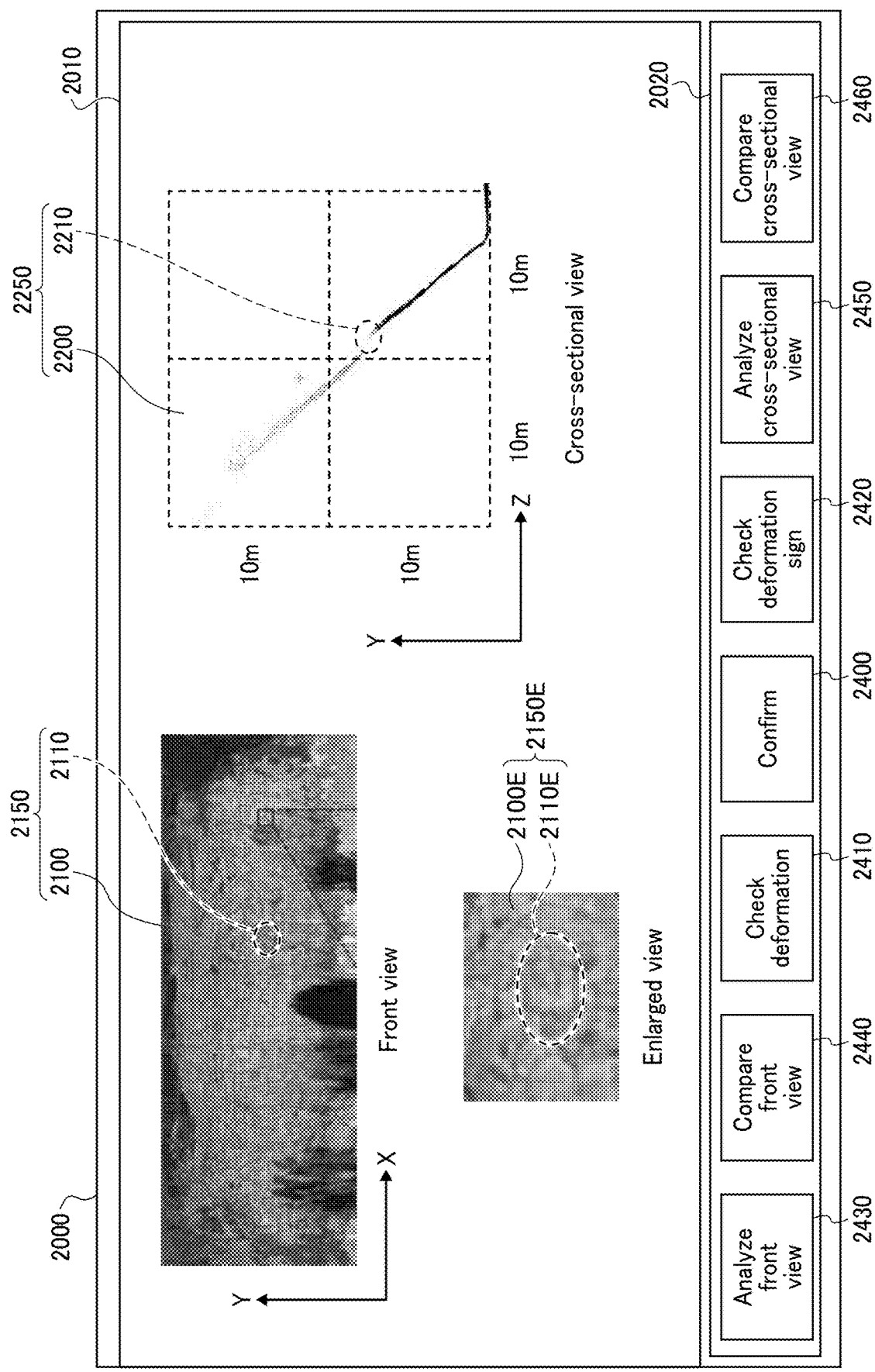
FIG. 57 is an illustration of an example of a display screen after processes described referring to FIG. 54A and FIG. 54B, according to an embodiment of the present disclosure.

FIG. 57 illustrates an example of a display screen after the processes described referring to FIG. 56A and FIG. 56B.

The display control unit 33 of the evaluation apparatus 3 controls the display 306 to display, in addition to the surface display image 2150 and the cross-section display image 2250 illustrated in FIG. 37, an enlarged surface display image 2150E including an enlarged image 2100E obtained by enlarging the surface image 2100 and an enlarged surface position image 2110E indicating the particular position in the enlarged image 2100E on the designation reception screen 2010.

As described above, the state inspection system 1 can quantitatively detect a shape of an earthwork structure, deformation in a shape of a surface layer of the earthwork structure, and deformation occurring on the surface layer of the earthwork structure based on the data acquired by the image capturing device 7 and the three-dimensional sensor such as the distance sensor 8a. Further, the state inspection system 1 can automatically generate the evaluation reports as illustrated in FIG. 23 to FIG. 25, FIG. 29 and FIG. 30 based on the evaluation result. This improves the efficiency of slope inspection. Furthermore, by using the mobile apparatus system 60, the state inspection system 1 can inspect places where a person cannot visit, such as high places or embarkments.

Furthermore, the state inspection system 1 allows a user to recognize the position of the slope to be evaluated by combining the map data and the evaluation result of the slope state. With this configuration, the slope of the earthwork structure that does not need to be visually inspected can be extracted. Further, the inspection speed per slope is improved. Furthermore, by registering the evaluation result in the data management apparatus 5, the state inspection system 1 quantitatively accumulates changes of deformation over time. This makes soundness diagnosis rational and efficient.

In the above-described embodiments, the description is of an example in which inspection and evaluation are performed on the slope state. In another example, the state inspection system 1 may be used for inspection of other structures such as road surfaces, tunnels, and bridges as well as the inspection of the slope state. The state inspection system 1 inspects various structures on roads using the mobile apparatus system 60, thereby further improving the efficiency of infrastructure inspection.

As described above, the data management apparatus 5 according to an embodiment of an information processing apparatus of the present disclosure includes the communication unit 51, which is an example of instruction receiving means, that receives instruction information instructing generation of an image indicating a particular position in a slope, which is an example of an object, and the generation unit 54, which is an example of image generation means, that generates, according to the instruction information, the surface display image 2150 including the surface image 2100 indicating a surface of the slope and the surface position image 2110 indicating the particular position in the surface image 2100 and a cross-section display image 2250 including the cross-section image 220M indicating a cross-section of the slope and the cross-section position image 2210 indicating the particular position in the cross-section image 2200.

Further, the data management apparatus 5 includes the generation unit 54 that generates the surface display image 2150 including the surface image 2100 indicating the surface of the slope and the surface position image 2110 indicating the particular position in the surface image, and the cross-section display image 2250 including the cross-section image 2200 indicating the cross-section of the slope and the cross-section position image 2210 indicating the particular position in the cross-section image, according to an operation received on the generation instruction reception screen 2020 that receives an operation instructing generation of an image indicating the particular position in the slope.

According to the present embodiment, the surface position image indicating the particular position included in an image of the surface of the slope and the cross-section position image indicating the particular position included in an image of the cross section of the slope are generated. The present embodiment is applicable to an object for which a surface image and a cross-section image need to be checked, such as tunnels, bridges, and structures such as buildings, in addition to the slope.

The data management apparatus 5 further includes the communication unit 51, which is an example of transmission means, that transmits the surface display image 2150 and the cross-section display image 2250 to the evaluation apparatus 3, the data acquisition apparatus 9, the terminal apparatus 1100, or the terminal apparatus 1200, each being an example of a communication terminal.

This allows to the user to visually compare the surface position image indicating the particular position included in the image of the surface of the slope with the cross-section position image indicating the particular position included in the image of the cross-section of the slope, to appropriately check a state of the particular position.

With the above-described configuration, the user of the communication terminal (the evaluation apparatus 3, the data acquisition apparatus 9, the terminal apparatus 1100, or the terminal apparatus 1200) can easily check the particular position of the slope corresponding to contents of a submitted report or a report to be submitted.

In particular, advance preparation by a staff of a national government or a local government before visiting a slope for checking the slope relating to the submitted report or the report to be submitted or on-site work by such the staff are made efficient.

The communication unit SI further transmits generation reception screen information relating to the generation instruction reception screen 2020 to the communication terminal (the evaluation apparatus 3, the data acquisition apparatus 9, the terminal apparatus 1100, or the terminal apparatus 1200).

Thus, the communication terminal (the evaluation apparatus 3, the data acquisition apparatus 9, the terminal apparatus 1100, or the terminal apparatus 1200) can receive the operation instructing generation of the image indicating the particular position in the slope.

The generation unit 54 generates the surface display image 2150 and the cross-section display image 2250 according to the particular position designated by a designation operation received in designation reception screen information relating to the designation reception screen 2010 that receives a designation operation for designating the particular position.

With this configuration, the state of the particular position designated by the designation operation can be appropriately checked by comparing the surface position image with the cross-section position image.

The designation reception screen 2010 includes the surface image 2100 or the cross-section image 2200. With this configuration, the particular position included in the image of the surface of the slope or the particular position included in the image of the cross-section of the slope can be easily designated.

The generation unit 54 generates the surface display image 2150 and the cross-section display image 2250 according to an instruction operation for setting a position of an area satisfying a predetermined condition in the surface image 2100 or the cross-section image 2200 as the particular position.

With this configuration, the state of the particular position indicating the position of the area satisfying the predetermined condition in the surface image 2100 or the cross-section image 2200 is appropriately checked by comparing the surface position image with the cross-section position image.

The generation unit 54 generates the surface display image 2150 and the cross-section display image 2250 according to the instruction operation for setting a position indicating deformation of the slope or a sign of deformation of the slope as the particular position. With this configuration, the state of the position indicating the deformation of the slope or the sign of the deformation is appropriately checked.

The generation unit 54 generates the surface display image 2150 and the cross-section display image 2250 according to the instruction operation for setting a position of an area that matches or differs from the past image 2160, which is an example of another image, in the surface image 2100 or the cross-section image 2200 as the particular position. With this configuration, the state of the area that matches or differs from the another image (past image 2160) is appropriately checked.

The generation unit 54 further generates the past display image 2180, which is an example of another position display image, including the another image (past image 2160) and the another position image 2170 indicating the particular position in the another image. With this configuration, the state of the area that matches or differs from the surface image 2100 or the cross-section image 2200 in the another image 2160 can be appropriately checked.

The generation unit 54 generates the surface display image 2150 and the cross-section display image 2250, with a position of an area corresponding to the particular area in the another image (past image 2160) in the surface image 2100 or the cross-section image 2200 as the particular position. With this configuration, the state of the specific area in the another image (past image 2160) is appropriately checked.

For example, when the particular area in the another image (past image 2160) is a position indicating deformation of the slope or a sign of deformation of the slope, a state of the position indicating deformation of the slope or the sign of deformation of the slope in the another image (the past image 2160) in the surface image 2100 or the cross-section image 2200 can be checked.

The generation unit 54 further generates a three-dimensional surface display image (the 3D display image 2550) including a three-dimensional surface image (the 3D image 2500) representing the surface of the slope in three dimensions and a three-dimensional surface position image (the 3D position image 2510) indicating the particular position in the three-dimensional surface image.

With this configuration, by comparing the three-dimensional surface position image (the 3D position image 2510) with the surface position image 2110 or the cross-section position image 2220, the state of the particular position can be appropriately checked.

The generation unit 54 generates multiple cross-section image (the first cross-section image 2200A to cross-section image 2200E) respectively indicating different cross-sections of the slope, and generates multiple cross-section display images (the first cross-section display image 2250A to the cross-section display image 2250E) respectively including the multiple cross-section images (the first cross-section image 2200A to cross-section image 2200E) and multiple cross-section position images (the first cross-section position image 2210A to the cross-section position image 2210E) respectively indicating particular positions in the multiple cross section images (the first cross-section image 2200A to the cross-section image 2200E).

With this configuration, by comparing the cross section image 2220A to the cross-section position image E with one another, the state of the particular position is appropriately checked.

The generation unit 54 generates multiple surface images (the surface image 2100 and the enlarged image 2100E) respectively indicating different areas on the surface of the slope, and generates multiple surface display images (the surface display image 2150 and the enlarged surface display image 2150E) respectively including the multiple surface images (the surface image 2100 and the enlarged image 2100E) and multiple surface position images (the surface position image 2110 and the enlarged surface position image 2110E) respectively indicating particular positions in the surface image 2100 and the enlarged image 2100E.

With this configuration, by comparing the surface position image 2110 with the enlarged surface position image 2110E, the state of the particular position is appropriately checked.

The state inspection system 1 according to an embodiment of an information processing system of the present disclosure includes a data management apparatus 5 and a communication terminal (the evaluation apparatus 3, the data acquisition apparatus 9, the terminal apparatus 1110, or the terminal apparatus 1200) communicable with the data management apparatus 5. The data management apparatus 5 includes the communication unit 51 that transmits, to the communication terminal (the evaluation apparatus 3, the data acquisition apparatus 9, the terminal apparatus 1100, or the terminal apparatus 1200), generation reception screen information relating to the generation instruction reception screen 2020 that receives an operation instructing generation of an image indicating a particular position in a slope. The data management apparatus 5 further includes the generation unit 54 that generates the surface display image 2150 including the surface image 2100 indicating the surface of the slope and the surface position image 2110 indicating the particular position in the surface image, and the cross-section display image 2250 including the cross-section image 2200 indicating the cross-section of the slope and the cross-section position image 2210 indicating the particular position in the cross-section image, according to the operation received on the generation instruction reception screen 2020. The communication unit 51 further transmits the surface display image 2150 and the cross-section display image 2250 to the communication terminal (the evaluation apparatus 3, the data acquisition apparatus 9, the terminal apparatus 1100, or the terminal apparatus 1200). The communication terminal (the evaluation apparatus 3, the data acquisition apparatus 9, the terminal apparatus 1100, or the terminal apparatus 1200) includes the display control unit 33, which is an example of display control means, that controls the display 306, which is an example of a display, to display the generation instruction reception screen 2020, the surface display image 2150, and the cross-section display image 2250. The communication terminal further includes the receiving unit 32, which is an example of an operation receiving means, that receives an operation with respect to the generation instruction reception screen 2020.

An information processing method according to an embodiment of the present disclosure includes a generation instruction reception screen transmitting step (S94) of transmitting, to the communication terminal (the evaluation apparatus 3, the data acquisition apparatus 9, the terminal apparatus 1100, or the terminal apparatus 1200), generation reception screen information relating to the generation instruction reception screen 2020 that receives an operation instructing generation of an image indicating a particular position in a slope. The information processing method further includes an image generating step (S97) of generating the surface display image 2150 including the surface image 2100 indicating the surface of the slope and the surface position image 2110 indicating the particular position in the surface image, and the cross-section display image 2250 including the cross-section image 2200 indicating the cross-section of the slope and the cross-section position image 2210 indicating the particular position in the cross-section image, according to the operation received on the generation instruction reception screen 2020. The information processing method further includes a display image transmitting step (S98) of transmitting the surface display image 2150 and the cross-section display image 2250 to the communication terminal (the evaluation apparatus 3, the data acquisition apparatus 9, the terminal apparatus 1100, or the terminal apparatus 1200).

An information processing method according to an embodiment of the present disclosure includes receiving step (S95) of receiving an operation instructing generation of an image indicating a particular position in a slope. The information processing method further includes an image generating step (S97) of generating the surface display image 2150 including the surface image 2100 indicating the surface of the slope and the surface position image 2110 indicating the particular position in the surface image, and the cross-section display image 2250 including the cross-section image 2200 indicating the cross-section of the slope and the cross-section position image 2210 indicating the particular position in the cross-section image, according to the operation received in the receiving step. The information processing method further includes a displaying step (S99) of displaying the surface display image 2150 and the cross-section display image 2250 on a display.

A program according to an embodiment of the present disclosure causes a computer to the information-processing method including the processes of step S94, step S97, and step S98, or the information-processing method including the processes of step S95, step S97, and step S99.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), systems on a chip (SOCs), graphics processing units (GPUs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Each of the tables of the above-described embodiments may be generated by learning effect of machine learning. In addition, in alternative to using the tables, the data of each related item may be classified by the machine learning. In the present disclosure, the machine learning is defined as a technology that makes a computer to acquire human-like learning ability. In addition, the machine teaming refers to a technology in which a computer autonomously generates an algorithm required for determination such as data identification from learning data loaded in advance and applies the generated algorithm to new data to make a prediction. Any suitable learning method is applied for machine learning, for example, any one of supervised teaming, unsupervised learning, semi-supervised learning, reinforcement learning, and deep learning, or a combination of two or more those learning.

Further, various tables of any one of the above-described embodiments may be generated by an image processing technology. Examples of the image processing technology include, but are not limited to, edge detection, straight line detection, and binarization processing.

In substantially the same manner, when voice is used, a voice conversion technology such as Fourier transform may be used.

According to one or more embodiments of the present disclosure, a state of a particular position of an object can be appropriately checked.

Although the evaluation system, the state inspection system, the evaluation method, and the program according to one or more embodiments of the present disclosure have been described above, the above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An information processing apparatus, comprising circuitry configured to:
   create a surface image of an object and a cross-section image of the object;
   receive a creation instruction that instructs to create an image indicating a particular position in the object;
   create a surface position image indicating the particular position in the surface image and a cross-section position image indicating the particular position in the cross-section image according to the received creation instruction; and
   create multiple cross-section images including the cross-section image and multiple cross-section position images including the cross-section position image, the multiple cross-section position images respectively indicating different cross-sections of the object, the multiple cross-section position images respectively indicating multiple particular positions of the multiple cross section images, the multiple particular positions including the particular position.

2. The information processing apparatus of claim 1, wherein the creation instruction instructs to set a position satisfying a predetermined condition in the surface image or the cross-section image as the particular position.

3. The information processing apparatus of claim 2, wherein the predetermined condition is a position indicating a deformation of the object or a position indicating a sign of a deformation of the object.

4. The information processing apparatus of claim 2, wherein;
   in a case that the predetermined condition is in the surface image, the predetermined condition is a position of an area that matches or differs between the surface image and a past surface image, the past surface image representing the surface of the object at a time before the surface image is obtained, and
   in a case that the predetermined condition is in the cross-section image, the predetermined condition is a position of an area that matches or differs between the cross-section image and a past cross-section image, the past cross-section image representing the cross-section of the object at a time before the cross-section image is obtained.

5. The information processing apparatus of claim 4, wherein the circuitry is further configured to create a past surface position image indicating the particular position in the past surface image or a past cross-section position image indicating the particular position in the past cross-section image.

6. The information processing apparatus of claim 1, wherein the circuitry is further configured to create a three-dimensional surface image indicating the surface of the object in three dimensions and a three-dimensional surface position image indicating the particular position in the three-dimensional surface image.

7. The information processing apparatus of claim 1, wherein the circuitry is further configured to create multiple surface images including the surface image and multiple surface position images including the surface position image, the multiple surface images respectively indicating different areas on the surface of the object, the multiple surface position images respectively indicating multiple particular positions of the multiple surface images, the multiple particular positions of the multiple surface images including the particular position.

8. The information processing apparatus of claim 1, wherein;
   the information processing apparatus is communicable with a communication terminal through a communication network, and
   the circuitry receives the creation instruction received on a generation instruction reception screen displayed on a display of the communication terminal through the communication network.

9. The information processing apparatus of claim 8, wherein the circuitry is further configured to transmit surface display image including the surface image and the surface position image and cross-section display image including the cross-section image and the cross-section position image to the communication terminal through the communication network.

10. The information processing apparatus of claim 8, wherein the circuitry is further configured to transmit information relating to the generation instruction reception screen to the communication terminal through the communication network.

11. The information processing apparatus of claim 8, wherein:
   at least a part of the surface image or at least a part of the cross-section image is displayed on the generation instruction reception screen,
   in a case that at least the part of the surface image is displayed on the generation instruction reception screen, the creation instruction includes a designation operation of designating at least the part of the surface image displayed on the generation instruction reception screen, and
   in a case that at least the part of the cross-section image is displayed on the generation instruction reception screen, the creation instruction includes a designation operation of designating at least the part of the cross-section image displayed on the generation instruction reception screen.

12. An information processing system comprising:
   an information processing apparatus including first circuitry; and
   a communication terminal including second circuitry and being communicable with the information processing apparatus through a communication network,
   the first circuitry of the information processing apparatus being configured to
   create a surface image of an object and a cross-section image of the object,
   transmit information relating to a generation instruction reception screen to be displayed at the communication terminal to the communication terminal through the communication network, and
   receive a creation instruction that instructs to create an image indicating a particular position in the object,
   the second circuitry of the communication terminal being configured to display the generation instruction reception screen on a display, receive the creation instruction that instructs to create the image indicating the particular position in the object, and transmit the creation instruction to the information processing apparatus through the communication network, wherein the first circuitry of the information processing apparatus creates a surface position image indicating the particular position in the surface image and a cross-section position image indicating the particular position in the cross-section image according to the creation instruction transmitted from the communication terminal.

13. An information processing method, comprising:

receiving a creation instruction that instructs to create an image indicating a particular position in an object;

creating a surface image indicating a surface of the object and a cross-section image indicating a cross-section of the object;

creating includes creating a surface position image indicating the particular position in the surface image and a cross-section position image indicating the particular position in the cross-section image according to the received creation instruction; and creating multiple cross-section images including the cross-section image and multiple cross-section position images including the cross-section position image, the multiple cross-section position images respectively indicating different cross-sections of the object, the multiple cross-section position images respectively indicating multiple particular positions of the multiple cross section images, the multiple particular positions including the particular position.

14. The information processing method of claim 13, wherein the receiving includes receiving, through a communication network, the creation instruction received on a generation instruction reception screen displayed on a display of a communication terminal that is communicable through the communication network.

15. A non-transitory computer-executable medium storing a program that causes a computer to perform the information processing method of claim 13.

16. The information processing method of claim 13, wherein the creation instruction instructs to set a position satisfying a predetermined condition in the surface image or the cross-section image as the particular position.

17. The information processing method of claim 16, wherein the predetermined condition is a position indicating a deformation of the object or a position indicating a sign of a deformation of the object.

18. The information processing method of claim 16, wherein:

in a case that the predetermined condition is in the surface image, the predetermined condition is a position of an area that matches or differs between the surface image and a past surface image, the past surface image representing the surface of the object at a time before the surface image is obtained, and in a case that the predetermined condition is in the cross-section image, the predetermined condition is a position of an area that matches or differs between the cross-section image and a past cross-section image, the past cross-section image representing the cross-section of the object at a time before the cross-section image is obtained.

19. The information processing method of claim 18, further comprising:

creating a past surface position image indicating the particular position in the past surface image or a past cross-section position image indicating the particular position in the past cross-section image.

20. The information processing method of claim 13, further comprising:

creating a three-dimensional surface image indicating the surface of the object in three dimensions and a three-dimensional surface position image indicating the particular position in the three-dimensional surface image.

* * * * *